(12) United States Patent
Walker et al.

(10) Patent No.: US 8,734,233 B2
(45) Date of Patent: May 27, 2014

(54) METHOD AND APPARATUS FOR AUTHENTICATING DATA RELATING TO PARTICIPATION IN AN ELECTRONIC GAME

(75) Inventors: Jay S. Walker, Ridgefield, CT (US); James A. Jorasch, New York, NY (US); Russell P. Sammon, San Francisco, CA (US); Scott T. Friesen, New York, NY (US); Michael D. Downs, Wilton, CT (US); Steven M. Santisi, Ridgefield, CT (US)

(73) Assignee: Inventor Holdings, LLC, Stamford, CT (US)

( * ) Notice: Subject to any disclaimer, the term of this patent is extended or adjusted under 35 U.S.C. 154(b) by 0 days.

(21) Appl. No.: 13/610,837

(22) Filed: Sep. 11, 2012

(65) Prior Publication Data

US 2013/0005445 A1   Jan. 3, 2013

Related U.S. Application Data

(63) Continuation of application No. 10/682,062, filed on Oct. 9, 2003, now abandoned, which is a continuation-in-part of application No. 10/419,478, filed on Apr. 18, 2003, now abandoned, and a continuation-in-part of application No. 10/420,068, filed on Apr. 21, 2003, now abandoned.

(60) Provisional application No. 60/417,415, filed on Oct. 9, 2002.

(51) Int. Cl.
  *A63F 9/24*   (2006.01)
(52) U.S. Cl.
  USPC .......................... 463/25; 705/14.1; 705/14.12
(58) Field of Classification Search
  CPC ........... G07F 17/3244; G06Q 30/0207; G06Q 30/0209

USPC ......... 463/16, 25, 29, 40–42; 705/14.1, 14.12
  See application file for complete search history.

(56) References Cited

U.S. PATENT DOCUMENTS

| 4,856,787 A | 8/1989 | Itkis |
| 5,042,809 A | 8/1991 | Richardson |

(Continued)

FOREIGN PATENT DOCUMENTS

| AU | 569 234 B | 2/1988 |
| EP | 0 671 713 A1 | 9/1995 |

(Continued)

OTHER PUBLICATIONS

Robbins, Vicky H., "Vendor Liability for Computer Viruses and Undisclosed Disabling Devices in Software", The Computer Lawyer, Jul. 1993, Section: Proprietary Rights, vol. 10, No. 7, 14 pp.

(Continued)

*Primary Examiner* — Damon Pierce
(74) *Attorney, Agent, or Firm* — Fincham Downs, LLC; Magdalena M. Fincham

(57) ABSTRACT

Methods and apparatus for managing and authenticating usage of features of gaming devices is presented. The methods include tracking and/or accumulating usage data relating to gaming device features, determining an authentication code based on the usage data, outputting the authentication code to an operator for transmission to an interested party, and verifying the authentication code. The present invention allows regulatory agencies and manufacturers of gaming devices to reliably verify the usage of individual features of gaming devices without having to rely upon a casino to report the usage data.

10 Claims, 38 Drawing Sheets

900D

| SESSION IDENTIFIER 960 | GAMING DEVICE IDENTIFIER 962 | PLAYER IDENTIFIER 964 | OFFER 966 | ACCEPTED 968 |
|---|---|---|---|---|
| SESS-10 | GM-SM-01 | P-568249 | $30 TO SWITCH LONG DISTANCE TO BIGTEL CO. | YES |
| SESS-11 | GM-VB-04 | P-568250 | $10 FOR AGREEING TO EAT IN STEAKHOUSE | YES |
| SESS-12 | GM-MG-05 | P-568251 | TOUR OF BONUS ROUND IN EXCHANGE FOR $5 | YES |
| SESS-12 | GM-MG-05 | P-568251 | $10 FOR AGREEING TO EAT IN STEAKHOUSE | NO |

900D (CONT.)

| ACTIVE FEATURES 970 | COST TO OFFER SPONSOR 972 | PAYMENT TO PLAYER 974 | PAYMENT TO CASINO 975 | PAYMENT TO MANUFACTURER 976 |
|---|---|---|---|---|
| FEAT-07 | $35 | $30 | $3 | $2 |
| FEAT-06 | $11 | $10 | $0 | $1 |
| FEAT-08; FEAT-06 | N/A | N/A | $4 | $1 |
| FEAT-08; FEAT-06 | N/A | N/A | N/A | N/A |

(56) References Cited

U.S. PATENT DOCUMENTS

| | | | |
|---|---|---|---|
| 5,046,736 | A | 9/1991 | Bridgeman et al. |
| 5,073,931 | A | 12/1991 | Audebert et al. |
| 5,257,179 | A | 10/1993 | DeMar |
| 5,342,047 | A | 8/1994 | Heidel et al. |
| 5,470,079 | A | 11/1995 | LeStrange et al. |
| 5,564,700 | A | 10/1996 | Celona |
| 5,580,309 | A | 12/1996 | Piechowiak et al. |
| 5,611,730 | A | 3/1997 | Weiss |
| 5,632,485 | A | 5/1997 | Woodland et al. |
| 5,639,088 | A | 6/1997 | Schneider et al. |
| 5,655,961 | A | 8/1997 | Acres et al. |
| 5,774,870 | A | 6/1998 | Storey |
| 5,807,177 | A | 9/1998 | Takemoto et al. |
| 5,819,092 | A | 10/1998 | Ferguson et al. |
| 5,855,008 | A | 12/1998 | Goldhaber et al. |
| 6,068,552 | A | 5/2000 | Walker et al. |
| 6,106,396 | A | 8/2000 | Alcorn et al. |
| 6,149,522 | A | 11/2000 | Alcorn et al. |
| 6,183,362 | B1 | 2/2001 | Boushy |
| 6,254,483 | B1 | 7/2001 | Acres |
| 6,264,561 | B1 | 7/2001 | Saffari et al. |
| 6,270,409 | B1 | 8/2001 | Shuster |
| 6,293,866 | B1 * | 9/2001 | Walker et al. .................... 463/20 |
| 6,312,336 | B1 | 11/2001 | Handelman et al. |
| 6,319,125 | B1 | 11/2001 | Acres |
| 6,350,199 | B1 | 2/2002 | Williams et al. |
| 6,354,943 | B1 | 3/2002 | Miura |
| 6,375,567 | B1 | 4/2002 | Acres |
| 6,381,575 | B1 | 4/2002 | Martin et al. |
| 6,394,899 | B1 | 5/2002 | Walker |
| 6,398,644 | B1 | 6/2002 | Perrie et al. |
| 6,407,761 | B1 | 6/2002 | Ching et al. |
| 6,409,602 | B1 | 6/2002 | Wiltshire et al. |
| 6,454,650 | B1 | 9/2002 | Aronin |
| 6,457,640 | B2 | 10/2002 | Ramachandran et al. |
| 6,460,023 | B1 | 10/2002 | Bean et al. |
| 6,517,437 | B1 | 2/2003 | Wells et al. |
| 6,530,842 | B1 | 3/2003 | Wells et al. |
| 6,578,051 | B1 | 6/2003 | Mastronardi et al. |
| 6,620,047 | B1 | 9/2003 | Alcorn et al. |
| 6,884,170 | B2 | 4/2005 | Rowe |
| 6,902,481 | B2 | 6/2005 | Breckner et al. |
| 7,780,529 | B2 | 8/2010 | Rowe et al. |
| 7,798,899 | B2 | 9/2010 | Acres |
| 2002/0107072 | A1* | 8/2002 | Giobbi .................... 463/42 |
| 2002/0116615 | A1 | 8/2002 | Nguyen et al. |
| 2002/0137217 | A1* | 9/2002 | Rowe .................... 436/42 |
| 2002/0152120 | A1 | 10/2002 | Howington |
| 2003/0134675 | A1 | 7/2003 | Oberberger |
| 2004/0048668 | A1* | 3/2004 | Brosnan .................... 463/42 |

FOREIGN PATENT DOCUMENTS

| | | |
|---|---|---|
| WO | WO 96/08295 | 3/1996 |
| WO | WO 02/32526 A1 | 4/2002 |

OTHER PUBLICATIONS

Kasturi, Rajeev, "Introducing SAP's Internet Business Framework; Company Business and Marketing", Intelligent Enterprise, Apr. 10, 2000, Section: No. 6, vol. 3, 5 pp.

Kasturi, Rajeev, "The Tower of XML; Internet/Web/Online Service Information", Intelligent Enterprise, Oct. 20, 2000, Section: No. 16, vol. 3, 3 pp.

Office Action for U.S. Appl. No. 10/682,062 mailed Apr. 9, 2010, 13 pp.

Office Action for U.S. Appl. No. 10/682,062 mailed Jul. 13, 2009, 10 pp.

Office Action for U.S. Appl. No. 10/682,062 mailed Dec. 8, 2008, 11 pp.

Office Action for U.S. Appl. No. 10/682,062 mailed Apr. 29, 2008, 10 pp.

Office Action for U.S. Appl. No. 12/511,203 mailed Mar. 14, 2011, 9 pp.

Office Action for U.S. Appl. No. 12/511,203 mailed Nov. 16, 2010, 10 pp.

Marcial, Gene G., "Multimedia Games Has Got Bingo", BusinessWeek Online, Nov. 19, 2001, (http //www Businessweek com/magazine/content/01_47/b3758119.htm), 2 pp.

"MIS Signs Joint Venture to Distribute Downloadable Gaming; Monaco Company Partners with Cyberscan Technology", Business Wire, Jan. 10, 2002, 1 pg.

"Alliance Gaming Announces Corporate Agreement With Boyd Gaming to Supply Systems and Cashless Solutions", PR Newswire, Feb. 25, 2003, Section: Financial News, 2 pp.

Website: "About Multimedia Games Inc.", (http //www casinoenterprisemanagement com/news/viewArticle php?id=49 &cat=supplier), download date: Mar. 26, 2003, 1 pg.

Website: "Mikohn Gaming Corporation: Key Developments", (http //news moneycentral msn com/ticker/sigdev asp? Symbol=MIKN), download date Mar. 26, 2003, 2 pp.

Website: "Multimedia Games, Inc./Games", (http //www multimediagames com/Technology/Games htm), download date: Mar. 26, 2003, 1 pg.

Website: "Multimedia Games, Inc./Systems", (http //www multimediagames com/Technology/Systems htm), download date: Mar. 26, 2003, 1 pg.

Website: "SAP—mySAP All-in-One Home", (http //www sap com/ solutions/smb/allinone/), download date: Mar. 27, 2003. 1 pg.

Website: "SAP—SAP xApps Home", (http //www sap com/solutions/xapps/, download date: Mar. 27, 2003, 1 pg.

Website: "Part 7—Choosing an Online Casino", (http //www got2bet com/articles/ltopart7 shtml), download date: Apr. 9, 2003, 1 pg.

CCC Website: "Products—On-line Gaming Machine—Cyberview Gaming Machine", download date: Apr. 9, 2003, 2 pp.

* cited by examiner

| FEATURE IDENTIFIER 502 | FEATURE NAME 504 | DESCRIPTION 506 | CATEGORY 508 |
|---|---|---|---|
| FEAT-01 | PAUL BUNYAN BONUS ROUND | DURING THE BONUS ROUND, AN ANIMATED IMAGE OF PAUL BUNYAN APPEARS ONSCREEN AND MUSIC PLAYS | BONUS ROUND |
| FEAT-02 | FREE TELEPHONE CALLS | A PLAYER IS PERMITTED TO MAKE FREE LONG DISTANCE TELEPHONE CALLS AS LONG AS HE PLAYS THE SLOT MACHINE AT A MINIMUM RATE OF PLAY | EXTRA BENEFITS |
| FEAT-03 | TEAM PLAY | ALL THE PLAYERS AT A BANK OF SLOT MACHINES ARE ON THE SAME TEAM - IF ONE PLAYER HITS A JACKPOT, THEY ALL WIN | NEARBY MACHINE |
| FEAT-04 | BONUS ROUND HINT | IN A BONUS ROUND, A PLAYER RECEIVES A HINT AS TO WHICH PLAYER-SELECTABLE ELEMENT HAS THE LOWEST ASSOCIATED VALUE | BONUS ROUND |
| FEAT-05 | NEARBY JACKPOT ALERTS | IF A JACKPOT OCCURS AT A MACHINE NEAR THE PLAYER, THEN A MESSAGE IS DISPLAYED ON THE PLAYER'S SLOT MACHINE | NEARBY MACHINE |
| FEAT-06 | CASINO DINNER OFFER | IF PLAYER HAS BALANCE GREATER THAN 100 COINS, OFFER 10 FREE SPINS IN EXCHANGE FOR AGREEMENT TO EAT DINNER AT THE CASINO STEAKHOUSE | OFFER |

600

| FEATURE IDENTIFIER 602 | CONDITION FOR ENABLING FEATURE 604 |
|---|---|
| FEAT-01 | INDICATION PROVIDED BY CASINO |
| FEAT-02 | AT LEAST 50% OF NOVICE PLAYERS USE THE FEATURE AND AVERAGE COST OF PHONE CALLS LESS THAN $5 |
| FEAT-03 | THERE ARE MORE THAN 5 PLAYERS AT THE BANK OF SLOT MACHINES AND RIVERBOAT IS NOT DOCKED |
| FEAT-04 | AVERAGE BET SIZE ON MAGIC SYMBOL SLOT MACHINES IS GREATER THAN 2.3 COINS |
| FEAT-05 | AUTHENTICATION CODE PROVIDED BY GAME MANUFACTURER |

FIG. 6

| GAMING DEVICE IDENTIFIER 702 | GAMING DEVICE TYPE 704 | FEATURES ENABLED 706 | FEATURES IN USE 708 | BENCHMARK THEORETICAL WIN 710 | LOCATION 712 |
|---|---|---|---|---|---|
| GM-SM-01 | ELECTRONIC REEL GAMES | FEAT-01 | FEAT-01 | $0.28 / MIN | NON-SMOKING SECTION |
| GM-SM-02 | REEL GAMES | FEAT-03; FEAT-05 | FEAT-03; FEAT-05 | $0.29 / MIN | LAS VEGAS |
| GM-VP-03 | VIDEO POKER | FEAT-02; FEAT-10 | FEAT-02 | $0.31 / MIN | CASINO 3 |
| GM-VB-04 | VIDEO BLACKJACK | FEAT-02; FEAT-099A | FEAT-02 | $0.32 / MIN | CASINO 4, SECTION A-7 |
| GM-MG-05 | VIDEO POKER; VIDEO KENO; VIDEO BLACKJACK | FEAT-04; FEAT-05 | FEAT-04; FEAT-05 | $0.31 / MIN | CASINO 2, SECTION C-2 |

FIG. 7

| SESSION IDENTIFIER 902 | GAMING DEVICE IDENTIFIER 904 | PLAYER IDENTIFIER 906 | LENGTH OF SESSION 908 | TOTAL COIN-IN 910 | SESSION THEORETICAL WIN PER MIN. 912 | INCREASE IN THEORETICAL WIN PER MIN 914 | ACTIVE FEATURES 916 |
|---|---|---|---|---|---|---|---|
| SESS-01 | GM-SM-01 | P-568249 | 75 MIN | $345.00 | $0.37 | $0.09 | FEAT-02 |
| SESS-06 | GM-SM-01 | P-568250 | 93 MIN | $488.25 | $0.42 | $0.14 | FEAT-01 |
| SESS-03 | GM-VP-03 | P-568250 | 132 MIN | $676.50 | $0.41 | $0.12 | FEAT-02 |
| SESS-07 | GM-MG-05 | P-568251 | 37 MIN | $203.50 | $0.44 | $0.13 | FEAT-04; FEAT-05 |
| SESS-08 | GM-MG-05 | P-568252 | 62 MIN | $302.25 | $0.39 | $0.08 | FEAT-03; FEAT-05 |

FEATURE USAGE DATABASE FOR FEATURE FEAT-02 (FREE TELEPHONE CALLS)

| SESSION IDENTIFIER 920 | LENGTH OF SESSION 922 | COIN-IN PER MINUTE 924 | SESSION THEORETICAL WIN 926 | TOTAL COST OF PHONE CALLS 928 | NET THEORETICAL PROFIT FROM SESSION 930 |
|---|---|---|---|---|---|
| SESS-01 | 75 MIN | 18.4 COINS / MIN | $27.60 | $4.26 | $23.34 |
| SESS-02 | 208 MIN | 16.7 COINS / MIN | $69.47 | $14.85 | $54.62 |
| SESS-03 | 132 MIN | 20.3 COINS / MIN | $53.59 | $3.85 | $49.74 |
| SESS-04 | 84 MIN | 19.5 COINS / MIN | $32.76 | $8.12 | $24.64 |
| SESS-05 | 45 MIN | 14.6 COINS / MIN | $13.14 | $2.89 | $10.25 |

FIG. 9B

| TRIP IDENTIFIER 940 | PLAYER IDENTIFIER 942 | BENCHMARK TRIP THEORETICAL WIN 946 | TRIP THEORETICAL WIN 948 | PERCENTAGE OF PLAY WITH ENABLED FEATURE(S) 950 |
|---|---|---|---|---|
| TRIP-01 | P-568249 | $475 | $524 | 80% |
| TRIP-02 | P-568250 | $430 | $447 | 50% |
| TRIP-03 | P-568251 | $325 | $320 | 0% |
| TRIP-04 | P-568252 | $501 | $562 | 75% |
| TRIP-05 | P-568253 | $425 | $432 | 20% |

| SESSION IDENTIFIER 960 | GAMING DEVICE IDENTIFIER 962 | PLAYER IDENTIFIER 964 | OFFER 966 | ACCEPTED 968 |
|---|---|---|---|---|
| SESS-10 | GM-SM-01 | P-568249 | $30 TO SWITCH LONG DISTANCE TO BIGTEL CO. | YES |
| SESS-11 | GM-VB-04 | P-568250 | $10 FOR AGREEING TO EAT IN STEAKHOUSE | YES |
| SESS-12 | GM-MG-05 | P-568251 | TOUR OF BONUS ROUND IN EXCHANGE FOR $5 | YES |
| SESS-12 | GM-MG-05 | P-568251 | $10 FOR AGREEING TO EAT IN STEAKHOUSE | NO |

| ACTIVE FEATURES 970 | COST TO OFFER SPONSOR 972 | PAYMENT TO PLAYER 974 | PAYMENT TO CASINO 975 | PAYMENT TO MANUFACTURER 976 |
|---|---|---|---|---|
| FEAT-07 | $35 | $30 | $3 | $2 |
| FEAT-06 | $11 | $10 | $0 | $1 |
| FEAT-08; FEAT-06 | N/A | N/A | $4 | $1 |
| FEAT-08; FEAT-06 | N/A | N/A | N/A | N/A |

| FEATURE IDENTIFIER 1002 | PROVIDER 1004 | PAYMENT TO PROVIDER 1006 |
|---|---|---|
| FEAT-01 | TRADEMARK HOLDER | $2,354 |
| FEAT-02 | PATENT LICENSOR #1 | $4,561 |
| FEAT-02 | GAME MANUFACTURER #1 | $8,118 |
| FEAT-03 | N/A | N/A |
| FEAT-04 | PATENT LICENSOR #1 | $10,878 |
| FEAT-05 | GAME MANUFACTURER #2 | $1,567 |

| | PAYMENT TO PROVIDER 1 _1028_ | PROVIDER 2 _1030_ | PROVIDER 2 RATE _1032_ | PAYMENT TO PROVIDER 2 _1034_ |
|---|---|---|---|---|
| | $40.68 | GAME MANUFACTURER #1 | $0.01 / MIN | $20.34 |
| | $300 | PATENT LICENSOR #2 | 50% OF PLAYER FEES | $1500 |
| | $186 | N/A | N/A | N/A |
| | $18.64 | N/A | N/A | N/A |
| | $14 | GAME MANUFACTURER #2 | $1 PER MACHINE | $7 |

| TIME 1400 | PLAYER IDENTIFIER 1402 | DESCRIPTION OF EVENT 1404 |
|---|---|---|
| 5/5/02 3:45:16PM | PLAY-1-89403125 | PLAYER TRACKING CARD INSERTED INTO GAME MACHINE |
| 5/5/02 3:45:25PM | PLAY-1-89403125 | $20 BILL INSERTED INTO GAME MACHINE |
| 5/5/02 3:45:30PM | PLAY-1-89403125 | PLAYER BETS 3 COINS; SPINS REELS OF GAME MACHINE |
| 5/5/02 3:45:36PM | PLAY-1-89403125 | PLAYER WINS 5 COINS |
| 5/5/02 3:45:36PM | PLAY-1-89403125 | OFFER IS OUTPUT TO PLAYER "WOULD YOU LIKE TO GET 10 FREE COINS FOR SPENDING 5 MINUTES ANSWERING SURVEY QUESTIONS? |
| 5/5/02 7:28:02PM | N/A | CASINO ACTIVATES 3D GRAPHICS MODE ON GAME MACHINE |
| 5/5/02 8:05:54PM | PLAY-2-89403125 | PLAYER ACCEPTS OFFER TO SIGN UP FOR A NEW CREDIT CARD |
| 5/5/02 11:28:19PM | N/A | CASINO EMPLOYEE EMPTIES COIN HOPPER ON GAME MACHINE |
| 5/6/02 12:02:48AM | PLAY-3-89403125 | PLAYER SELECTS 3D GRAPHICS MODE ON GAME MACHINE |

| DESCRIPTION OF DATA 1500 | VALUE 1502 |
|---|---|
| TOTAL COIN-IN | 123,487 COINS |
| AVERAGE COIN-IN PER SESSION | 502 COINS |
| NUMBER OF OFFERS PRESENTED | 84 OFFERS |
| PERCENTAGE OF OFFERS ACCEPTED | 83.3 % |
| AVERAGE REVENUE PER HOUR | $ 57.32 |
| TOTAL THEORETICAL WIN | $ 6,123.94 |
| PERCENTAGE OF GAME SESSIONS LONGER THAN 3 HOURS | 8.1 % |
| TOTAL TIME THAT 3D GRAPHICS MODE WAS USED | 112.5 HOURS |

| TIME 1600 | YEAR-TO-DATE COIN-IN 1602 | CREDIT CARD OFFERS PRESENTED SINCE LAST UPDATE 1604 | AUTHENTICATION CODE 1606 |
|---|---|---|---|
| 1/2/02 2:11PM | 2,489 COINS | 78 OFFERS | <10 BYTE AUTHENTICATION CODE> |
| 2/6/02 11:19AM | 30,348 COINS | 126 OFFERS | <64 BYTE AUTHENTICATION CODE> |
| 3/1/02 4:45PM | 50,598 COINS | 268 OFFERS | <154 MB AUTHENTICATION CODE> |
| 4/3/02 12:36PM | 78,159 COINS | 274 OFFERS | <1.23 MB AUTHENTICATION CODE> |
| 5/5/02 9:15AM | 102,873 COINS | 312 OFFERS | <486 MB AUTHENTICATION CODE> |

| GAMING DEVICE IDENTIFIER 1900 | LOCATION OF GAMING DEVICE 1902 | DECRYPTION KEY 1904 | YEAR-TO-DATE COIN-IN 1906 |
|---|---|---|---|
| GAME-1-901283423 | GOLDEN DICE CASINO | <128-BIT PUBLIC KEY> | 102,873 COINS |
| GAME-2-901283423 | GOLDEN DICE CASINO | <128-BIT PUBLIC KEY> | 76,891 COINS |
| GAME-3-901283423 | BOB'S SUPERMARKET | <2048-BIT SYMMETRIC KEY> | 12,980 COINS |
| GAME-4-901283423 | JOE'S BAR & GRILL | ONE-TIME PAD | 9,990 COINS |
| GAME-5-901283423 | BIG BEN CASINO | N/A | 89,018 COINS |
| GAME-6-901283423 | DIAMOND DREAM RIVERBOAT | <512-BIT SECRET KEY> | 81,013 COINS |

FIG. 19

| AUTHENTICATION CODE 2000 | TIME RECEIVED 2002 | GAMING DEVICE THAT GENERATED AUTHENTICATION CODE 2004 | USAGE DATA VERIFIED? 2006 |
|---|---|---|---|
| <10 BYTE AUTHENTICATION CODE> | 5/5/02 9:25AM | GAME-1-9012B3423 | YES |
| <15 MB AUTHENTICATION CODE> | 5/5/02 10:32AM | GAME-2-9012B3423 | NO |
| <1.18 MB AUTHENTICATION CODE> | 5/4/02 8:16AM | GAME-3-9012B3423 | YES |
| <486 MB AUTHENTICATION CODE> | 5/4/02 3:54PM | GAME-4-9012B3423 | YES |
| <64 BYTE AUTHENTICATION CODE> | 5/5/02 4:20PM | GAME-5-9012B3423 | YES |
| <8 BYTE AUTHENTICATION CODE> | 5/5/02 2:10AM | GAME-6-9012B3423 | NO |

SIDE VIEW

FRONT VIEW

METHOD AND APPARATUS FOR AUTHENTICATING DATA RELATING TO PARTICIPATION IN AN ELECTRONIC GAME

The present application is a continuation of U.S. patent application Ser. No. 10/682,062, filed Oct. 9, 2003, entitled "METHOD AND APPARATUS FOR AUTHENTICATING DATA RELATING TO USAGE OF A GAMING DEVICE", which is a continuation-in-part of U.S. patent application Ser. No. 10/419,478, filed Apr. 18, 2003, "METHOD AND APPARATUS FOR ENABLING A PLAYER TO SELECT FEATURES ON A GAMING DEVICE";

which is also a continuation-in-part of U.S. patent application Ser. No. 10/420,068, filed Apr. 21, 2003 and now abandoned, entitled "METHOD AND APPARATUS FOR MANAGING FEATURES ON A GAMING DEVICE";

and which also claims the benefit of U.S. Provisional Patent Application No. 60/417,415 filed Oct. 9, 2002, entitled "METHOD AND APPARATUS FOR AUTHENTICATING DATA RELATING TO USAGE OF A GAMING DEVICE".

Each of the above applications is incorporated by reference herein in its entirety.

CROSS-REFERENCE TO RELATED APPLICATIONS

The present application is related to the following commonly-owned U.S. patent applications:

(i) U.S. patent application Ser. No. 09/603,677, filed Jun. 26, 2000 and issued as U.S. Pat. No. 7,542,919 on Jun. 2, 2009, entitled "METHOD AND APPARATUS FOR SELECTING A SUPPLEMENTAL PRODUCT TO OFFER FOR SALE DURING A TRANSACTION", the entirety of which is incorporated by reference herein for all purposes;

(ii) U.S. patent application Ser. No. 09/993,228, filed Nov. 14, 2001 and now abandoned, entitled "METHOD AND APPARATUS FOR DYNAMIC RULE AND/OR OFFER GENERATION", the entirety of which is incorporated by reference herein for all purposes;

(iii) U.S. Reissue application Ser. No. 10/222,523, filed Aug. 16, 2002, entitled "GAMING DEVICE FOR OPERATING IN A REVERSE PAYOUT MODE AND A METHOD OF OPERATING SAME", the entirety of which is incorporated by reference herein for all purposes;

(iv) U.S. application Ser. No. 09/879,299, filed Jun. 12, 2001 and issued as U.S. Pat. No. 6,634,942 on Oct. 21, 2003, entitled "SYSTEM AND METHOD FOR AUTOMATED PLAY OF MULTIPLE GAMING DEVICES", the entirety of which is incorporated by reference herein for all purposes;

(v) U.S. application Ser. No. 10/121,243, filed Apr. 11, 2002 and issued as U.S. Pat. No. 7,094,149 on Aug. 22, 2006, entitled "METHODS AND SYSTEMS FOR FACILITATING PLAY AT A GAMING DEVICE BY MEANS OF THIRD PARTY OFFERS", the entirety of which is incorporated by reference herein for all purposes;

(vi) U.S. application Ser. No. 10/419,304 filed Apr. 18, 2003 and issued as U.S. Pat. No. 7,563,167 on Jul. 21, 2009, entitled "GAMING DEVICE METHOD AND APPARATUS EMPLOYING MODIFIED PAYOUTS", the entirety of which is incorporated by reference herein for all purposes;

(vii) U.S. application Ser. No. 10/417,436 filed Apr. 16, 2003, entitled "METHOD AND APPARATUS FOR OPTIMIZING THE RATE OF PLAY OF A GAMING DEVICE", the entirety of which is incorporated by reference herein for all purposes;

(viii) U.S. application Ser. No. 10/361,201, filed Feb. 7, 2003 and issued as U.S. Pat. No. 7,559,838 on Jul. 14, 2009, entitled "GAMING DEVICE AND METHOD OF OPERATION THEREOF", the entirety of which is incorporated by reference herein for all purposes;

(ix) U.S. application Ser. No. 10/414,511 filed Apr. 15, 2003 and issued as U.S. Pat. No. 7,275,990 on Oct. 2, 2007, entitled "METHOD AND APPARATUS FOR BONUS ROUND PLAY", the entirety of which is incorporated by reference herein for all purposes;

(x) U.S. application Ser. No. 10/328,116, filed Dec. 20, 2002 and issued as U.S. Pat. No. 7,467,999 on Dec. 23, 2008, entitled "METHOD AND APPARATUS FOR OUTPUTTING OUTCOMES OF A GAMING DEVICE", the entirety of which is incorporated by reference herein for all purposes;

(xi) U.S. application Ser. No. 10/254,831, filed Sep. 25, 2002 and now abandoned, entitled "METHOD AND APPARATUS FOR LINKED PLAY GAMING", the entirety of which is incorporated by reference herein for all purposes;

(xii) U.S. application Ser. No. 10/007,874, filed Nov. 12, 2001 and issued as U.S. Pat. No. 6,648,762 on Nov. 18, 2003, entitled "ELECTRONIC AMUSEMENT DEVICE AND METHOD FOR PROPAGATING A PERFORMANCE ADJUSTMENT SIGNAL", the entirety of which is incorporated by reference herein for all purposes; and (xiii) U.S. application Ser. No. 10/322,107, filed Dec. 18, 2002 and issued as U.S. Pat. No. 7,101,282 on Sep. 5, 2006, entitled "FREE LONG DISTANCE CALLS ON SLOT MACHINES", the entirety of which is incorporated by reference herein for all purposes.

(xiv) U.S. patent application Ser. No. 12/511,203, filed Jul. 29, 2009 and now abandoned entitled "METHOD AND APPARATUS FOR AUTHENTICATING DATA RELATING TO USAGE OF A GAMING DEVICE", the entirety of which is incorporated by reference herein for all purposes.

BACKGROUND

The present invention relates generally to methods and apparatus for encrypting and authenticating data relating to usage of features of games and of gaming devices.

Gaming devices (e.g., reeled slot machines, video slot machines, video poker machines, video keno machines, video blackjack, video bingo machines, etc.) generate more than $15 billion per year in revenue for casinos in the United States alone. This figure accounts for more than half of the gaming revenue for a typical United States casino. The situation is similar in other countries in which gaming devices are popular, such as Australia. Accordingly, casino operators and other operators of gaming devices are interested in increasing the enjoyment of playing gaming devices in order to maintain or increase this level of revenue.

Gaming device manufacturers often lease gaming devices to casinos for a percentage of the revenues generated by these machines. Manufacturers market gaming devices in many different ways. Examples include selling their gaming devices and conversion kits to casinos and other gaming device operators. In another example, manufactures lease their gaming devices to casinos and other gaming device operators for lease payments based upon, for example, (1) a percentage of the net win of the gaming device, or (2) based upon fixed daily fees. A percentage of net win arrangement allows manufacturers to share in the earnings of these gaming devices, and both types of lease arrangements permit manufacturers to generate a recurring revenue stream.

Manufacturers refer to gaming devices that are operated under these types of lease arrangements as "participation games." Note that in such arrangements, manufacturers typically must rely on the casinos to accurately report the revenues generated by the gaming devices. Casino personnel may intentionally, or unintentionally, misrepresent the usage of a participation gaming device and thereby reduce the value of a lease payment for a gaming device. Manufacturers would rather not have to rely on casinos to accurately report the revenues generated by a gaming device.

Manufacturers sometimes allow casinos or other operators to test a new type of gaming device for a limited period of time (e.g., 30 days). This enables the casino to determine whether the new type of gaming device will generate sufficient revenues to be worth leasing or purchasing. If a casino is dissatisfied with a new type of gaming device, they may cancel any plans to lease or purchase the machine and retain any revenues that were gained during the trial period. Note that in this situation as well, manufacturers are typically in the disadvantageous position of relying upon the casinos to accurately report the revenues generated by the gaming devices.

BRIEF DESCRIPTION OF THE FIGURES

FIG. 5 is a table illustrating an exemplary data structure of a feature database consistent with one or more embodiments of the present invention.

FIG. 6 is a table illustrating an exemplary data structure of a condition database consistent with one or more embodiments of the present invention.

FIG. 7 is a table illustrating an exemplary data structure of a gaming device database consistent with one or more embodiments of the present invention.

FIG. 9A is a table illustrating an exemplary data structure of a performance database consistent with one or more embodiments of the present invention.

FIG. 9B is a table illustrating another exemplary data structure of a performance database consistent with one or more embodiments of the present invention.

FIG. 9C is a table illustrating another exemplary data structure of a performance database consistent with one or more embodiments of the present invention.

FIGS. 9D and 9E is a table illustrating another exemplary data structure of a performance database consistent with one or more embodiments of the present invention.

FIG. 10A is a table illustrating an exemplary data structure of a payment database consistent with one or more embodiments of the present invention.

FIGS. 10B and 10C is a table illustrating another exemplary data structure of a payment database consistent with one or more embodiments of the present invention.

FIG. 14 is a table illustrating an exemplary data structure of an event database consistent with one or more embodiments of the present invention.

FIG. 15 is a table illustrating an exemplary data structure of a game data database consistent with one or more embodiments of the present invention.

FIG. 16 is a table illustrating an exemplary data structure of an authentication code database consistent with one or more embodiments of the present invention.

FIG. 19 is a table illustrating an exemplary data structure of a gaming device database consistent with one or more embodiments of the present invention.

FIG. 20 is a table illustrating an exemplary data structure of a code verification database consistent with one or more embodiments of the present invention.

DETAILED DESCRIPTION

Figure 1A:
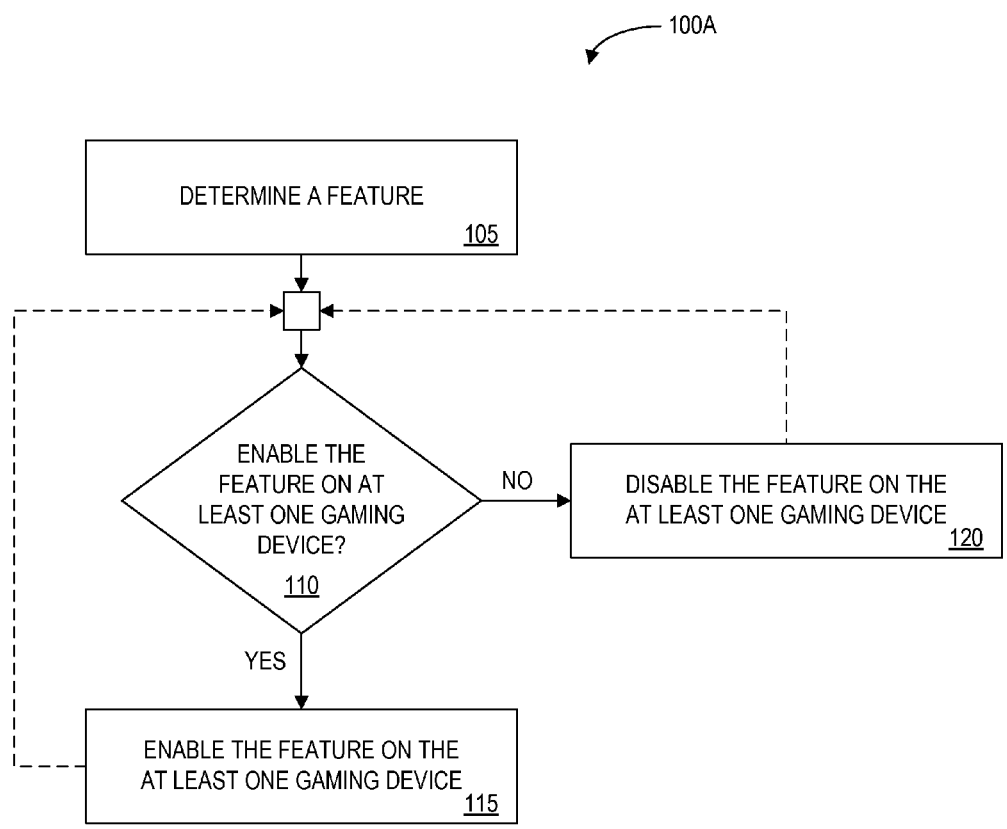
FIG. 1A is a flowchart depicting an exemplary process consistent with one or more embodiments of the present invention.

The present invention addresses drawbacks of the prior art by providing a method and apparatus for encoding and/or verifying data descriptive of the usage of gaming devices and gaming device features. According to some embodiments, the invention provides a method of guaranteeing that usage data from a game machine is authentic. When the invention is used properly, it is extremely difficult for an attacker (e.g., an untrustworthy casino) to misrepresent usage data to an interested party (e.g., a game manufacturer, a regulatory group).

According to some embodiments, the invention includes a gaming device or game machine (e.g., a slot machine, a video poker machine, a pachinko machine). Players may operate the game machine to play games (e.g., games of chance) and possibly win prizes (e.g., cash prizes). The gaming device may track usage data relating to operation of the game machine, including coin-in, revenues, payouts, activated/deactivated features, offers, player inputs, outcomes, and other events or statistics. According to some embodiments, this usage data may be communicated to an interested party (e.g., for use in determining a licensing fee or tax payment). In some embodiments, the usage data my be encrypted into a code before it is communicated.

According to some embodiments, a gaming device may generate an authentication code based on the usage data. This authentication code may be generated using a variety of different cryptographic and non-cryptographic protocols, which are described herein. Generating an authentication code may include compressing or encrypting usage data. For example, a game machine may compute a cryptographic hash of a set of usage data, which may be encrypted with a secret key. It is anticipated that since an attacker (e.g., an untrustworthy casino employee) does not know this secret key, the attacker would be unable to forge a counterfeit authentication code.

According to some embodiments, an authentication code may be output from a game machine. For example, a game machine may print out an authentication code on a piece of paper, display an authentication code on an LCD screen, or transmit an authentication code to an authentication server using a communication network.

According to some embodiments, an authentication code may be verified using an authentication server. An authentication server may be a computer server operated by an interested party. Verifying an authentication code may include decrypting at least a portion of the authentication code. For example, an authentication server may decrypt an authentication code using a decryption key that corresponds to a secret key used by a game machine to produce an authentication code. Verifying an authentication code may also include comparing information included in the authentication code (e.g., usage data, a timestamp) to one or more expected values (e.g., usage data that was indicated to the authentication server as part of a lease payment).

According to some embodiments, the system may guarantee that usage data from a game machine is authentic if an authentication code corresponding to the usage data is verified by an authentication server.

In accordance with some embodiments of the present invention, the operation of a gaming device (and/or of a game provided on the gaming device) may be affected by various parameters, options, and other features enabled for use on the gaming device. As discussed herein, such features may enhance various aspects of a player's experience at the gaming device. For example, a feature may be used on a gaming device to alter a mode of operation of the gaming device (e.g., to alter a mode of operation of a game, to change how information is communicated to a player, to modify how payouts are determined for a player (e.g., by changing a payout table for a game), or to modify the types of offers that can be made to a player at the gaming device. As indicated above, the gaming device may track usage data relating to feature use for reporting to interested parties.

Applicants have recognized that, in some embodiments, operators of gaming devices may find it appealing to be able to take advantage of methods and apparatus for determining which features (or combinations of features) to enable for use on one or more gaming devices. Likewise, manufacturers of gaming devices may wish to encourage the operators to experiment with different features by giving them the flexibility to do so. For example, some types of operators may find it appealing to be able to determine which one or more features of a plurality of features are likely to be most appealing to players, to increase revenues of a gaming device, and/or to increase profitability of a gaming device.

Some types of gaming devices offer one or more different types of games. Applicants have also recognized that owners and operators of gaming devices may also benefit from methods and apparatus for determining which games (or combinations of games) to make available to players of gaming devices. U.S. patent application Ser. No. 10/420,069, filed Apr. 18, 2003, entitled "METHOD AND APPARATUS FOR MANAGING PERFORMANCE OF MULTIPLE GAMES", the entirety of which is incorporated by reference herein for all purposes, relates generally to managing the availability of different games on a gaming device. The present application, in contrast, relates generally to reporting authenticable information related to managing features for enhancing the operation of gaming devices and/or features for enhancing the operation of available games.

Applicants have recognized that owners and operators of gaming devices may benefit from being able to determine and report various measures of the performance of a feature. For example, an indication of an amount that an enabled feature has been used on a slot machine, or an indication of how much revenue was taken in at a gaming device at which the feature is enabled, may be useful in managing one or more features on one or more gaming devices (e.g., in determining whether to disable a particular feature or to keep it enabled on one or more gaming devices). In another example, by tracking and reporting information related to use of a gaming device, an increased profitability of the gaming device may be correlated to one or more features enabled at the gaming device. In another example, by tracking and reporting authenticable information related to use of a gaming device, participation licensing arrangements between operators and manufactures may provide terms that specify payments based upon the actual increased profitability of the gaming device due to a particular licensed feature. In another example, third parties may license features to manufactures for inclusion in gaming devices under a participation-type arrangement whereby the third party may earn fees based upon the actual increased profitability of the gaming device due to the particular licensed feature.

Applicants have recognized that owners and operators of gaming devices, as well as providers of features for use on gaming devices, may find it appealing to be able to reliably determine a payment based on the performance of a feature (and/or of a gaming device on which the feature is enabled). For example, some operators of gaming devices may benefit from being able to pay a provider of a feature an amount that is based on how long the feature is enabled for use, how many machines are enabled to provide the feature, or how often the feature is actually used by players. Thus, gaming device operators may be able to enter into performance-based agreements with providers in which the operator can compensate the provider based on a cost per use of the feature, or a cost per time the feature is in use (or merely enabled for use). In another example, as indicated above, some operators or manufacturers may find it appealing to be able to determine a payment based on an increase in the use or profitability of a gaming device.

Applicants have also recognized that enhancing the operation of a gaming device by enabling and/or disabling the use of one or more particular features (or combinations of features) on the gaming device may serve to distinguish the gaming device, and may provide a more satisfying entertainment experience to players, thus attracting more players to such a gaming device.

Applicants have also recognized that modifying the experience of a player at a gaming device, by enabling and/or disabling the use of one or more particular features with the gaming device, may serve to increase the player's use of the gaming device, leading to increased revenues for owners and operators of gaming devices, and may increase the profitability of the gaming device.

Applicants have further recognized that manufacturers, owners, and operators of gaming devices may benefit from a degree of flexibility in determining which of a plurality features should be available for use on a gaming device. Applicants have also recognized that manufacturers, owners, and operators of gaming devices may find it appealing to have a feature automatically enabled or disabled on a gaming device in accordance with various predetermined conditions. Likewise, Applicants have recognized that automatically tracking and reporting enabling and disabling of features in a reliable and/or authenticable manner is useful to operators, manufacturers, and feature providers.

Accordingly, the present invention comprises systems and methods for managing features for use on gaming devices as well as tracking, encoding, reporting, and authenticating the use of such features. In accordance with one or more embodiments, a feature is enabled for use on one or more gaming devices, and an indication of performance of the feature (e.g., a number of times the feature is selected for use by players) is determined, encoded, and output. In some embodiments, a payment (e.g., a royalty fee) is also determined based on the performance of the feature.

For example, according to an exemplary embodiment, a feature for providing an enhanced mode for automated play on a slot machine is licensed by a casino from the developer of the feature. The casino then enables the feature for use on five slot machines in the casino, making the feature available to players playing the machines. During a brief trial period of two days, different types of information relating to interactions of players with the slot machines (e.g., player information, game information, information about the slot machines, information about the players' use of features) are transmitted to a casino server and stored. During the two-day period, for example, the automated play mode was activated twenty-five times by eighteen different players. Some players selected the feature from a displayed list of "New Releases" features. One player was displayed an offer inviting her to switch to automated play mode, and pressed an "OK" button on the slot machine's touch screen to accept the offer.

On one of the slot machines, the feature was in use for a total of three hours during the two-day period. The average coin-in per hour for the two-day period while the feature was enabled was higher than the machine's average during the same two days of the previous week; the average coin-in per hour for the three hours while the feature was actually in use (e.g., when a player was playing the slot machine in automated play mode) was higher yet.

After the two-day trial period, a payment was determined based on the number of times the mode was selected for use and a per-use rate, and the casino arranged to have the payment provided to a licensor who provided the feature. Along with the payment, the casino provided the licensor with five authentication codes, one generated by each of the five slot machines that each included encrypted data representative of the number of times the mode was selected for use on each machine. Upon receipt of the payment and the five codes, the licensor verified that the payment amount was correct based upon the authentication codes. The casino, pleased with the performance of the feature, choose to enable the feature on all of its electronic reeled slot machines.

A feature, as used herein unless expressly indicated otherwise, comprises an enhancement, option, parameter, or mode that may affect how a gaming device operates and/or may affect how a game operates on a gaming device. A feature (e.g., a virtual assistant enhancement, an enhancement allowing a player to make telephone calls at a gaming device) may be contrasted with a game (e.g., a type of video poker game), which may be affected by a feature (e.g., by allowing for a virtual assistant in a video poker game).

Features may affect various operations of a game and/or a gaming device, such as the way a game is played, the way play of a game and/or information about a game are displayed, the way outcomes are determined in a game, and the way information about outcomes are displayed or otherwise communicated to a player. Reference may be made herein to some exemplary features for illustrative purposes; however, the operations of various games and gaming devices with one or more features in use may be dependent on the specific feature or active features, and may not be described in detail herein. Examples of features include, but are not limited to:

(i) Features that enhance play of a gaming device by modifying a payout mode of the gaming device. A reverse payout mode which is appropriate for enhancing the operation of a gaming device in accordance with one or more embodiments of the present invention is disclosed in U.S. Reissue application Ser. No. 10/222,523, filed Aug. 16, 2002, entitled "GAMING DEVICE FOR OPERATING IN A REVERSE PAYOUT MODE AND A METHOD OF OPERATING SAME", the entirety of which is incorporated by reference herein for all purposes.

(ii) Features that affect the operation of a gaming device by allowing for the allocation of wagers by players. For example, an activated feature may allow a player to divide an initial wager into a number of pieces designated by the player, with each wager portion corresponding to a uniquely determined outcome and payout. The size of the payouts may be adjusted by the size of the wager portion, or the probability of a winning outcome appearing could be correspondingly lowered.

(iii) Features that provide for automated play of one or more gaming devices in which the player is able to pre-pay for a series of reel spins and then watch as the slot machine determines outcomes for each spin without the need for the player to pull a handle or depress a spin button. A feature enhancing the operation of a gaming device to provide for automated play of one or more gaming devices is disclosed in U.S. application Ser. No. 09/879,299, filed Jun. 12, 2001, entitled "SYSTEM AND METHOD FOR AUTOMATED PLAY OF MULTIPLE GAMING DEVICES", the entirety of which is incorporated by reference herein for all purposes.

(iv) Features that allow for an offer to be presented to a player at a gaming device. Offers could include discounts at casino restaurants or showrooms, free hotel room nights, and the like. Offers could include a payment to a player in return for an action such as buying a pair of show tickets, providing a source of gambling funds for the player and incremental business for other casino revenue centers (e.g. hotel, restaurants, show). A feature enhancing the operation of a gaming device in order to allow for one or more offers to be presented to a player at a gaming device, is disclosed in U.S. application Ser. No. 10/121,243, filed Apr. 11, 2002, entitled "METHODS AND SYSTEMS FOR FACILITATING PLAY AT A GAMING DEVICE BY MEANS OF THIRD PARTY OFFERS", the entirety of which is incorporated by reference herein for all purposes.

(v) Features that enhance the operation of a gaming device by allowing the player to eliminate the payouts associated with a set of outcomes in exchange for a reduced cost per play (e.g., at a cost less than a normal wager). For example, the player could elect to buy one or more outcomes of a slot machine in which only the top jackpot was enabled for payment—at a cost significantly lower than the normal cost of a reel spin at that gaming device. A gaming device which can be modified to pay only top jackpot payouts is disclosed in U.S. application Ser. No. 10/419,304, filed Apr. 18, 2003. entitled "GAMING DEVICE METHODS AND APPARATUS EMPLOYING MODIFIED PAYOUTS", the entirety of which is incorporated by reference herein for all purposes.

(vi) Features that enhance play of a gaming device by modifying the rate at which outcomes are resolved based on actions of the player. A feature affecting the operation of a gaming device by decreasing the time it takes for the reels of the gaming device to resolve to an outcome when player impatience is detected is disclosed in U.S. application Ser. No. 10/417,436, filed Apr. 16, 2003, entitled "METHOD AND APPARATUS FOR OPTIMIZING THE RATE OF PLAY OF A GAMING DEVICE", the entirety of which is incorporated by reference herein for all purposes.

(vii) Features that enhance the operation of a gaming device by allowing a player to modify at least one element of a gaming device (or of a game). A feature enhancing the operation of a gaming device by allowing a player to modify at least one element of the gaming device in accordance with the present invention is disclosed in U.S. application Ser. No. 10/361,201, filed Feb. 7, 2003, entitled "GAMING DEVICE AND METHOD OF OPERATION THEREOF", the entirety of which is incorporated by reference herein for all purposes.

(viii) Features that enhance the operation of a gaming device by providing a tour or other demonstration of bonus round functionality (e.g. instructions, strategies, payout amounts) on the gaming device, such as are disclosed in U.S. application Ser. No. 10/414,511 filed Apr. 15, 2003, entitled "METHOD AND APPARATUS FOR BONUS ROUND PLAY", the entirety of which is incorporated by reference herein for all purposes.

(ix) Features that affect operation of a game and/or a gaming device, such as by having a virtual assistant (represented by an animated game character appearing on the screen of the gaming device) reveal an alternate outcome in a reeled slot machine game, as are disclosed in U.S. application Ser. No. 10/328,116, filed Dec. 20, 2002, entitled "METHOD AND APPARATUS FOR OUTPUTTING OUTCOMES OF A GAMING DEVICE", the entirety of which is incorporated by reference herein for all purposes.

(x) Features providing enhancements of gaming devices such as allowing linked play via gaming and other devices, such as are disclosed in U.S. application Ser. No. 10/254,831, filed Sep. 25, 2002, entitled "METHOD AND APPARATUS FOR LINKED PLAY GAMING", the entirety of which is incorporated by reference herein for all purposes.

(xi) Features that affect the operation of a nearby gaming device, such as an embodiment in which the gaming devices surrounding a gaming device that has recently been achieving a lot of high paying outcomes have their own payout levels temporarily increased, such as are disclosed in U.S. application Ser. No. 10/007,874, filed Nov. 12, 2001, entitled "ELECTRONIC AMUSEMENT DEVICE AND METHOD FOR PROPAGATING A PERFORMANCE ADJUSTMENT SIGNAL", the entirety of which is incorporated by reference herein for all purposes.

(xii) Features that permit players access to services and/or content at the gaming device (such as a gaming device that allows players to make long distance phone calls provided that they maintain a predetermined rate of play) such as are disclosed in U.S. application Ser. No. 10/322,107, filed Dec. 18, 2002, entitled "FREE LONG DISTANCE CALLS ON SLOT MACHINES", the entirety of which is incorporated by reference herein for all purposes.

Other appropriate features will be recognized by one of ordinary skill in the art after reading the present application. Note that a variety of different types of features are possible, including, without limitation: (i) features that are only available for one game, (ii) features that are available for a plurality of games, (iii) features that are only available for use on one gaming device, (iv) features that are available for use on a plurality of gaming devices, (v) features that are available for use by one player, and (vi) features that are available for use by a plurality of players. For example, a feature may be available on slot machines and pachinko machines, but not on video poker machines or video blackjack machines. In another example, a feature for a bonus mode may work on all types of machines, but be best suited for card games like video blackjack and video poker.

According to some embodiments, multiple features may be enabled and/or active simultaneously on a single game or gaming device. For example, a player may play a video poker machine using a "Group Jackpot" feature and a "Virtual Assistant" feature. According to other embodiments, a first feature may not be compatible with a second feature. For example, it may not be possible for a first feature and a second feature to be active concurrently (e.g., if they provide for mutually exclusive payout modes). Therefore, players may be prevented from using these features simultaneously.

According to one or more embodiments of the present invention, a feature of a game or of a gaming device may be enabled for use on one or more gaming devices. According to some embodiments of the present invention, enabling a feature for use on a gaming device includes making the feature active on the gaming device (i.e. affecting operations of a game and/or of the gaming device in accordance with the feature).

According to other embodiments of the present invention, if a feature is enabled for use on a gaming device, it may be either active or inactive on the gaming device. In other words, a feature may be made available (e.g., by a server computer) for use on the gaming device, but the feature may or may not actually be in use (e.g., it may or may not be affecting play at the gaming device). For example, the feature may be enabled, but a player may not be using the gaming device. In another example, the feature may be enabled on a gaming device that is being operated by a player, but the player is playing a game that the feature does not affect. In another example, the feature may be enabled on a gaming device that is being operated by a player, but the feature has not been activated by the player, a server computer, or the gaming device to affect play.

In one or more embodiments of the present invention, enabling a feature for use on a gaming device means that the feature may be offered to a player at the gaming device.

In some embodiments of the present invention, enabling a feature for use on a gaming device may comprise indicating that the feature is allowed to be used on the gaming device, regardless of whether it is actually ever used. In some embodiments, an indication that a feature is permitted for use on one or more gaming devices and/or for use with one or more games may be stored in a data structure on a computer-readable medium (e.g., in a gaming device database).

In some embodiments, enabling a feature on a gaming device comprises providing appropriate instructions (e.g., in computer program code) to the gaming device that the gaming device may execute in order to provide the feature.

In some embodiments, if a feature is enabled, then a player is able to use the feature when playing a game on a gaming device. For example, a player may play a slot machine game in accordance with a particular feature if the feature is enabled for use on the slot machine.

According to some embodiments, a player may activate and/or deactivate one or more features on a gaming device. In some embodiments, a player may request that one or more features be made active on a gaming device. For example, the player may select an inactive feature (e.g., from a plurality of inactive features displayed to the player), making the feature active. In some embodiments, the player may select the feature to activate or deactivate in response to a displayed indication of the feature, such as a menu list of features available on the gaming device. According to some embodiments, a player may be able to select only features that are enabled for a game or gaming device; in other embodiments, the player may be able to select to activate a feature that is not yet enabled.

Apparatus and methods which, among other things, permits and enables various ways of displaying indications of available features to players and of allowing players to select features for play of a gaming device, and which are appropriate for use in accordance with the present invention are disclosed in pending U.S. patent application Ser. No. 10/419,478, filed Apr. 18, 2003, entitled "METHOD AND APPARATUS FOR ENABLING A PLAYER TO SELECT FEATURES ON A GAMING DEVICE", the entirety of which is incorporated herein by reference as part of the present disclosure. That application, for example, provides for a user interface enabling a player at a gaming device to activate quickly and easily the features that he would like to use on the gaming device.

In one or more embodiments of the present invention, the player may receive an offer to enable and/or use one or more features. In some embodiments, a player may be offered the use of one or more features in exchange for a fee or other consideration. In other embodiments, a player may pay a fee or provide other consideration in order to disable or deactivate a feature. Alternatively, a player may be able to activate and/or deactivate a feature on a gaming device free of charge.

A cost or fee associated with the use of a feature by a player may be based on many factors, including, but not limited to:
   (i) How long a player uses a feature. For example, a player may be charged $0.05 per minute while he uses an "Automatic Play" feature on a slot machine.
   (ii) How many times a player uses a feature. For example, a player may pay $0.50 each time he gets a winning outcome using a "Virtual Assistant" feature.
   (iii) One or more benefits (e.g., payouts) received by a player while using a feature. For example, a player may pay a tax of 5% of the value of his prizes won while a feature was active, in exchange for being able to use the feature on a gaming device.

According to some alternative embodiments, a player may not be able to select what feature(s) are in use for a game or gaming device. For example, the operation of a game or gaming device may be affected by a fixed set of one or more features (e.g., as established by a casino). In another example, once a feature is enabled it is put in use, and a player and/or a gaming device may not be able to deactivate the feature.

According to other embodiments, a gaming device or a server computer may make a feature active on the gaming device. For example, a casino may activate a gaming device enhancement that provides for the occasional displaying of offers for various products and services to players at a gaming device. In another example, a casino may activate a game enhancement that provides for the displaying of offers for products and services based on certain game events (e.g., upon the awarding of a payout exceeding a predetermined threshold).

According to one or more embodiments of the present invention, if two or more features are incompatible with one another or otherwise unsuitable for concurrent activation, then a player, a gaming device, or a computer (e.g., a slot server) may be prevented from selecting or otherwise activating one or more of the incompatible features. Information about the compatibility of a feature with one or more other features may be stored in a data structure (e.g., a feature database).

In one or more embodiments of the present invention, activating a feature on a gaming device includes one or more of, without limitation:
   (i) enabling a player to play a gaming device using the feature;
   (ii) enabling a player to play a gaming device in accordance with the feature;
   (iii) enabling a player to play a game on the gaming device using the feature;
   (iv) enabling a player to play a game in accordance with the feature (e.g., with modified outcomes, with a modified payout table);
   (v) enabling the player to access a service in accordance with the feature (e.g., for a feature that enhances the operation of a gaming device to provide access to a service);
   (vi) enabling the player to receive a product/service in accordance with the feature;
   (vii) enabling the player to access content in accordance with the feature;

(viii) enabling the player to achieve a modified outcome in accordance with the feature;
(ix) enabling the player to play the gaming device in accordance with modified outcome probabilities;
(x) enabling the player to achieve a modified payout amount in accordance with the feature; and
(xi) enabling the player to customize a game in accordance with the feature.

The scope of the present invention and embodiments thereof may be understood more fully with reference to the following figures. The leftmost (i.e. the most significant) digit(s) of a reference numeral typically identifies the figure in which the reference numeral first appears. It should be noted that the embodiments described with reference to the following figures are presented for illustrative purposes only and are not meant to be limiting in any sense. Further, although particular features of the present invention may be described with reference to one or more particular embodiments or figures, it should be understood that such features are not limited to usage in the one or more particular embodiments or figures with reference to which they are described.

Embodiments of the present invention will first be introduced by means of flowcharts that illustrate some basic processes that may be utilized by an entity practicing the present invention. The system infrastructure will then be described with reference to block diagrams of exemplary systems and devices that may be utilized by an entity practicing the present invention. Exemplary data structures illustrating tables that may be used when practicing some embodiments of the present invention will then be described, along with corresponding flowcharts that illustrate exemplary processes that utilize the exemplary tables.

Referring now to FIG. 1A, a flowchart illustrates a process 100A that is illustrative of some embodiments of the present invention. The process 100A includes a method for determining whether a feature should be enabled on a gaming device. The process 100A, and all other processes described herein unless expressly specified otherwise, may be performed by a gaming device, a computer (e.g., a slot server) in communication with the gaming device, a peripheral device in communication with a gaming device, a peripheral device server and for a combination thereof. Each of these devices is described in detail below. Further, the process 100A, and all other processes described herein unless expressly specified otherwise, may include steps in addition to those expressly depicted in the Figures or described in the specification without departing from the spirit and scope of the present invention. Similarly, the steps of process 100A and any other process described herein, unless expressly specified otherwise, may be performed in any practicable order including orders other than those depicted in the Figures or described in the specification, as appropriate.

Referring to step 105, a feature is determined. In step 110, the entity determines whether the determined feature should be enabled on at least one gaming device. In some embodiments the determination may comprise determining whether or not to enable a disabled feature. In other embodiments, the feature may already be enabled on one or more of the at least one gaming device, and the determination may thus comprise determining whether or not to keep the feature enabled (e.g., on those gaming devices on which it is already enabled).

Figure 1B:
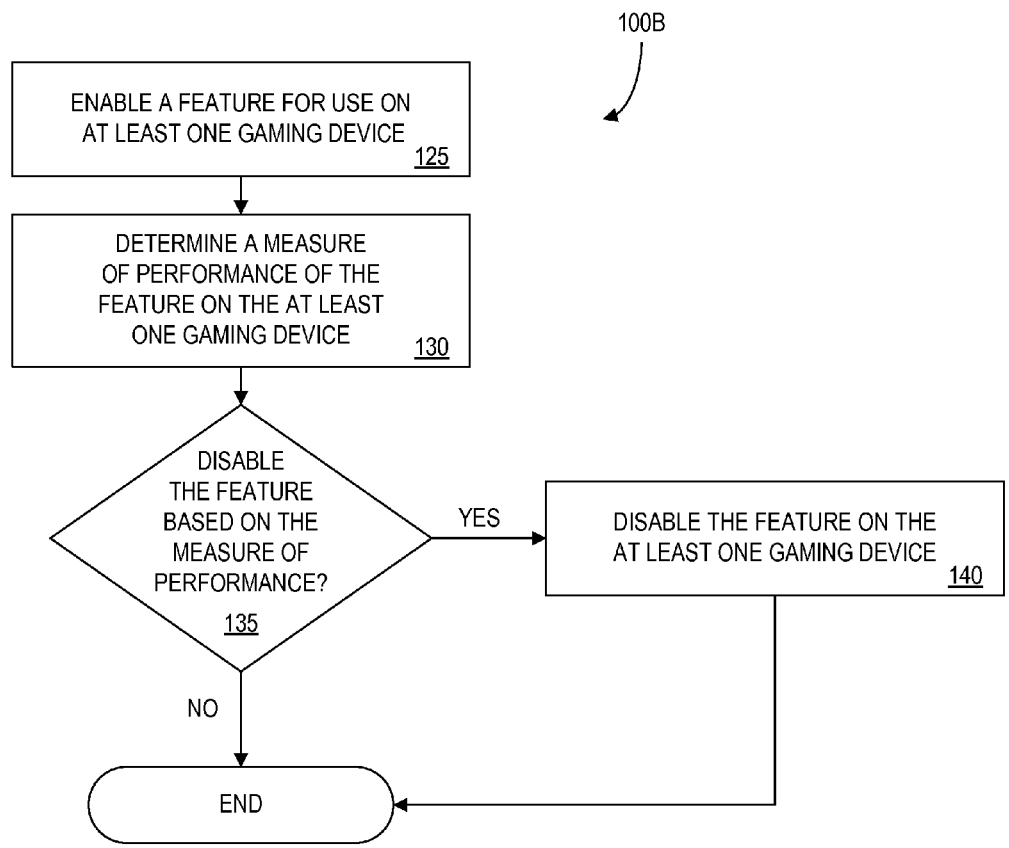
FIG. 1B is a flowchart depicting an exemplary process consistent with one or more embodiments of the present invention.

In some embodiments, determining whether a feature should be enabled may be based on a condition. FIG. 1D depicts a process, consistent with one or more embodiments of the present invention, in which a feature may be enabled based on whether a predetermined condition is satisfied.

It will be readily understood that determining whether a feature should be enabled may comprise determining whether the feature should be disabled. In some embodiments, determining whether a feature should be enabled may be based on a measure of performance of the feature. FIG. 1B depicts a process, consistent with one or more embodiments of the present invention, in which a measure of performance of a feature is determined and the feature may be disabled based on the measure of performance. Note that FIG. 1B and FIG. 1D illustrate only two possible methods for determining whether to enable (or whether to disable) a feature for use on a gaming device. Many other methods are possible.

A rule-based system appropriate for use in accordance with the present invention is disclosed in pending U.S. patent application Ser. No. 09/603,677, filed Jun. 26, 2000, entitled "METHOD AND APPARATUS FOR SELECTING A SUPPLEMENTAL PRODUCT TO OFFER FOR SALE DURING A TRANSACTION", the entirety of which is incorporated herein by reference as part of the present disclosure.

According to one or more embodiments of the present invention, a feature may be enabled or disabled for use on one or more gaming devices based on one or more rules. In some embodiments, such one or more rules may be associated with, for example, a predetermined condition, as described in FIG. 1D. In another embodiment, such one or more rules may be associated with the player who is operating a gaming device, with the owner of the gaming device, or with a provider of a feature. In yet another embodiment, the one or more rules may be associated with the gaming device that a player is operating (e.g., the same one or more rules is used to determine whether the feature should be enabled regardless of who the player is or what games may be available for use on the gaming device).

In yet another embodiment, the one or more rules may be selected randomly. In one exemplary method of selecting a rule randomly, a random number generated by a random number generator may be determined and a table of rules may be accessed in which each rule corresponds to a respective random number, or range of random numbers that may be generated by a random number generator.

As is known in the art, a rules-based system may be modified by an adaptive system in order to increase the performance of the rules-based system. An adaptive system which, among other things, may create its own rules and/or modifies rules in accordance with desired performance, and which is appropriate for use in accordance with the present invention is disclosed in pending U.S. patent application Ser. No. 09/993,228, filed Nov. 14, 2001, entitled "METHOD AND APPARATUS FOR DYNAMIC RULE AND/OR OFFER GENERATION", the entirety of which is incorporated herein by reference as part of the present disclosure. That application discloses an apparatus and method, which permits and enables rules-based applications (such as a system that provides customers with dynamically-priced upsell offers) to become "self improving" and thus increase performance over time.

Such an adaptive system can adjust at least some of the rules in accordance with at least one measure of performance of one or more features. For example, an adaptive system can modify rules such that features that have previously proven popular among players of slot machines after they receive a payout of over ten coins (e.g., as indicated by the number of times players have selected the feature within five minutes after receiving the payout) are made the subject of explicit offers to players at the time they receive such a payout. In another example, an adaptive system can modify rules such that features that have previously tended to generate less revenue on video poker machines during certain times of the day are disabled during those times. In yet another example, an adaptive system can modify rules such that when the theoretical win per minute of a group of slot machines has previously increased more since a first feature was enabled on the slot machines than since a second feature was enabled on the slot machines, the second feature is never enabled while that first feature is enabled. Various other types of measures of performance are described herein, and may be used in accordance with one or more embodiments of the present invention to provide for an adaptive rules-based system for determining whether one or more features should be enabled or disabled.

By allowing for the adjustment of one or more rules based on one or more measures of performance, some embodiments of the present invention may improve the profitability of gaming devices over time. In some embodiments of the present invention, as discussed herein, an operator of gaming devices may make payment to a provider of a feature based on usage of the feature. Accordingly, by making improvements to the rules effectively governing which features should be enabled or disabled in various circumstances, based on one or more measures of performance, the operator may reduce the enablement and/or usage of an under performing feature, thereby potentially reducing the amount owed to the feature's provider.

Some adjustments of the rules may be based on factors other than, or in addition to, one or more measures of performance. As discussed above, a rule for determining whether a feature should be enabled may be selected or generated at random from a table of rules. The effectiveness of the randomly-selected rule may then be evaluated in accordance with one or more measures of performance, further assisting the rule-based system in adapting to improve the performance of the system.

Referring again to process 100A (FIG. 1A), if the feature should be enabled, in step 115 the feature is enabled on the at least one gaming device. In some embodiments, enabling the feature may comprise storing an indication in a database (e.g., a software flag) and/or transmitting a signal to a gaming device or peripheral device. If the feature is already enabled, in some embodiments enabling the feature may comprise any operations necessary to keep the feature enabled, or to extend a period of time for which the feature is to be enabled.

Referring to step 120, if the feature should not be enabled, the feature is disabled on the at least one gaming device. It will be understood that in some embodiments disabling a feature may comprise one or more operations to disable a feature that is enabled, or may comprise any operations necessary to keep a feature disabled (e.g., if it is already disabled).

As depicted in FIG. 1A, in some optional embodiments some steps of the process 100A may be iterative. For example, after step 115 and/or after step 120, operation of the process may return (e.g., after a period of time, in response to a signal) to step 110 for determining whether the feature should be enabled. In this way, an entity may monitor and/or re-evaluate (e.g., periodically, intermittently, or at any time) whether the feature should be enabled on the at least one gaming device.

Referring now to FIG. 1B, a flowchart illustrates a process 100B that is consistent with one or more embodiments of the present invention. The process 100B is a method for disabling a feature based on the performance of an enabled feature. Referring to step 125, a feature is enabled for use on one or more gaming devices. In some embodiments, the feature may be enabled automatically based on any one or more of various predetermined conditions (e.g., if a player has wagered more than a predetermined amount within ten minutes, or in response to a received signal). In other embodiments, the feature may be enabled manually by or on behalf of an operator of a gaming device (e.g., by a casino representative operating a computer).

In step 130, a measure of performance of the feature on the at least one gaming device is determined. In some embodiments, determining a measure of performance of a feature comprises determining a measure of usage of the feature on a gaming device. FIG. 1D depicts a process, consistent with one or more embodiments of the present invention, in which a measure of usage of a feature is determined. Note that FIG. 1D illustrates only one possible method for determining a measure of performance. Other methods will be described herein, and still others will be apparent to those skilled in the art upon reading the present disclosure.

Referring again to process 100B (FIG. 1B), in step 135 it is determined whether the enabled feature should be disabled based on the measure of performance. If the feature should not be disabled, the process ends; otherwise, in step 140 the feature is disabled and the process ends.

Figure 1C:
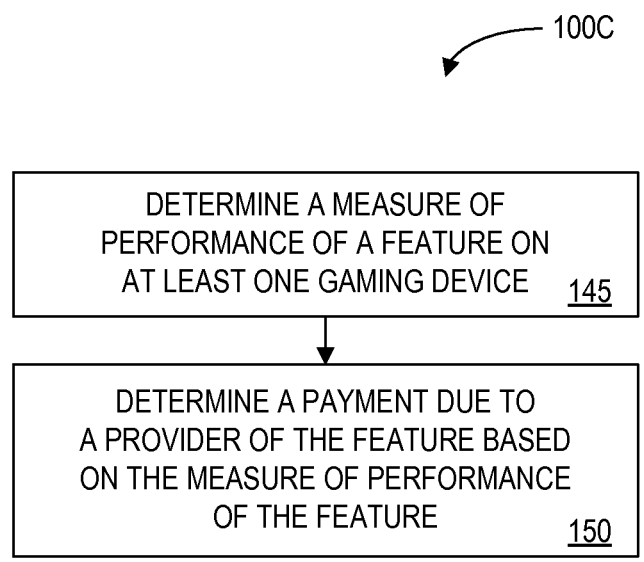
FIG. 1C is a flowchart depicting an exemplary process consistent with one or more embodiments of the present invention.
Figure 1D:
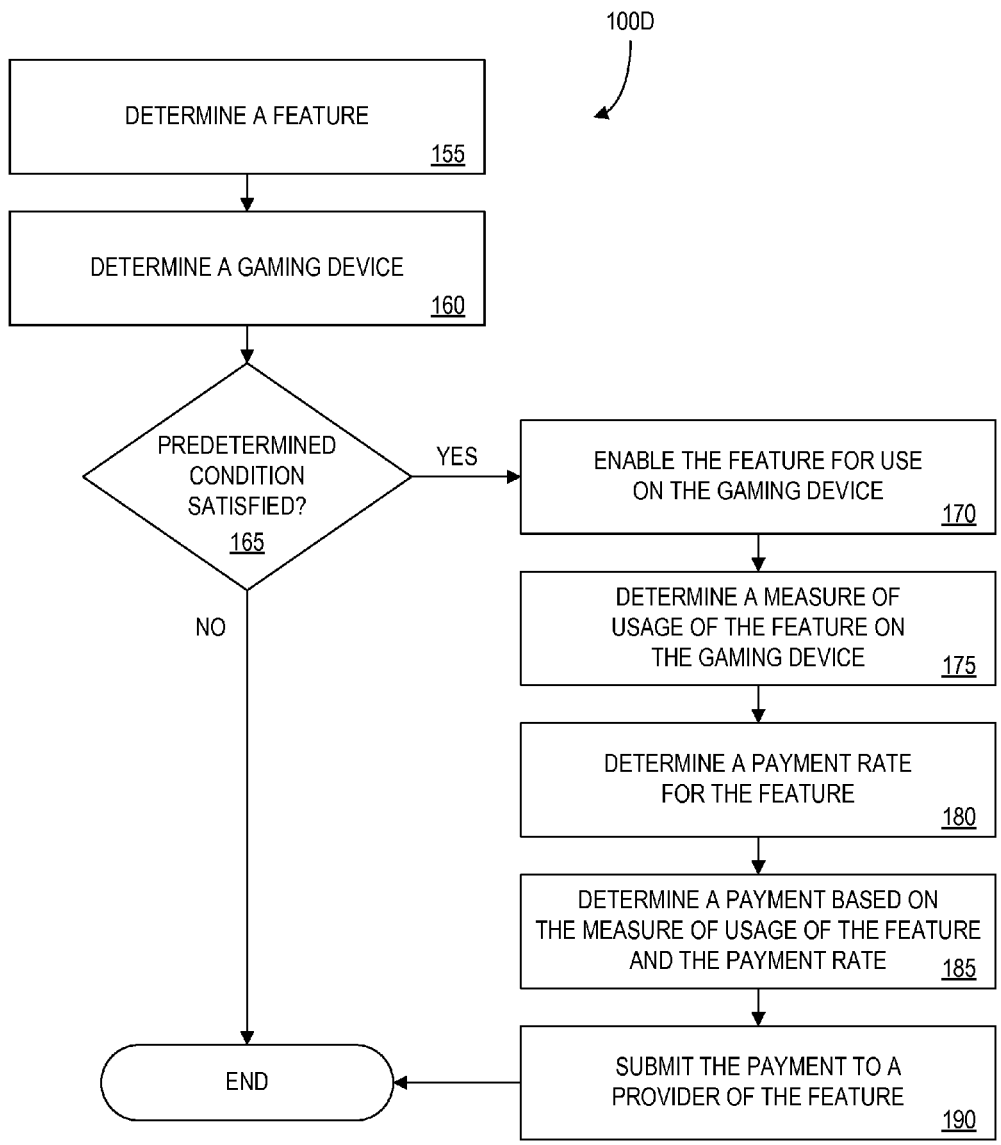
FIG. 1D is a flowchart depicting an exemplary process consistent with one or more embodiments of the present invention.

Referring now to FIG. 1C, a flowchart illustrates a process 100C that is consistent with one or more embodiments of the present invention. The process 100C is a method for determining a payment due to a provider of a feature. Referring to step 145, a measure of performance of a feature on at least one gaming device is determined. In some embodiments, determining the measure of performance comprises determining a measure of usage of a feature on a gaming device (e.g., an amount of coin-in, an amount of time that the feature was active on the gaming device, a transaction volume for accepted product/service offers that were provided to players in accordance with the feature).

In step 150, a payment due to a provider of the feature is determined, based on the measure of performance of the feature. In some embodiments, determining a payment comprises determining a payment rate associated with a feature. FIG. 1D depicts a process, consistent with one or more embodiments of the present invention, in which a measure of usage of a feature and a payment rate for a feature are determined, and a payment is determined based on the measure of usage and the payment rate.

Note that FIG. 1D illustrates only one possible method for determining a payment due to a provider of a feature. Some embodiments may include identifying one or more parties to whom payment is due, including one or more providers of the feature. Providers who may be owed payment (e.g., based on usage of the feature) include manufacturers of gaming devices or game manufacturers, holders of intellectual property related to a feature (e.g., holders of patents, trademarks, copyrights, or trade secrets), and licensors of a feature. Payment may be based on licensing, leasing, renting, or feature usage agreements between a provider (or providers) of a feature, game, or gaming device, and a casino or other owner, lessee, or operator of a gaming device. For example, a casino may agree to pay a provider of a feature 10% of the net profits obtained as a result of using a feature on a gaming device. In another example, a gaming manufacturer may be entitled to 1% of revenue generated at a gaming device while a feature is in use. In yet another example, a proprietor of a feature may be owed payment of $0.50 each time a feature is used on a gaming device. Other methods for determining payment will be described herein, and still others may be apparent to those skilled in the art upon reading the present disclosure.

Referring now to FIG. 1D, a flowchart illustrates a process 100D that is consistent with one or more embodiments of the present invention. The process 100D is a method for enabling a feature and determining a payment. Referring to step 155, a feature is determined. In step 160 a gaming device is determined. In step 165 it is determined whether a predetermined condition has been satisfied. The predetermined condition, in the context of process 100D, is a condition that must be satisfied in order for the feature determined in step 155 to be enabled on the gaming device determined in step 160.

Some of the various types of information on which predetermined conditions may be based, and which may be used to determine whether a predetermined condition is satisfied, are discussed herein and with reference to the accompanying figures. In some embodiments, for example, a predetermined condition will be related to information about the feature whose enablement is being determined. In other embodiments, the predetermined condition may be related to information about one or more other features. For example, a condition for enabling one feature on a gaming device may be satisfied if another feature has been used at that gaming device for more than a predetermined period of time.

Note that more than one predetermined condition may be available and/or necessary for satisfaction. In such embodiments, the process 100D may continue to step 170 if any one of a plurality of predetermined conditions is satisfied. Alternatively, a combination of predetermined conditions may each need to be satisfied in order for the process 100D to continue to step 170.

If it is determined, in step 165, that the predetermined condition has not been satisfied, the process 100D ends. If it is determined, on the other hand, that the condition has been satisfied, then the process 100D continues to step 170, in which the feature is enabled for use on the determined gaming device. In step 175, a measure of usage of the feature on the gaming device is determined. Various measures of usage are described herein. In some embodiments, for example, the measure of usage is an amount of coin-in at the gaming device while the feature is in use.

In step 180, a payment rate for the feature is determined. In step 185 a payment is determined based on the measure of usage of the feature and the payment rate. For example, a rate of $0.02 per minute the feature is active is determined (e.g., by accessing a payment database entry corresponding to the feature), and it is determined that the feature was active for a total of 2,034 minutes. Accordingly, a payment amount of $40.68 would be determined.

In step 190 the payment is submitted to a provider of the feature. In some embodiments, as described below, process 100D may further or alternatively include additional steps such as encoding the data representative of "the feature was active for 2,034 minutes" using an encryption key and outputting a code for transmission to the feature provider. For example, along with the $40.68, a twelve digit code encrypted using a public key and representative of 2,034 minutes may be provided to the licensor of the feature. Using the code, the licensor may then verify that the payment amount was reported accurately by decrypting the code using a private key. Payment may be submitted to a party in any manner well known in the art (e.g., by initiating an electronic transfer of funds), and need not be described in further detail. Process 100D terminates after submitting payment and/or providing the code to the licensor.

Applicants have recognized that the accumulation, storing, encrypting, and/or analysis of various types of information may be helpful in the management of features on gaming devices. Many types of information are discussed herein. Some types of information may be helpful, for example, in determining whether a feature should be enabled or disabled. Some types of information may be useful, for example, in determining a payment due to a provider of a feature. Some types of information, for example, may be useful for both determining whether a feature should be enabled or disabled and for determining a payment due to a provider of a feature. Some types of information may be useful in establishing rules in a rules-based system, and/or for establishing predetermined conditions.

Examples of types of information that may be helpful in managing features for use on one or more gaming devices and/or with one or more games include, but are not limited to:
(i) information about performance of one or more features;
(ii) information about usage of one or more features;
(iii) information about usage of one or more gaming devices;
(iv) information about profitability of one or more features;
(v) information about profitability of one or more gaming devices;
(vi) information about players, including information about the gambling activity of players;
(vii) information about offers provided to players in accordance with one or more features;
(viii) indications (e.g., signals) from various parties;
(ix) information about a casino or other establishment;
(x) information about one or more games;
(xi) information about one or more providers of features;
(xii) time-related conditions;
(xiii) authorization codes; and
(xiv) random numbers.

Other appropriate categories or types of information will be recognized by one of ordinary skill in the art after reading the present application. The types of information described herein are categorized for illustrative purposes only. Note that some information consistent with one or more embodiments of the present invention may reasonably be considered as related to or falling within two, more than two, or none of the categories of information described herein. Also, although information may be described as being related to a single entity (e.g., a player, a gaming device) for illustrative purposes only, one skilled in the art will understand that similar information related to a plurality of such entities (e.g., an aggregate revenue generated on all gaming devices, an average per gaming device) may also be used in accordance with one or more embodiments of the present invention.

A measure of performance, as used herein unless expressly indicated otherwise, may refer to a measure of performance of a feature and/or of a gaming device, and may include, but is not limited to, (i) one or more measures of usage of features and/or gaming devices; (ii) one or more measures of profitability of features and/or gaming devices, and/or (iii) variances in any such measures that may be correlated to the use or non-use of one or more features on a gaming device.

In some embodiments, a measure of performance may comprise an indication of a change in a particular measure (e.g., of usage, of profitability) related to a feature (or to a gaming device). For example, a measure of performance of a feature may be the determined increase in the number of players using a gaming device at which the feature is enabled, or an increase in the average amount that players wager at a gaming device on which the feature is enabled. In another example, an increase in the theoretical win per minute of a gaming device, during a period that started when a feature was enabled at the gaming device, may be a useful indicator in determining whether the feature should be enabled or disabled on the gaming device, as well as for determining whether the feature should be enabled or disabled on other gaming devices. For example, a condition may be established that if the increase is greater than a predetermined value, then the feature should be automatically enabled on other gaming devices of the same type.

Measures of usage, performance, and profitability are also convenient for determining payment due to providers of features. In another example, some features may enhance operation of gaming devices or of games in order to promote the fulfillment of certain types of goals, such as teaching players how to use a certain type of gaming device, or encouraging players to play gaming devices more quickly. Measures of performance of such features may thus include information related to the desired goals (e.g., an average wager size, an average rate of play).

Some examples of information that may facilitate the management of various features for use on one or more gaming devices (e.g., in determining whether a feature should be enabled on a gaming device) include, but are not limited to:

(i) An amount of revenue generated while a feature is in use;
(ii) An average amount wagered by a player (or players) while a feature is in use;
(iii) An average rate of play when a player is using a feature;
(iv) An average session theoretical win when a player is using a feature;
(v) A number of customer service complaints relating to a feature;
(vi) An average duration of a gaming session when a player is using a feature;
(vii) A number of machines at which a feature is active;
(viii) A percentage amount of machines at which a feature is active;
(ix) A number of times that a feature is used (e.g., within a period of time);
(x) An average number of times that a feature is used by a player;
(xi) A period of time that a feature is in use (e.g., in minutes or hours);
(xii) A period of time that one or more gaming devices are in use;
(xiii) A percentage amount of all gaming devices that are gaming devices on which a feature is in use;
(xiv) Which game(s) a feature is used with;
(xv) Which gaming device(s) (e.g., types of gaming devices) a feature is used with;
(xvi) What types of players use a feature (e.g., new players, old players, "high rollers");
(xvii) Information about features that are used concurrently with at least one other feature;
(xviii) A time of day when a feature is used (e.g., during peak hours, during the middle of the night);
(xix) A profit of a gaming device while a feature was in use;
(xx) An amount of revenue resulting from use of the feature;
(xxi) A profit from use of the feature (e.g., profit earned from accepted offers);
(xxii) A cost resulting from use of a feature (e.g., a cost associated with providing a service in accordance with a feature);
(xxiii) An increase (or decrease) in payout percentage (e.g., at one or more gaming devices;
(xxiv) An increase (or decrease) in theoretical win (e.g., at one or more gaming devices)
(xxv) An increase (or decrease) in an amount of revenue generated at an ancillary merchant, establishment or enterprise related to an offer (e.g., revenue generated at a restaurant sponsoring a dinner offer that is provided in accordance with a feature)
(xxvi) A value of a benefit (e.g., money) paid to a player (e.g., money paid to a player by sponsors, such as if a player performs one or more value-added activities);
(xxvii) An amount of revenue generated at one or more gaming devices near a gaming device at which a feature is used (e.g., if a features makes play so entertaining that it makes players move to one area of the casino);
(xxviii) A number or value of comps received by a player (e.g., playing a feature-enabled gaming device);
(xxix) A percentage of funds stored with a server (e.g., due to interest);
(xxx) A player's rate of play while a feature is in use;
(xxxi) An increase or decrease in a player's rate of play (e.g., comparing play with a feature enabled and play without the feature enabled);
(xxxii) A number of offers accepted or rejected by a player (e.g., for a feature that makes offers to a player);
(xxxiii) A percentage of offers that are rejected/that are accepted;
(xxxiv) An increase or decrease in the amount of coin-in by a player (e.g., comparing play with a feature enabled and play without the feature enabled);
(xxxv) An increase or decrease in the (average) session length of a player (e.g., comparing feature-enabled play and non-enhanced play);
(xxxvi) An increase or decrease in the percentage of time a player spends gambling during a casino visit (e.g., comparing feature-enabled play and non-enhanced play);
(xxxvii) Whether a player signs up for a player tracking card;
(xxxviii) A number of players who sign up for player tracking cards;
(xxxix) How often a feature is used (e.g., whether the number of times a feature is used on a gaming device (or gaming devices) each day is greater than a predetermined number of times);
(xl) A period of time for which a feature is used by a player (or players) (e.g., for determining whether the period of time that a player used a feature was less than five minutes, or whether the average period of time that players use a feature is less than two hours);
(xli) What type(s) of games the feature is used with (e.g., for determining whether the feature is used with games on bonus round slot machines, or with video poker machines);
(xlii) What type(s) of gaming devices the feature is used with (e.g., for determining whether the feature is used on machines in the smoking section);
(xliii) What type(s) of players use the feature (e.g., for determining whether a predetermined minimum number of novice players have used the feature); and
(xliv) A number of different players who have used the feature (e.g., for determining whether a predetermined minimum number of unique players have used the feature).

Other types of information useful in managing features will be recognized by one of ordinary skill in the art after reading the present application.

Although measures related to usage of a feature (e.g., information related to behavior of players at a gaming device while a feature was actually active or in use) are discussed frequently herein as useful measures of performance of a feature, it will be understood that a useful measure of performance may be related to activity at a gaming device while a feature is merely enabled for use on the gaming device, regardless of whether the feature is ever used or activated by a player. For example, a player may be attracted to a gaming device at which a particular feature is enabled for use (and may as a result spend longer playing the gaming device), simply because the particular feature is available to the player, or may be offered to or activated for the player, even if the player does not use the feature most of the time or even at all. In other words, some players may choose to play a gaming device at which particular features are enabled over another gaming device lacking the features, even if the player does not take advantage of the features' enhancements.

Figure 2A:
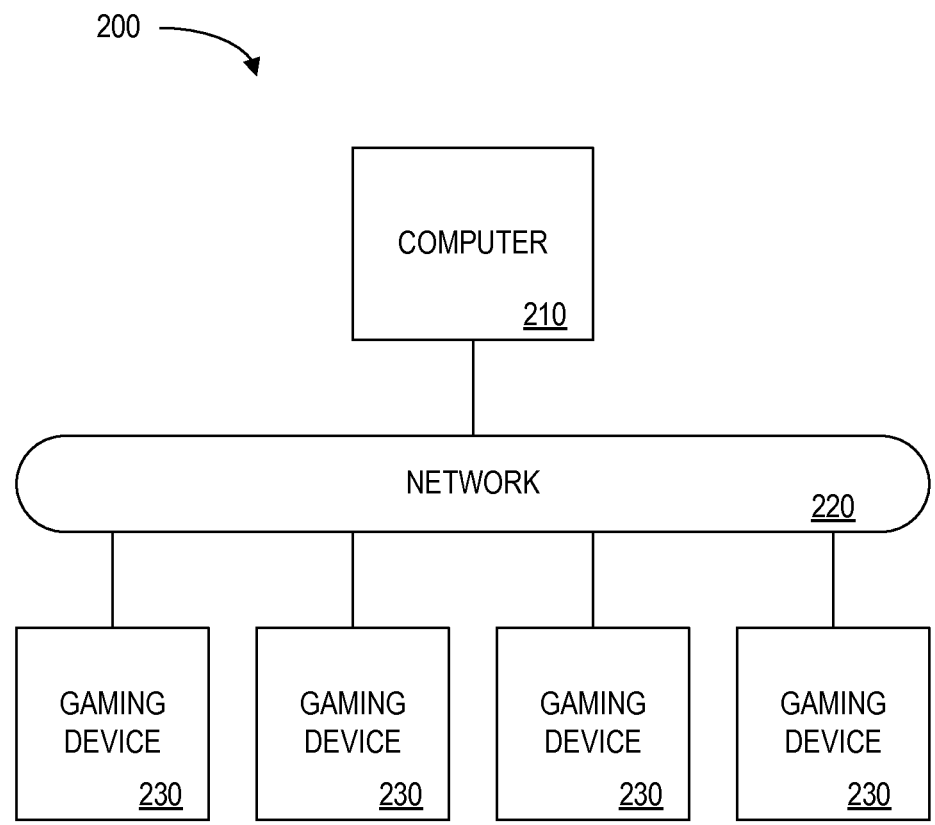
FIG. 2A is a block diagram of an exemplary system consistent with one or more embodiments of the present invention.

Referring now to FIG. 2A, a block diagram of a system 200 according to at least some embodiments of the present invention includes a computer 210 (e.g., a slot server of a casino) that is in communication, via a communications network 220, with one or more gaming devices 230 (e.g., slot machines, video poker machines). The computer 210 may communicate with the devices 230 directly or indirectly, via a wired or wireless medium such as the Internet, LAN, WAN or Ethernet, Token Ring, or via any appropriate communications means or combination of communications means. Each of the devices 230 may comprise computers, such as those based on the INTEL® PENTIUM® processor, that are adapted to communicate with the computer 210. Any number and type of devices 230 may be in communication with the computer 210.

Communication between the devices 230 and the computer 210, and among the devices 230, may be direct or indirect, such as over the Internet through a Web site maintained by computer 210 on a remote server or over an on-line data network including commercial on-line service providers, bulletin board systems and the like. In yet other embodiments, the devices 230 may communicate with one another and/or computer 210 over RF, cable TV, satellite links and the like.

Some, but not all, possible communication networks that may comprise network 220 or be otherwise part of system 200 include: a local area network (LAN), a wide area network (WAN), the Internet, a telephone line, a cable line, a radio channel, an optical communications line, a satellite communications link. Possible communications protocols that may be part of system 200 include: Ethernet (or IEEE 802.3), SAP, ATP, Bluetooth™ and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In some embodiments, the computer 210 may not be necessary and/or preferred. For example, the present invention may, in one or more embodiments, be practiced on a stand-alone gaming device 230 and/or a gaming device 230 in communication only with one or more other gaming devices 230. In such an embodiment, any functions described as performed by the computer 210 or data described as stored on the computer 210 may instead be performed by or stored on one or more gaming devices 230.

Figure 2B:
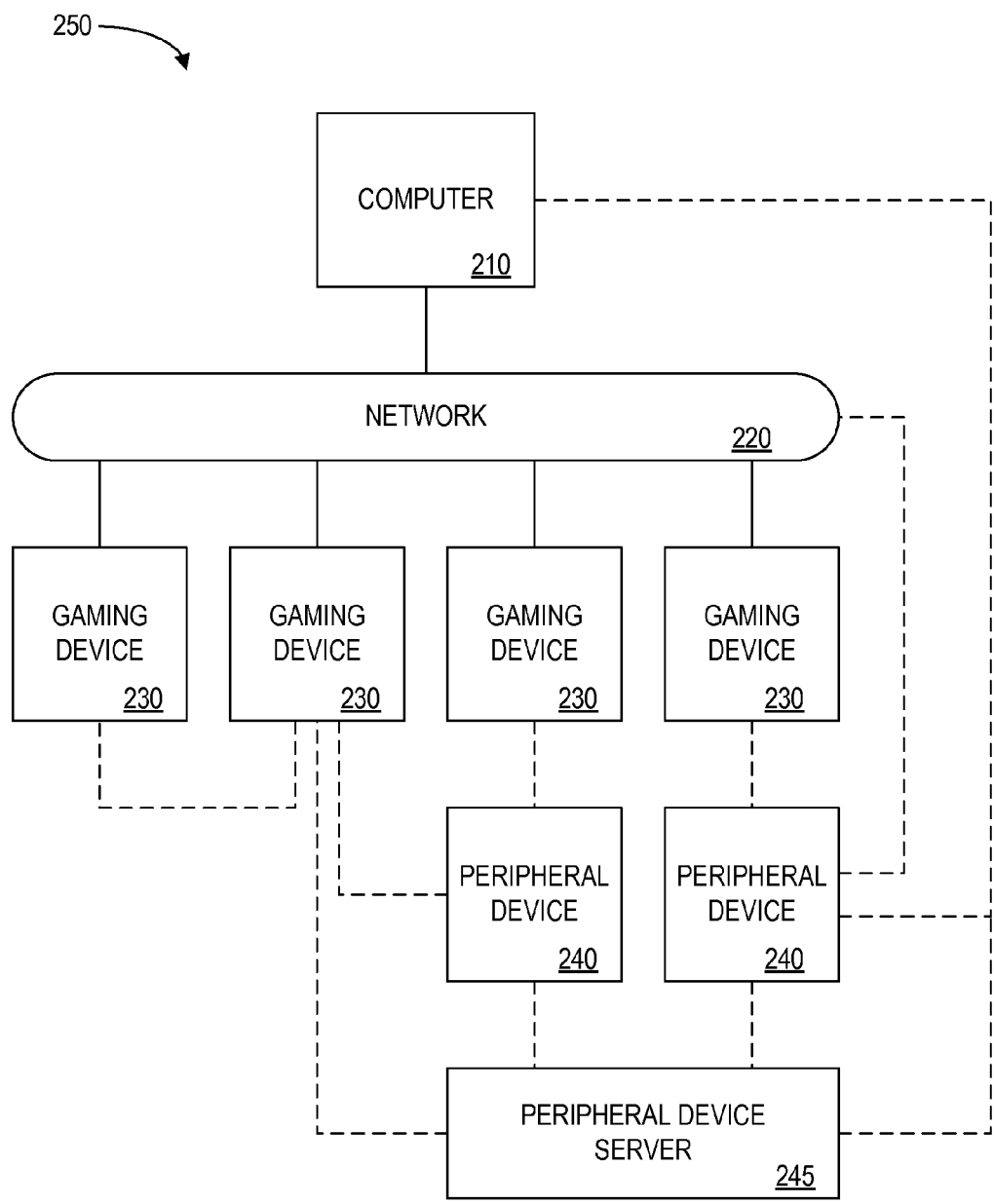
FIG. 2B is a block diagram of another exemplary system consistent with one or more embodiments of the present invention.

Referring now to FIG. 2B, a block diagram of another system 250 according to at least some embodiments of the present invention includes a computer 210 (e.g., a slot server of a casino) that is in communication, via a communications network 220, with one or more gaming devices 230 (e.g., slot machines, video poker machines). A difference between system 200 (FIG. 2A) and system 250 (FIG. 2B) is that in system 250 at least one gaming device 230 is also in communication with one or more peripheral devices 240. A peripheral device 240 may, in turn, be in communication with a peripheral device server 245 and, in some embodiments, with computer 210. In one or more embodiments the peripheral device server 245 may be in communication with one or more gaming devices 240 and/or computer 210.

The computer 210 may communicate with the devices 230 and devices 240 directly or indirectly, via a wired or wireless medium such as the Internet, LAN, WAN or Ethernet, Token Ring, or via any appropriate communications means or combination of communications means. For example, the computer 210 may communicate directly with one of the gaming devices 230 (e.g., via a LAN) and indirectly (e.g., via a gaming device 230) with a peripheral device 240. In another example, the computer 210 may communicate with one of the gaming devices 230 via a LAN and with another of the gaming devices 230 via the Internet (e.g., if the particular gaming device comprises a personal computer in communication with an online casino).

Each of the devices 230 and the devices 240 may comprise computers, such as those based on the INTEL® PENTIUM® processor, that are adapted to communicate with the computer 210. Further, each of the devices 230 may comprise a gaming device such as a mechanical or electronic slot machine, a video poker machine, a video blackjack machine, a video keno machine, a pachinko machine, a video roulette machine, and/or a lottery terminal. Further yet, each of the devices 240 may comprise an external or internal module associated with one or more of the gaming devices 230 that is capable of communicating with one or more of the gaming devices 230 and of directing the one or more gaming devices 230 to perform one or more functions. Any number of devices 230 may be in communication with the computer 210. Any number and type of peripheral devices 240 may be in communication with a gaming device 230, peripheral device server 245 and computer 210.

Communication between the devices 230 and the computer 210, between the devices 230 and devices 240, between peripheral device server 245 and the devices 240 and/or the devices 230, between the peripheral device server 245 and computer 210, among the devices 230, and among the devices 240 may be direct or indirect, such as over the Internet through a Web site maintained by computer 210 on a remote server or over an on-line data network including commercial on-line service providers, bulletin board systems and the like. In yet other embodiments, any and all of the devices of system 250 (i.e., the devices 230, the devices 240, the computer 210, and the peripheral device server 245) may communicate with one another over RF, cable TV, satellite links and the like.

Some, but not all, possible communication networks that may comprise network 220 or otherwise be part of system 250 include: a local area network (LAN), a wide area network (WAN), the Internet, a telephone line, a cable line, a radio channel, an optical communications line, a satellite communications link. Possible communications protocols that may be part of system 250 include: Ethernet (or IEEE 802.3), SAP, ATP, Bluetooth™, and TCP/IP. Communication may be encrypted to ensure privacy and prevent fraud in any of a variety of ways well known in the art.

In some embodiments, the computer 210 may not be necessary and/or preferred. For example, the present invention may, in one or more embodiments, be practiced on a stand-alone gaming device 230, one or more gaming devices in communication with one or more peripheral devices 240, one or more gaming devices in communication with peripheral device server 245, one or more peripheral devices 240 in communication with peripheral device server 245, and/or a gaming device 230 in communication only with one or more other gaming devices 230. In such an embodiment, any functions described as performed by the computer 210 or data described as stored in a memory of the computer 210 may instead be performed by or stored on one or more gaming devices 230, one or more peripheral devices 240, and/or peripheral device server 245.

Similarly, peripheral device server 245 may not be desired and/or needed in some embodiments of the present invention. In embodiments that do not involve peripheral device server 245, any or all of the functions described herein as being performed by peripheral device server 245 may instead be performed by computer 210, one or more gaming devices 230, one or more peripheral devices 240, or a combination thereof. Similarly, in embodiments that do not involve peripheral device server 245 any data described herein as being stored in a memory of peripheral device server 245 may instead be stored in a memory of computer 210, one or more gaming devices 230, one or more peripheral devices 240, or a combination thereof.

Any or all of the gaming devices 230 may, respectively, include or be in communication with a peripheral device 240. A peripheral device 240 may be a device that receives information from (and/or transmits information to) one or more gaming devices 230. For example, a peripheral device 240 may be operable to receive information about games being played on a gaming device 230, such as the initiation of a game and/or a random number that has been generated for a game, and/or may be operable to receive information about features enabled or in use on the gaming device 230.

In one or more embodiments, one or more such peripheral devices 240 may be in communication with a peripheral device server 245. This allows the peripheral device server 245 to receive information regarding a plurality of games being played on a plurality of gaming devices 230. The peripheral device server 245, in turn, may be in communication with the computer 210. It should be understood that any functions described herein as performed by a peripheral device 240 may also or instead be performed by the peripheral device server 245. Similarly, any data described herein as being stored on or accessed by a peripheral device 240 may also or instead be stored on or accessed by the peripheral device server 245.

A peripheral device 240 may be operable to access a database (e.g., of peripheral device server 245) to provide benefits (e.g., cashless gaming receipts) based on, for example, an active feature of a gaming device 230. A peripheral device 240 may also be operable to access a database (e.g., a feature database, as described in more detail below) to determine a product/services offer to output on a gaming device (e.g., in accordance with an active feature).

The peripheral device server 245 may also monitor player gambling history over time by associating gambling behavior with player identifiers, such as player tracking card numbers. For example, in embodiments wherein a player selects which feature is to be active, the peripheral device server 245 may track which feature the player has previously selected and subsequently use that information to present other offers for features to the player and/or to output other information to the player. Further, information about the player obtained or accessed by peripheral device server 245 may be analyzed, e.g., to identify those players that a particular gaming machine owner, operator, or manufacturer finds most desirable. Based upon desired objectives, the peripheral device server 245 may direct the appropriate peripheral device 240 to issue customized messages to specific players that are relevant to their gambling behaviors.

Information received by a peripheral device 240 from a gaming device 230 may include gambling data such as number of games initiated per unit of time, outcomes displayed for games initiated, payouts corresponding to outcomes displayed, a credit meter balance of the gaming device, and/or data associated with the player currently playing the gaming device 230.

The functions described herein as being performed by a peripheral device server 245 and/or a peripheral device 240 may, in one or more embodiments, be performed by the computer 210 (in lieu of or in conjunction with being performed by a peripheral device server 245 and/or a peripheral device 240). Such functions may be performed by computer 210 in either system 200 (FIG. 2A) or system 250 (FIG. 2B).

In one or more embodiments, a peripheral device 240 may be useful for implementing the embodiments of the present invention into the operation of a conventional gaming device. For example, in order to avoid or minimize the necessity of modifying or replacing a program already stored in a memory of a conventional gaming device, an external or internal module that comprises a peripheral device 240 may be inserted in or associated with the gaming device.

Thus, for example, a peripheral device 240 may be utilized to monitor play of the gaming device and enhance or otherwise affect play in accordance with one or more active features. In such embodiments the gaming device 230 with which the peripheral device 240 is in communication with may continue to operate conventionally (e.g., as if features were not active). In such embodiments, for example, if the feature includes the offering of products or services to players, or the displaying of video content, operation of the gaming device 230 may continue conventionally. The peripheral device 240, however, may output one or more offers. The peripheral device 240 may also output messages to the player (e.g., such as "Would you like to play in Reverse Payout Mode?"). The peripheral device 240 may also provide benefits to a player (e.g., coins, tokens, electronic credits, paper receipts exchangeable for cash, services, and/or merchandise).

Accordingly, a peripheral device 240 may include (i) a communications port (e.g., for communicating with one or more gaming devices 230, peripheral device server 245, another peripheral device 240, and/or computer 210); (ii) a display (e.g., for displaying messages and/or outcomes), (iii) another output means (e.g., a speaker, light, or motion device to communicate with a player), and/or (iv) a benefit providing means (e.g., a printer and paper dispensing means, a credit meter, and/or a hopper and hopper controller).

In one or more embodiments, the peripheral device may not output outcomes and/or messages to a player but may instead direct the processor of a gaming device to perform such functions. For example, a program stored in a memory of peripheral device 240 may cause a processor of a gaming device to perform certain functions. For example, a program stored in a memory of peripheral device 240 may cause a processor of a gaming device to provide for enhanced play of the gaming device in accordance with one or more enabled features, by modifying how the gaming device outputs an outcome, determines an outcome, outputs a message, provides a benefit, and/or displays game information.

Figure 3:
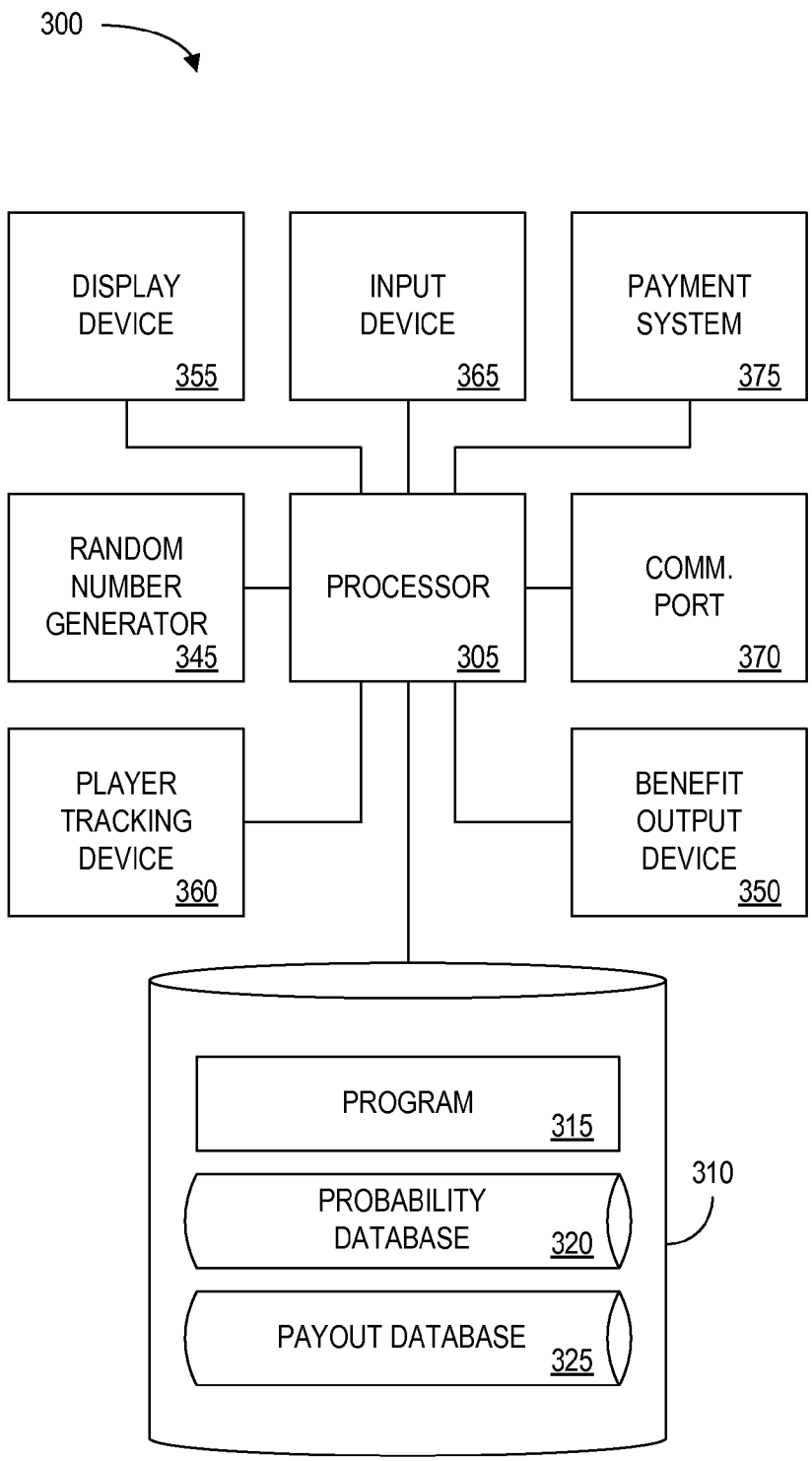
FIG. 3 is a block diagram of an exemplary computer consistent with one or more embodiments of the present invention.

Referring now to FIG. 3, illustrated therein is a block diagram of an embodiment 300 of a gaming device. The gaming device 300 may be implemented as a system controller, a dedicated hardware circuit, an appropriately programmed general-purpose computer, or any other equivalent electronic, mechanical or electro-mechanical device. The gaming device 300 may comprise, for example, a slot machine, a video poker terminal, a video blackjack terminal, a video keno terminal, a video lottery terminal, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g., a personal digital assistant or NINTENDO® GAMEBOY®). The gaming device 300 may comprise any or all of the gaming devices 230 of system 200 (FIG. 2A) or system 250 (FIG. 2B). In some embodiments, a user device such as a PDA or cell phone may be used in place of, or in addition to, some or all of the gaming device 300 components depicted in FIG. 3. Further, a gaming device may comprise a personal computer or other device operable to communicate with an online casino and facilitate game play at the online casino. In one or more embodiments, the gaming device 300 may comprise a computing device operable to execute software that simulates play of a reeled slot machine game, video poker game, video blackjack game, video keno game, video roulette game, or lottery game.

The gaming device 300 comprises a processor 305, such as one or more INTEL®PENTIUM® processors. The processor 305 is in communication with a memory 310 and a communications port 370 (e.g., for communicating with one or more other devices). The memory 310 may comprise an appropriate combination of magnetic, optical and/or semiconductor memory, and may include, for example, Random Access Memory (RAM), Read-Only Memory (ROM), a compact disc, tape drive, and/or a hard disk. The memory 310 may comprise or include any type of computer-readable medium. The processor 305 and the memory 310 may each be, for example: (i) located entirely within a single computer or other device; or (ii) connected to each other by a remote communication medium, such as a serial port cable, telephone line or radio frequency transceiver. In some embodiments, the gaming device 300 may comprise one or more devices that are connected to a remote server computer for maintaining databases.

The memory 310 stores a program 315 for controlling the processor 305. The processor 305 performs instructions of the program 315, and thereby operates in accordance with the present invention, and particularly in accordance with the methods described in detail herein. The program 315 may be stored in a compressed, uncompiled and/or encrypted format. The program 315 furthermore includes program elements that may be necessary, such as an operating system, a database management system and "device drivers" for allowing the processor 305 to interface with computer peripheral devices. Appropriate program elements are known to those skilled in the art, and need not be described in detail herein.

The term "computer-readable medium" as used herein refers to any medium that participates in providing instructions to processor 305 (or any other processor of a device described herein) for execution. Such a medium may take many forms, including but not limited to, non-volatile media, volatile media, and transmission media. Non-volatile media include, for example, optical or magnetic disks, such as memory 310. Volatile media include dynamic random access memory (DRAM), which typically constitutes the main memory. Transmission media include coaxial cables, copper wire and fiber optics, including the wires that comprise a system bus coupled to the processor 305. Transmission media can also take the form of acoustic, electromagnetic, or light waves, such as those generated during radio frequency (RF), microwave, and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor 305 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 300 (or, e.g., a computer 210) can receive the data on the telephone line and use an infrared transmitter to convert the data to an infrared signal. An infrared detector can receive the data carried in the infrared signal and place the data on a system bus for processor 305. The system bus carries the data to main memory, from which processor 200 retrieves and executes the instructions. The instructions received by main memory may optionally be stored in memory 310 either before or after execution by processor 305. In addition, instructions may be received via communication port 370 as electrical, electromagnetic or optical signals, which are exemplary forms of carrier waves that carry data streams representing various types of information. Thus, the gaming device 300 may obtain instructions in the form of a carrier wave.

According to some embodiments of the present invention, the instructions of the program 315 may be read into a main memory from another computer-readable medium, such from a ROM to RAM. Execution of sequences of the instructions in program 315 causes processor 305 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to system 250 of FIG. 2B, execution of sequences of the instructions in a program of a peripheral device 240 in communication with gaming device 300 may also cause processor 305 to perform some of the process steps described herein.

The memory 310 also stores a plurality of databases, including a probability database 320, and a payout database 325. Note, although these databases are described as being stored in a gaming device, in other embodiments of the present invention some or all of these databases may be partially or wholly stored in another device, such as one or more of the peripheral devices 240, the peripheral device server 245 and/or the computer 210. Further, some or all of the data described as being stored in the databases 320, 325 may be partially or wholly stored (in addition to or in lieu of being stored in the memory 310 of the gaming device 300) in a memory of one or more other devices, such as one or more of the peripheral devices 240, another gaming device 230, the peripheral device server 245 and/or the computer 210.

The databases 320 and 325 are well known in the art, and need not be described in detail herein. Also, some enabled games may not require probability database 320 and/or payout database 325. The processor 305 is also operable to communicate with a random number generator 345, which may be a component of gaming device 300. The random number generator, in accordance with at least some embodiments of the present invention, may generate data representing random or pseudo-random values (referred to as "random numbers" herein). The random number generator may generate a random number every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use.

A random number generator, as used herein, may be embodied as a processor separate from but working in cooperation with processor 305. Alternatively, random number generator 345 may be embodied as an algorithm, program component, or software stored in the memory of gaming device 300 and used to generate a random number.

Note that, although the generation or obtainment of a random number is described herein as involving a random number generator of a gaming device, other methods of determining a random number may be employed. For example, a gaming device owner or operator may obtain sets of random numbers that have been generated by another entity. HOT-BITS™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 305 is also operable to communicate with a benefit output device 350, which may be a component of gaming device 300. The benefit output device 350 may comprise one or more devices for outputting a benefit to a player of the gaming device 300. For example, in some embodiments the gaming device 300 may provide coins and/or tokens as a benefit. In such an embodiment the benefit output device 350 may comprise a hopper and hopper controller, for dispensing coins and/or tokens into a coin tray of the gaming device 300. In another example, the gaming device 300 may provide a receipt or other document on which there is printed an indication of a benefit (e.g., a cashless gaming receipt that has printed thereon a monetary value, which is redeemable for cash in the amount of the monetary value). In such an embodiment the benefit output device 350 may comprise a printing and document dispensing mechanism. In yet another example, the gaming device 300 may provide electronic credits as a benefit (which, e.g., may be subsequently converted to coins and/or tokens and dispensed from a hopper into a coin tray). In such an embodiment the benefit output device 350 may comprise a credit meter balance and/or a processor that manages the amount of electronic credits that is indicated on a display of a credit meter balance. The processor may be the processor 305 or another processor. In yet another example, the gaming device 300 may credit a monetary amount to a financial account associated with a player as a benefit provided to a player. The financial account may be, for example, a credit card account, a debit account, a charge account, a checking account, or a casino account. In such an embodiment the benefit output device may comprise a device for communicating with a server on which the financial account is maintained.

Note that, in one or more embodiments, the gaming device 300 may include more than one benefit output device 350 even though only one benefit output device is illustrated in FIG. 3. For example, the gaming device 300 may include both a hopper and hopper controller combination and a credit meter balance. Such a gaming device may be operable to provide more than one type of benefit to a player of the gaming device. A single benefit output device 350 may be operable to output more than one type of benefit. For example, a benefit output device 350 may be operable to increase the balance of credits in a credit meter and communicate with a remote device in order to increase the balance of a financial account associated with a player.

The processor 305 is also operable to communicate with a display device 355, which may be a component of gaming device 300. The display device 355 may comprise, for example, one or more display screens or areas for outputting information related to game play on the gaming device, such as a cathode ray tube (CRT) monitor, liquid crystal display (LCD) screen, or light emitting diode (LED) screen.

In one or more embodiments, a gaming device may comprise more than one display device. For example, a gaming device may comprise an LCD display for displaying electronic reels and a display area that displays rotating mechanical reels.

The processor 305 may also be in communication with one or more other devices besides the display device 355, for outputting information (e.g., to a player or another device). Such other one or more output devices may also be components of gaming device 300. Such other one or more output devices may comprise, for example, an audio speaker (e.g., for outputting an offer for a feature or information related thereto, in addition to or in lieu of such information being output via a display device 355), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include, but are not limited to, a cathode ray tube (CRT) monitor on a video poker machine, a bell on a gaming device (e.g., rings when a player wins), an LED display of a player's credit balance on a gaming device, and an LCD display of a personal digital assistant (PDA).

The display device 355 may comprise, for example, one or more display areas. For example, one of the display areas may display outcomes of games played on the gaming device (e.g., electronic reels of a gaming device). Another of the display areas may display rules for playing a game of the gaming device. Yet another of the display areas may display the benefits obtainable by playing a game of the gaming device (e.g., in the form of a payout table). In one or more embodiments, the gaming device 300 may include more than one display device, one or more other output devices, or a combination thereof (e.g., two display devices and two audio speakers).

The processor 305 is also in communication with an input device 365, which is a device that is capable of receiving an input (e.g., from a player or another device) and which may be a component of gaming device 300. An input device may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from with a second gaming device or another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 305 is also in communication with a payment system 375, which may be a component of gaming device 300. The payment system 375 is a device capable of accepting payment from a player (e.g., a bet or initiation of a balance) and/or providing payment to a player (e.g., a payout). Payment is not limited to money, but may also include other types of consideration, including products, services, and alternate currencies.

Exemplary methods of accepting payment by the payment system 375 include (i) receiving hard currency (i.e., coins or bills), and accordingly the payment system 375 may comprise a coin or bill acceptor; (ii) receiving an alternate currency (e.g., a paper cashless gaming voucher, a coupon, a non-negotiable token), and accordingly the payment system 375 may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

In some embodiments, a player may operate a plurality of gaming devices. For example, a player may simultaneously play two side-by-side gaming devices, a player may play one gaming device (e.g. a gaming device) and then continue his gaming session at another gaming device (e.g. a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In some embodiments, a gaming device may allow a player to play a game of skill rather than a game of chance. Such an embodiment may be more appealing to certain players or may be permitted in areas where it is illegal to gamble on games of chance.

Figure 4:
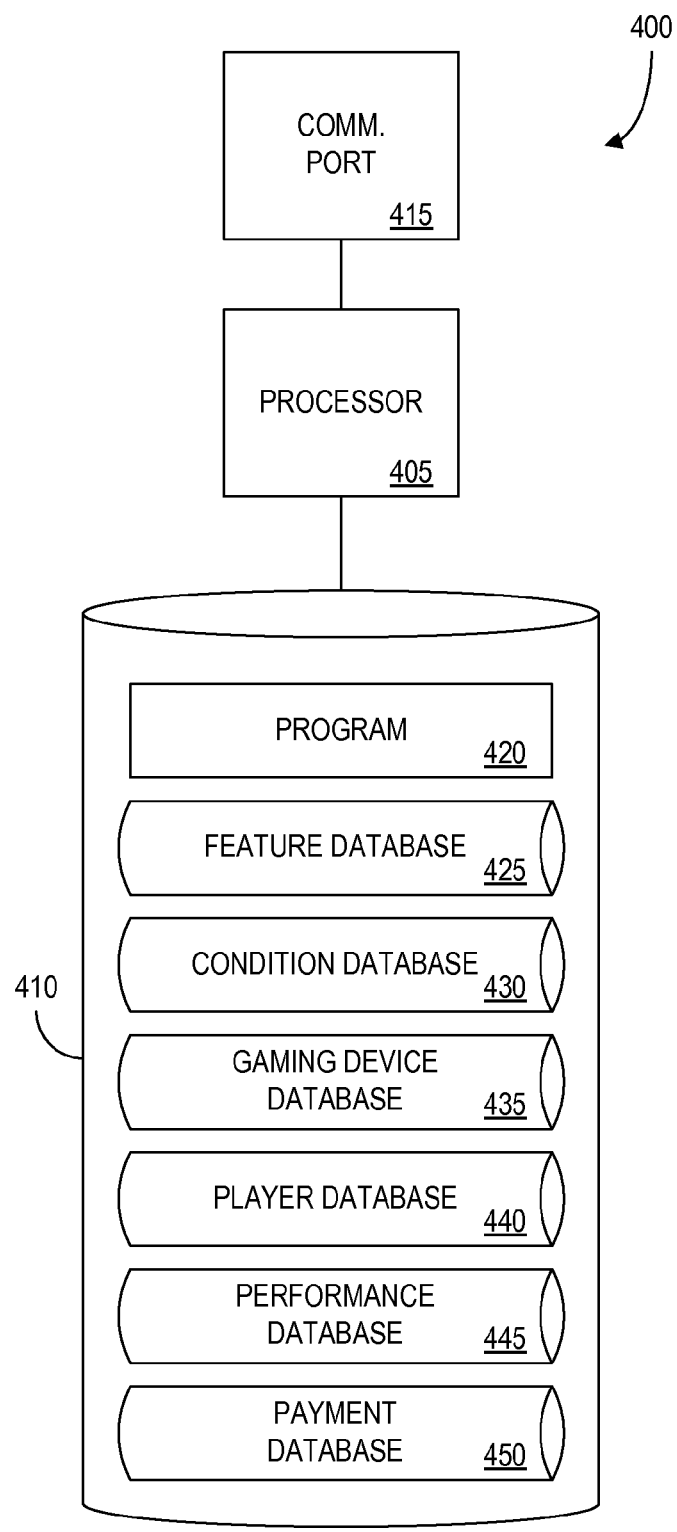
FIG. 4 is a block diagram of an exemplary gaming device consistent with one or more embodiments of the present invention.

Referring now to FIG. 4, illustrated therein is a block diagram of an embodiment 400 of computer 210 (FIG. 2A and FIG. 2B). The computer 400 may be implemented as a system controller, a dedicated hardware circuit, an appropriately programmed general-purpose computer, or any other equivalent electronic, mechanical or electro-mechanical device. The computer 400 may comprise, for example, a server computer operable to communicate with one or more client devices, such as gaming devices 230. The computer 400 is operative to manage the system 200 and the system 250 and execute the methods of the present invention.

In operation, the computer 400 may function under the control of a casino, a merchant, or other entity that may also control use of the gaming devices 230, peripheral devices 240, and/or peripheral device server 245. For example, the computer 400 may be a slot server in a casino. In some embodiments, the computer 400 and slot server may be different devices. In some embodiments, the computer 400 may comprise more than one computer operating together. In some embodiments, the computer 400 and peripheral device server 245 may be the same device.

The computer 400 comprises a processor 405, such as one or more INTEL® PENTIUM® processors. The processor 405 is in communication with a memory 410 and a communications port 415 (e.g., for communicating with one or more other devices). The memory 410 may comprise an appropriate combination of magnetic, optical and/or semiconductor memory, and may include, for example, Random Access Memory (RAM), Read-Only Memory (ROM), a compact disc and/or a hard disk. The processor 405 and the memory 410 may each be, for example: (i) located entirely within a single computer or other device; or (ii) connected to each other by a remote communication medium, such as a serial port cable, telephone line or radio frequency transceiver. In some embodiments, the computer 400 may comprise one or more devices that are connected to a remote server computer for maintaining databases.

The memory 410 stores a program 420 for controlling the processor 405. The processor 405 performs instructions of the program 420, and thereby operates in accordance with the present invention, and particularly in accordance with the methods described in detail herein. The program 420 may be stored in a compressed, uncompiled and/or encrypted format. The program 420 furthermore includes program elements that may be necessary, such as an operating system, a database management system and "device drivers" for allowing the processor 405 to interface with computer peripheral devices. Appropriate program elements are known to those skilled in the art, and need not be described in detail herein.

According to an embodiment of the present invention, the instructions of the program 420 may be read into a main memory from another computer-readable medium, such from a ROM to RAM. Execution of sequences of the instructions in program 420 causes processor 405 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 410 also stores a plurality of databases, including a feature database 425, a condition database 430, a gaming device database 435, a player database 440, a performance database 445, and a payment database 450. Each of these databases is described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though six separate databases are illustrated, the invention could be practiced effectively using any number of more or fewer functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

Note that, although these databases are described as being stored in a gaming device, in other embodiments of the present invention some or all of these databases may be partially or wholly stored in another device, such as one or more of the peripheral devices 240, the peripheral device server 245, one or more of the gaming devices 230, a slot server (if different from the computer 210), another device, or a combination thereof. Further, some or all of the data described as being stored in the databases 425, 430, 435, 440, 445, and 450 may be partially or wholly stored (in addition to or in lieu of being stored in the memory 410 of the computer 400) in a memory of one or more other devices, such as one or more of the peripheral devices 240, one or more of the gaming devices 230, the peripheral device server 245 and/or a slot server (if different from computer 210).

Referring now to FIG. 5, an exemplary tabular representation 500 illustrates an embodiment of the feature database 425 (FIG. 4) that may be stored in the computer 400. The tabular representation 500 of the feature database includes a number of example records or entries, each defining a feature that may be enabled on a gaming device 300 by the computer 400 (or the gaming device 300). Those skilled in the art will understand that the feature database may include any number of entries.

The tabular representation 500 also defines fields for each of the entries or records. The fields specify: (i) a feature identifier 502 that uniquely identifies a particular feature (e.g., uniquely identifies a particular option, mode, or parameter for affecting the operation of one or more games and/or one or more gaming devices), (ii) a feature name 504 that includes a name of the particular feature, (iii) a description 506 that contains a description (e.g., a text description) of the enhancement(s) provided by the feature to play on a gaming device, and (iv) a category 508 that stores an indication of a group or category of features with which the feature may be identified.

The feature name 504, the category 508, and/or the description 506 may be used in outputting information and messages to a player (e.g., at display device 355 of the gaming device 300). For example, a player may receive a displayed offer: "Click here for Free Telephone Calls!". In another example, the player's selection of a feature from a list of displayed features may cause the description 506 to be displayed in a display area of a gaming device.

Referring now to FIG. 6, an exemplary tabular representation 600 illustrates an embodiment of the condition database 430 (FIG. 4) that may be stored in the computer 400. The tabular representation 600 of the condition database includes a number of example records or entries, each defining a condition that may used, for example, for determining whether a feature should be enabled (or disabled) on a gaming device 300 by the computer 400 (or the gaming device 300). Those skilled in the art will understand that the condition database may include any number of entries.

The tabular representation 600 also defines fields for each of the entries or records. The fields specify: (i) a feature identifier 602 that identifies a particular feature, and (ii) a condition for enabling feature 604 that includes an indication of one or more requirements that must be satisfied in order to enable (or to keep enabled) the particular feature.

As discussed herein, a condition for enabling feature 604 may correspond to one or more requirements for enabling a feature (and/or for keeping an enabled feature enabled). A condition may alternatively correspond to one or more requirements for disabling a feature (and/or for keeping the feature disabled). Those skilled in the art will readily understand that a condition described as a condition for enabling a feature may suggest a condition for disabling a feature, and vice versa. For example, a condition that no more than fifty players can be playing a particular type of slot machine in order for a particular feature to be enabled may also suggest a condition that the feature is to be disabled if the number of players exceeds fifty.

In some embodiments, however, a condition for disabling or enabling a feature may not necessarily suggest its opposite. For example, a described condition may indicate that a disabled feature should be enabled if ten or more players are playing video poker. However, the feature, once enabled, may or may not be disabled if the number of players playing video poker falls below ten, for example.

Various types of information and factors on which conditions may be based are described herein, and other criteria and requirements will be readily understood by one skilled in the art in light of the present disclosure. Some examples of conditions include, but are not limited to:

(i) Whether an amount of revenue generated at a gaming device while a feature is being used (e.g., an amount of coin-in and/or transaction amounts received from players in association with offers for products/services and other transactions at the gaming device) exceeds a predetermined minimum threshold;

(ii) Whether an average amount wagered by a player (or players) while a feature is in use is greater than a historical average wager amount of the player;

(iii) An identity of a player operating the gaming device (e.g., some features may be available only to certain players, or only to players who use player tracking cards);

(iv) Past gambling activity of a player (e.g., whether the year-to-date coin-in by a player is less than a predetermined threshold);

(v) Current gambling activity (e.g., activity during a current session, or during a current trip to a casino) of a player (e.g., whether a current credit balance is less than a predetermined maximum amount, or whether an average rate of play during a current gaming session is greater than a predetermined threshold for enabling the feature);

(vi) Anticipated future gambling activity of a player (e.g., whether a particular player (or players) is likely to stop gambling within the next ten minutes);

(vii) A preference of one or more players (e.g., whether a majority of players prefer a particular feature, or whether a particular player has previously indicated a preference for the feature);

(viii) A game that a player is currently playing (e.g., a feature for providing an interactive tour of a game's bonus round may be enabled if the player is currently playing a game that is relatively new to the casino);

(ix) A type of gaming device a player is currently playing (e.g., a feature may be enabled for video poker machines but not for video blackjack machines);

(x) A location of the gaming device (e.g., a feature may be enabled if the gaming device is near a door of a casino floor, but may not be enabled if the gaming device is near a poker room);

(xi) Information about the compatibility or suitability of the feature with a game and for with the gaming device (e.g., a feature for providing an interactive tour of a game's bonus round may not be enabled for a game that does not have a bonus round, or for a gaming device offering only games without bonus rounds);

(xii) A manufacturer that produces a gaming device (e.g., a feature may only be enabled at the gaming device if the gaming device is produced by a specific manufacturer);

(xiii) A developer, licensor, vendor, or other provider of a feature (e.g., a feature may only be enabled on gaming devices whose manufacturers have agreements with the provider of the feature); and (xiv) A developer, licensor, vendor, or other provider of a game available on the gaming device (e.g., a game vendor may stipulate that only certain types of features may be enabled on devices offering its games).

In some embodiments, the predetermined condition may be based on the time of day. For example, a feature for providing a tour of a slot machine may be disabled between the hours of 8 p.m. and 11 p.m. (typically peak hours for gambling), because the operator of the slot machine is aware that players tend to operate the slot machine in regular mode during these hours anyway.

Examples of time-related predetermined conditions that may need to be satisfied before a feature is enabled on a gaming device include, but are not limited to:
  (i) A period of time since an event (e.g., the feature may be automatically disabled after a certain period of time after the feature is initially enabled, after the feature is first used, after the feature is used a predetermined number of times, etc.); and
  (ii) A time of day (e.g., the feature may be disabled during particular times of the day).

Other appropriate time-related predetermined conditions will be recognized by one of ordinary skill in the art after reading the present application. Examples of predetermined conditions related to indications from parties, that may need to be satisfied before a feature is enabled on the gaming device include, but are not limited to:
  (i) Whether a signal was provided, by or on behalf of a casino or other operator of the gaming device, indicating that the feature should be enabled (e.g., a signal received from a casino employee observing a player becoming bored and/or discouraged in playing the gaming device);
  (ii) Whether a signal was provided, by or on behalf of a regulatory group (e.g., a state, federal, or local government agency for regulating gambling activities), indicating that the feature can (or must) be enabled (e.g., a signal received from a state gaming commission indicating that the feature meets regulatory approval); and
  (iii) Whether a signal was provided, by or on behalf of a provider of the feature (e.g., a game manufacturer, a patent holder), indicating that the feature can be enabled.

Other appropriate predetermined conditions related to indications received from or otherwise provided by any of various parties will be recognized by one of ordinary skill in the art after reading the present application. Note that indications such as those discussed herein may be provided in a variety of different ways, including, but not limited to: (i) using an input device of a server computer (e.g., a keyboard); (ii) using an input device of a gaming device (e.g., a touch screen); and (iii) using a peripheral device (described in further detail herein) in communication with a server computer and/or a gaming device.

In some embodiments, the provided indication from a party may comprise an authorization code, as discussed further herein. Examples of predetermined conditions related to authorization codes, that may need to be satisfied before a feature is enabled on the gaming device include, but are not limited to:
  (i) Whether at least one authorization code has been provided;
  (ii) A period of time since at least one authorization code was provided (e.g., thirty days ago); and
  (iii) A type of authorization code that has been provided (e.g., different authorization codes may enable the same feature in different ways, such as for different periods of time).

Other appropriate predetermined conditions related to authorization codes will be recognized by one of ordinary skill in the art after reading the present application. Examples of predetermined conditions related to information about a casino that may need to be satisfied before a feature is enabled on the gaming device include, but are not limited to:
  (i) What casino operates a gaming device (e.g., a feature may be enabled at a first casino but is to be disabled at a second casino, even if the casinos are commonly owned or operated and may have access to the same features);
  (ii) A location or jurisdiction of a casino (e.g., a feature may be disabled within a first geographic region, such as the state of Nevada, but enabled within a second geographic region, such as an American Indian reservation in the state of Arizona);
  (iii) A measure of usage of gaming devices at a casino (e.g., a tutorial feature on how to play the bonus round on a particular type of slot machine may be disabled if more than 90% of all such machines are in use, as the clear demand for the slot machines indicates that there is no need to entice additional players by enabling the tutorial feature); and
  (iv) Revenue management information for a casino (e.g., one or more conditions may be established to maximize revenue, such as by establishing a condition that if a casino hotel is only half full, then a feature that offers hotel rooms to players should be enabled).

Other appropriate predetermined conditions related to information about a casino will be recognized by one of ordinary skill in the art after reading the present application.

Another example of a predetermined condition comprises a minimum number of games played by a player on a gaming device. For example, it may be determined that it is desirable that a player playing one hundred games on a gaming device should be rewarded by enabling a feature on the gaming device.

In another example, it may be determined whether an outcome determined for a player playing a game at the determined gaming device satisfies a predetermined condition for enabling a feature. For instance, a gaming device may determine an outcome in a manner well known in the art. An outcome, as used herein, comprises at least one indicia that is utilized to inform a player of whether a benefit (e.g., a payout) has been won by the player as a result of playing a game. In a reeled slot machine game, for example, a set of symbols displayed along a payline comprises an outcome of a game. Some of the possible combinations of symbols obtainable on the reeled slot machine correspond to a payout. Thus, a player is informed of whether he has won a payout by displaying a set of symbols along the payline. If the set of symbols along the payline correspond to a payout (e.g., as displayed on a payout table of the reeled slot machine), then the player is informed that he has won the corresponding payout once the set of symbols is displayed along the payline. In a video poker gaming device, as another example, the set of cards comprising the final hand comprises the outcome of a game.

The above examples of predetermined conditions have been provided for purposes of illustrating various embodiments consistent with the process 100D (FIG. 1D), and with some other methods for determining whether a feature should be enabled or disabled on a gaming device. Other types of predetermined conditions and types of information on which such conditions may be based, are described herein.

Referring now to FIG. 7, an exemplary tabular representation 700 illustrates an embodiment of the gaming device database 435 (FIG. 4) that may be stored in the computer 400. The tabular representation 700 of the gaming device database includes a number of example records or entries, each defining a gaming device that may be in communication (e.g., over a LAN or WAN) with computer 400. Those skilled in the art will understand that the gaming device database may include any number of entries.

The tabular representation 700 also defines fields for each of the entries or records. The fields specify: (i) a gaming device identifier 702 that uniquely identifies a particular gaming device (e.g., uniquely identifies a particular slot machine on a casino floor or a PC communicating with an online casino), (ii) a gaming device type 704 that stores a description or designation of the type of gaming device, (iii) a features enabled 706 that stores an indication or identifier of one or more features currently enabled on the gaming device, (iv) a features in use 708 that stores an indication or identifier of one or more features currently being used on the gaming device, (v) a benchmark theoretical win 710 that indicates a theoretical win for the gaming device (e.g., a historical theoretical win), and (vi) a location 712 that stores an indication of the physical location of the particular gaming device.

The gaming device database may be used by computer 400 to, for example, communicate with one or more gaming devices and to identify a gaming device that data is being transmitted to or received from. For example, the computer 400 may instruct a gaming device as to which features should be enabled and/or made active at the gaming device, transmit a random number to the gaming device, transmit an indication of a feature for use by the gaming device, update information in one or more databases of the gaming device, and receive information associated with a player of the gaming device (e.g., a player identifier, player preferences, an indication of wagers placed or number of games played by a player, an indication of duration of play by a player at the gaming device, etc.). Some of this information may be stored in association with the gaming device. For example, the gaming device may store an indication of the last time that a feature was made active on a particular gaming device.

The gaming device type 704 stores an indication of what types of games are available on the particular gaming device. Such information may be used, for example, to determine whether to enable a feature on a gaming device. For example, in some embodiments it may be desirable that a particular feature is not made available for use at video blackjack machines during particular times of day. Accordingly, the computer 400 may consider whether a gaming device is a video blackjack machine and the time of day in determining whether a feature should be enabled on the gaming device.

The features enabled 706 stores an indication of what features are currently enabled for use on the particular gaming device, and the features in use 708 stores an indication of what features are currently active on the particular gaming device. Such information may be used, for example, to determine whether to enable a feature on a gaming device. For example, in some embodiments it may be desirable that a first feature is not made active if a second feature is already active on the particular gaming device. For instance, a rule or condition may specify that the first feature should only be enabled if the second feature is not active on the gaming device. Further, such information may be used, for example, to track the usage of different features. For instance, features in use 708 can be used to determine how many gaming devices a particular feature is active on at any given time.

The benchmark theoretical win 710 stores an indication of a theoretical win of the gaming device that may be used, for example, as the basis for determining whether one or more features can be correlated to an effect on the theoretical win of a particular gaming device. For example, benchmark theoretical win 710 may be a value determined with respect to a particular period of time, such as a period of time preceding when a particular feature was first enabled on the gaming device. A second theoretical win may be calculated for a period during which the feature has been enabled. Thus, any difference between the benchmark and the theoretical win while the feature has been enabled may be correlated to the feature as a useful measure of performance of the feature. For instance, if the enabling of the feature is correlated to an increase in the theoretical win for the gaming device, then it may be determined (e.g., by a slot server) to keep the feature enabled based on this increased performance. In another example, the benchmark theoretical win 710 may be of a different gaming device, or may be an average for two or more gaming devices. For instance, such benchmarks may be useful in determining any difference in theoretical win between gaming devices having different features in use, or for comparing a gaming device with no features active to one having one or more features active.

Although a benchmark theoretical win is described above with respect to a gaming device, it will be readily understood that other types of benchmark values may be used, in addition to or in lieu of a theoretical win value. For example, benchmark values may be established appropriate for comparison with various types of measures of performance, usage, and/or profitability. Some examples of benchmark values include, but are not limited to, a number of handle pulls per hour, a number of paylines activated on a slot machine, and an average wager size per handle pull. Benchmark values may also be established for information related to ancillary entities (e.g., sponsors of offers made available in accordance with a feature). Some examples include, but are not limited to, a number of restaurant covers, an average price per check (e.g., in a restaurant), an occupancy of a showroom or theater, an average daily room rate at a hotel, and a percentage of rooms that are occupied in a hotel.

The gaming device location 712 stores an indication of where a particular gaming device is located. Such information may be used, for example, to determine whether a feature should be enabled on a gaming device. For example, in some embodiments it may be desirable that a particular feature be enabled for play of one gaming device in a designated area of a casino per predetermined period of time (e.g., at least once every five minutes for a particular bank of slot machines). Accordingly, the computer 400 may track when the feature is enabled and, if this has not occurred within a predetermined period of time in a designated area of a casino, the computer 400 may select a gaming device in that area and instruct it to enable the feature for play.

Figure 8:
FIG. 8 is a table illustrating an exemplary data structure of a player database consistent with one or more embodiments of the present invention.

Referring now to FIG. 8, an exemplary tabular representation 800 illustrates an exemplary embodiment of a player database 440 (FIG. 4) that may be stored in computer 400. The tabular representation 800 of the player database includes a number of example records or entries, each defining a player who may be a member of a slot club of a casino or otherwise registered with or known to a casino or other entity. Those skilled in the art will understand that the player database may include any number of entries.

The tabular representation 800 also defines fields for each of the entries or records. The fields specify: (i) a player identifier 802 that uniquely identifies a player, (ii) a name 804 of a player, (iii) a financial account identifier 806 associated with a player, (iv) an indication of comp points 808 available to a player, (v) a theoretical win/[loss] 810, (vi) an actual win/[loss] 812 for a player, and (vii) a feature preference(s) 814.

The information in the player database 440 may be created and updated, for example, based on information received from a player, a casino employee, a gaming device 230, a peripheral device 240, and/or peripheral device server 245.

For example, the information may be created when a player registers with a casino and receives a player tracking card encoded with the player identifier. The information may be subsequently updated when a player requests to update the information (e.g. when a player indicates a desire to change a preferred feature) or when additional information is obtained about the player via the casino's interactions with the player (e.g. the lifetime theoretical win may be updated on an ongoing basis as the player plays games at a casino).

The player identifier 802 may be, for example, an alphanumeric code associated with a player who may operate a gaming device or play a table game at a casino. The player identifier 802 may be generated or selected, for example, by the computer 210 or by the player (e.g., when a player first registers with a casino). For each player, the player database 440 may also store the player's name 804 (e.g., for use in outputting messages to the player). In one or more embodiments the player's name may comprise a nickname or other designation for the player that is selected by the player or the casino. In one or more embodiments, the nickname may comprise a designation that reflects the player's status (e.g., "premium player"). Such a status may indicate, for example, the typical spending range of the player or other indication of how valuable the player is considered to be by the casino. Such a designation may or may not be known to the player.

The financial account identifier 806 (e.g., a credit card account number, a debit card account number, a checking account number, a casino financial account number, or digital payment protocol information) associated with the player. The financial account identifier 806 may be used, for example, to credit a payment to the player (e.g., wherein a benefit obtained by the player comprises a monetary amount) and/or to debit a wager amount.

The comp points 808 stores an indication of the number of comp points that a player is currently entitled to. Comp point programs are a common method for a casino to reward players by awarding points to players as a reward for certain gambling behavior that a casino finds desirable. Although the comp points programs differ from casino to casino, in a typical comp point program a player accumulates comp points based on (i) a total amount of coins wagered, or (ii) a total amount of coins paid out. Alternatively, comp points may be awarded based on, for example, (i) the length of time or a number of game plays at a gaming device or table game; (ii) the average wager of a player; and/or (iii) for playing a particular gaming device or group of gaming devices. As the player accumulates comp points the player may exchange some or all of the comp points for goods or services specified by the comp point program. For example, a player may exchange 800 comp points for a dinner at a casino restaurant. As the player exchanges comp points for a good or service the exchanged comp points are deducted from the player's comp point balance reflected in field 808 of tabular representation 800. In some comp point programs the rewards are defined in terms of dollar amounts rather than points. In yet other comp point programs the points are exchangeable into dollar amounts based on a schedule defined by the casino, allowing the player to convert the accumulated points into dollar amounts and then use the dollar amounts to purchase goods or services from the casino.

The theoretical win/[loss] 810 stores an indication of the theoretical win of the casino based on the playing activity of the player since the playing activity of the player has been tracked. In other words, the historical theoretical win/[loss] 810 may be a "lifetime" theoretical win. In other embodiments a historical theoretical win/[loss] based on other periods of time may be stored in addition to or instead of the lifetime historical theoretical win/[loss]. For example, an annual or session theoretical win/[loss] may be stored. The actual win/[loss] 812 stores an indication of the actual dollar amount that the corresponding player has won or lost while gambling at the casino. A casino loss is indicated in brackets in the tabular representation 800.

In some embodiments of the present invention, a determination of whether to enable a feature on a gaming device and/or whether to offer to activate a feature for a player may be based on the theoretical win/[loss] and/or actual win/[loss] of the player playing the game. For example, using the process 100D, in step 165 it may be determined if two predetermined conditions have been satisfied: (i) that a player's actual win/[loss] is a loss of at least a predetermined value (assuming, for this example, that the win/[loss] is calculated for a particular gaming session); and (ii) that the gaming device at which the player is playing is compatible with the feature. Satisfaction of these two predetermined conditions may correspond to enabling the feature for use on the player's gaming device.

It should be understood that although a player identifier and information related to each registered player is described in detail, a player need not be registered in order to be able to use features enabled on a gaming device. Accordingly, registration of a player and storing of information related to a player is not necessary for practice of the present invention.

The feature preference(s) 814 store one or more preferences for a feature. For example, a preference may be that a particular feature is enabled on whatever gaming device the player is playing. Such player preferences may be provided by the player directly. For example, a player may tell a casino employee, who may in turn enter an indication of the preference to the player database. In another example, a player may be prompted by a gaming device 230 to store a current configuration of one or more features as a feature preference. Alternatively, a player preference may be determined indirectly. For example, a casino employee may observe a player's reaction and decide that the player really does not like a particular feature or that a player really enjoys a particular type of offer that may be provided in accordance with one or more features. In another example of how a player preference may be determined indirectly, a player's gambling behavior may be tracked to determine whether a player continues to keep playing for an extended period of time or stops playing shortly after a particular feature is made active.

According to some embodiments, some or all of the exemplary information depicted in FIG. 8 may be stored on a player tracking card. For example, an indication of one or more feature preferences of a player may be stored on a player tracking card and accessed by one or more gaming devices 230, peripheral device server 245, another peripheral device 240, and/or computer 210.

Referring now to FIG. 9A, an exemplary tabular representation 900A illustrates an exemplary embodiment of a performance database 445 (FIG. 4) that may be stored in computer 400. The tabular representation 900A of the performance database includes a number of example records or entries, each defining a gaming session of a player at a gaming device. Those skilled in the art will understand that the performance database may include any number of entries.

The tabular representation 900A also defines fields for each of the entries or records. The fields specify: (i) a session identifier 902 that uniquely identifies a session of gaming activity by a player, (ii) a gaming device identifier 904 that identifies a gaming device at which the player's gaming activity takes place, (iii) a player identifier 906 that identifies a player participating in the gaming session, (iv) a length of session 908 that includes an indication of the duration of the particular gaming session, (v) a total coin-in 910 that indicates a total amount wagered by the player during the session, (vi) a session theoretical win per minute 912, (vii) an increase in theoretical win per minute 914 that indicates a difference between the session theoretical win per win and a particular benchmark value (e.g., benchmark theoretical win 710 of FIG. 7), and (viii) an active features 916 that indicates one or more features that are or were active during the particular session.

The information in this exemplary embodiment of the performance database 440 may be created and updated, for example, based on information received from a player, a casino employee, a gaming device 230, a peripheral device 240, and/or peripheral device server 245. For example, the information may be created when a player inserts his player tracking card at a gaming device 230 (e.g., a new session entry may be created whenever a player is first identified at a gaming device). The information may be updated subsequently when additional information is obtained about the player via the player's interactions with the gaming device during a session. For example, the total coin-in, and indications of the active features may be updated on an ongoing basis as the player places wagers at the gaming device and selects different features. In another example, the session theoretical win per minute (and the increase in theoretical win per minute) may be updated on an ongoing basis during a session (or, alternatively, only at the end of a session) based on the player's wagering.

Information stored this exemplary embodiment of the performance database 445 may be used in making various determinations for managing features. In some embodiments of the present invention, a determination of whether to enable or disable a feature on a gaming device, and/or whether to offer to activate a feature for a player, may be based on the total coin-in, session theoretical win per minute and/or the increase in theoretical win per minute. For example, using the process 100B, in step 135, the determination of whether to disable one or more enabled features may be based on a measure of performance such as the total coin-in, the session theoretical win per minute, and/or the increase in theoretical win per minute. If the increase in theoretical win per minute is greater than a predetermined value, the enabled features may remain enabled. Otherwise, they may be disabled. Note that such a determination need not take place during the player's session, but may occur at any time (e.g., in accordance with a schedule for managing the features of the system).

In one or more embodiments of the present invention, some of the information stored in the exemplary embodiment of the performance database 445 may be used to determine payment for a provider of a feature, game, or gaming device. For example, using the process 100D, in steps 175-185 the total coin-in may be used as a measure of usage in determining a payment It should be understood that the sessions depicted in the tabular representation 900A are for illustrative purposes only. In some embodiments, a player's session may include information about play of more than one gaming device, and may include information about one or more periods of time in which the player was not playing a gaming device (e.g., the session may correspond to an entire week stay at a casino hotel). FIG. 9C, for example, depicts exemplary information representing a player's trip to a casino, and is discussed in detail below.

Referring now to FIG. 9B, an exemplary tabular representation 900B illustrates another exemplary embodiment of a performance database 445 (FIG. 4) that may be stored in computer 400. The tabular representation 900B of the performance database includes a number of example records or entries, each defining a gaming session in which an exemplary feature "Free Telephone Calls" was used. Those skilled in the art will understand that the performance database may include any number of entries.

The tabular representation 900B also defines fields for each of the entries or records. The fields specify: (i) a session identifier 920 that uniquely identifies a session in which the exemplary feature was used, (ii) a length of session 922 that includes an indication of the duration of the particular gaming session, (iii) a coin-in per minute 924 that indicates the total coin-in for the session averaged on a per minute basis, (iv) a session theoretical win per minute 926, (v) a total cost of calls 928 that indicates a cost of providing the "Free Telephone Calls" during the session, and (vi) a net theoretical profit from session 930 that indicates a difference between the costs incurred in providing the feature and the session theoretical win.

As discussed above with respect to the tabular representation 900A of FIG. 9A, the information in this exemplary embodiment of the performance database 440 may be created and updated, for example, based on information received from a player, a casino employee, a gaming device 230, a peripheral device 240, and/or peripheral device server 245. Similarly, information may be created at the start of a session (e.g., when a player inserts his player tracking card at a gaming device 230), and may be updated subsequently (e.g., as the player uses the feature to make telephone calls, thereby incurring costs to the system and possibly affecting the net theoretical profit of the session).

Various types of information represented in this exemplary embodiment may be used in managing features for gaming devices. For example, the length of session 922 may be helpful as a measure of usage (e.g., in determining whether to keep the feature enabled, in determining whether to enable the feature on additional gaming devices, in determining an amount due to a provider of the feature).

As discussed variously herein, a measure of profitability of a gaming device (e.g., based on revenue generated at the gaming device) can be useful in managing features on the gaming device (e.g., in determining whether to enable or disable certain features). Note that the particular feature "Free Telephone Calls" incurs a cost (e.g., to the casino providing the telephone service) when it is used by players. Accordingly, a measure of performance of a gaming device and/or of a feature may be based on information about costs of the feature itself (e.g., how profitable it is to provide the feature in light of its associated costs). In some embodiments, a measure of performance and/or of profitability may take into account payment that might be due one or more providers of a feature (e.g., based on its usage).

Referring now to FIG. 9C, an exemplary tabular representation 900C illustrates another exemplary embodiment of a performance database 445 (FIG. 4) that may be stored in computer 400. The tabular representation 900C of the performance database includes a number of example records or entries, each defining a trip or visit of a player to a casino. Those skilled in the art will understand that the performance database may include any number of entries.

The tabular representation 900C also defines fields for each of the entries or records. The fields specify: (i) a trip identifier 940 that uniquely identifies a trip or visit of a player to a gaming establishment (e.g., a casino hotel), (ii) a player identifier 942 that identifies the particular player, (iii) a benchmark trip theoretical win 946, (iv) a trip theoretical win 948, and (v) a percentage of play with enabled feature(s) 950.

Information in this exemplary embodiment may be created and/or updated as discussed herein with respect to other described embodiments of the performance database 445.

The trip theoretical win 948 and benchmark trip theoretical win 946 may be used, in a manner similar to that described above with respect to FIG. 9A, to determine a measure of performance of one or more features. The percentage of play with enabled features 950 may be useful as a measure of a player's usage of features generally during a trip, in determining whether or not to change the features enabled for use on gaming devices. In addition, information about how much of the time a player plays with one or more features enabled may be useful in determining what types of features to offer to the player or to make available for selection by the player. For example, a player that tends to spend more time playing with features enabled may be more willing to accept an offer to try a feature in exchange for a fee.

Referring now to FIGS. 9D-9E, an exemplary tabular representation 900D illustrates another exemplary embodiment of a performance database 445 (FIG. 4) that may be stored in computer 400. The tabular representation 900D of the performance database includes a number of example records or entries, each defining an offer that was made to a player during a session in accordance with one or more active features. Those skilled in the art will understand that the performance database may include any number of entries.

The tabular representation 900D also defines fields for each of the entries or records. The fields specify: (i) a session identifier 960 that identifies a session of gaming activity by a player, (ii) a gaming device identifier 962 that identifies a gaming device at which the offer was provided in accordance with one or more features, (iii) a player identifier 964 that identifies a player who received the offer, (iv) an offer 966 that includes an indication (e.g., a description, an offer message) of the offer provided to the player, (v) an accepted 968 that indicates whether the offer was accepted, (vi) an active features 970 that indicates one or more features that were active when the offer was provided, (vii) a cost to offer sponsor 972 that indicates a cost incurred by a sponsor of the offer, (viii) a payment to player 974 that indicates a value of a product, service, or benefit provided to a player, (ix) a payment to casino 975 that indicates value provided to a casino operating the gaming device at which the offer was made, and (x) a payment to manufacturer 976 that indicates a value provided to a manufacturer of a gaming device, feature, or game.

Information in this exemplary embodiment may be created and/or updated as discussed herein with respect to other described embodiments of the performance database 445. For example, the information may be created when an offer is communicated to a player in accordance with an active feature.

Some features may enhance play of a gaming device by offering one or more products or services to a player (e.g., in response to particular game events, such as the player winning a payout, or the player pushing a "CASH OUT" button). Some such offers may be sponsored by one or more sponsors. For example, FIGS. 9D and 9E depicts an exemplary offer made to a player "P-568249": "$30 TO SWITCH LONG DISTANCE TO BIGTEL CO." The player accepted the offer, which may have been made, in accordance with feature "FEAT-07", after a player had wagered a predetermined amount at a slot machine without achieving a winning outcome. The payment to player 974 indicates that the amount of $30 was provided to the player (e.g., by increasing the player's credit balance by $30). In addition, $3 was provided in payment to casino 975, and $2 was provided as payment to manufacturer 976. For example, the sponsor of the offer may have an agreement with the casino that the sponsor will pay the casino a fee (e.g., $3) for each player that accepts its offer. Similarly, the sponsor may agree to pay a $2 to the manufacturer of the feature for each player that accepts the offer. The cost to offer sponsor 972 indicates that the total cost to the sponsor for the accepted offer was $35. Note that the sponsor may value the player, who has agreed to switch long distance telephone service, in excess of the cost to the sponsor of providing the $35 in benefits and fees to the player and other parties.

Information represented in this exemplary embodiment of the performance database 445 may be used in making various determinations for managing features. In some embodiments of the present invention, a determination of whether to enable or disable a feature on a gaming device, and/or whether to offer to activate a feature for a player, may be based on the number of offers made in accordance with the feature that have been accepted. Thus, the number of accepted offers (or the percentage of offers made that were accepted, etc.) may be a useful measure of performance and/or usage of the feature. For example, a feature that provides offers with a low rate of acceptance may be disabled as it may be distracting or annoying to players.

Referring now to FIG. 10A, an exemplary tabular representation 1000A illustrates an exemplary embodiment of a payment database 450 (FIG. 4) that may be stored in computer 400. The tabular representation 1000A of the payment database includes a number of example records or entries, each defining a payment made to a provider of a feature. Those skilled in the art will understand that the player database may include any number of entries.

The tabular representation 1000A also defines fields for each of the entries or records. The fields specify: (i) a feature identifier 1002 that identifies a feature, (ii) a provider 1004 that indicates a party that provided the feature or otherwise has a proprietary interest in the feature, and (iii) a payment to provider 1006 that indicates an amount paid (or to be paid) to the particular provider. Note that one feature may be associated with two or more providers. For example, feature "FEAT-02" is associated with both "PATENT LICENSOR #1" and "GAME MANUFACTURER #1".

As discussed herein, payment to a provider of a feature may be determined based on a variety of types of information and measures of performance, usage, and/or profitability. In addition, as discussed below with respect to FIGS. 10B-10C, payment may be based at least in part on one or more applicable payment rates.

Figure 10B:

Referring now to FIGS. 10B and 10C, an exemplary tabular representation 1000B illustrates an exemplary embodiment of a payment database 450 (FIG. 4) that may be stored in computer 400. The tabular representation 1000B of the payment database includes a number of example records or entries, each defining payment information for a particular feature. Those skilled in the art will understand that the player database may include any number of entries.

The tabular representation 1000B also defines fields for each of the entries or records. The fields specify: (i) a feature identifier 1020 that uniquely identifies a feature, (ii) a total usage 1022 that indicates a measure of usage of the particular feature, (iii) a provider 1 field 1024 that identifies a party that provided the feature or otherwise has a proprietary interest in the feature, (iv) a provider 1 rate 1026 that indicates a rate for use in determining payment for provider 1, (v) a payment to provider 1 field 1028 that indicates a value provided (or due) to provider 1, (vi) a provider 2 field 1030 that identifies another party that provided the feature or otherwise has a proprietary interest in the feature, (vii) a provider 2 rate 1032 that indicates a rate for use in determining payment for provider 2, and (viii) a payment to provider 2 field 1034 that indicates a value provided (or due) to provider 2. Note that, as in FIG. 10A, one feature may be associated with two or more providers.

The total usage 1022 indicates information that may be used for determining payment due to one or more providers of features, games, and/or gaming devices. Such information may be updated as discussed above with respect to the exemplary embodiments of the performance database 445. For example, gaming activity may be monitored and updated on an ongoing basis by one or more of the computer 210, the gaming device 230, and/or a peripheral device 240. Examples of measures of usage appropriate for use with one or more embodiments of the present invention include, but are not limited to: (i) a total number of minutes used, (ii) a total revenue generated, (iii) a number of sessions in which the feature was enabled or active, (iv) a number of players using the feature, and (v) a number of gaming devices at which the feature was enabled or active. Of course, as discussed variously herein, measures of usage may also be useful in managing the enablement of features (e.g., in order to adjust the performance of a feature management system).

The rates 1026 and 1032 depict various exemplary types of rates that may be used in determining payment to licensors, vendors, and other providers, such as per-unit time rates, percentage of revenue rates, fee per user rates, and fee per gaming device rates. Other appropriate types of rates will be recognized by one of ordinary skill in the art after reading the present application.

Figure 11:
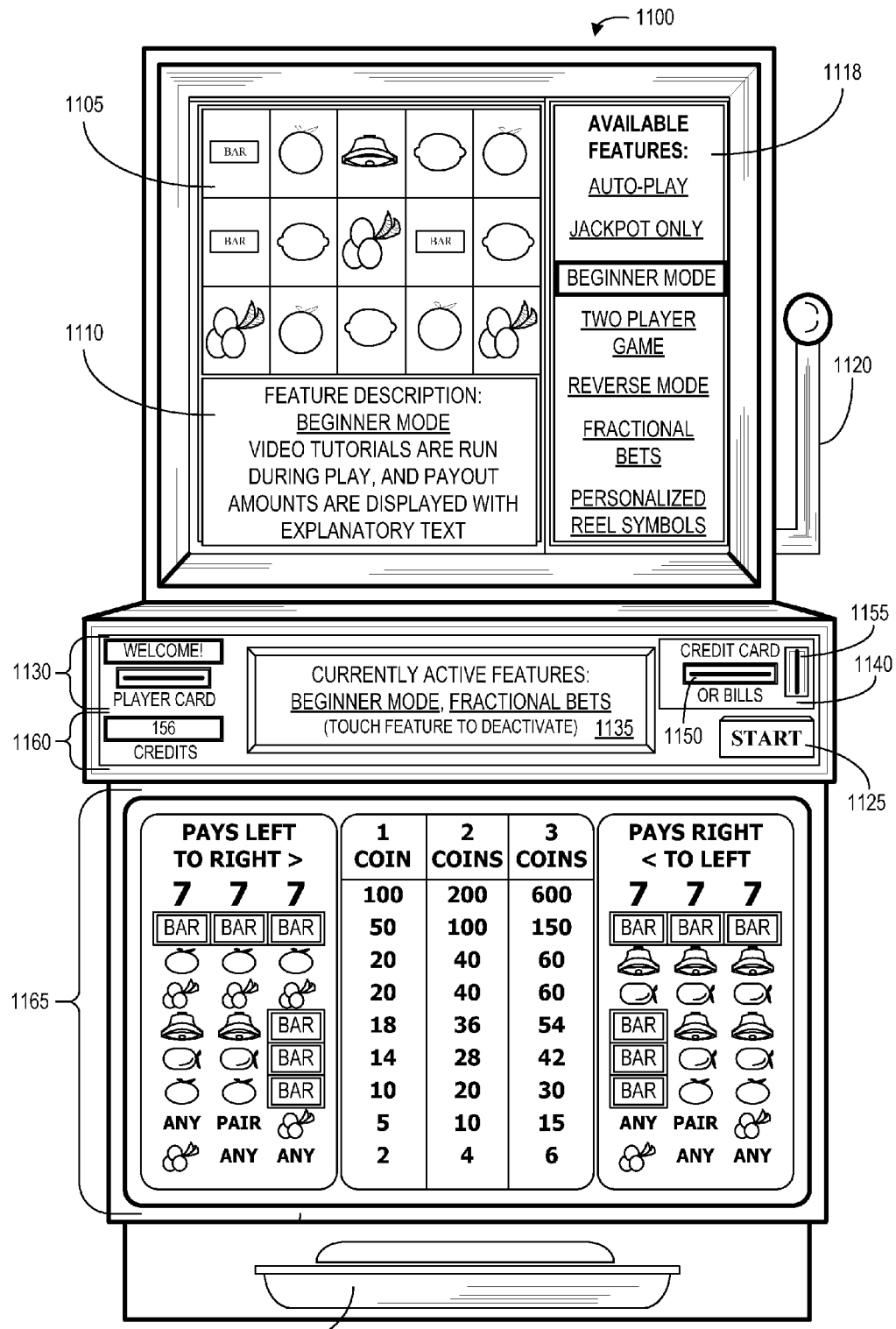
FIG. 11 is a plan view of an exemplary gaming device consistent with at least some embodiments of the present invention.

Referring now to FIG. 11, an embodiment 1100 of a plan view of a gaming device 230 is illustrated. In the embodiment 1100, the gaming device 230 comprises a five reel slot machine. The slot machine 1100 comprises a display area 1105 in which an outcome for a game of the slot machine is displayed to the player. The display area 1105 may, for example, be a video display that displays simulations of reels. The display area 1105 may, in another example, be glass behind which are located mechanical reels. Display area 1105 is an exemplary embodiment of the display device 355, described with respect to FIG. 3.

The slot machine 1100 also comprises a display area 1110 in which information about one or more features, such as descriptions of features, is displayed to the player. The display area 1110 may, for example, be a video display that displays images and/or text. Display area 1110 is another exemplary embodiment of the display device 355, described with respect to FIG. 3.

The slot machine 1100 further comprises a display area 1118 in which images or text indicating available features for play of the slot machine 110 are displayed to the player. The display area 1118 may, for example, be a video display that displays images and/or text, and that may include a touch screen. Display area 1118 is another exemplary embodiment of the display device 355, described with respect to FIG. 3.

Slot machine 1100 further comprises a handle 1120. A player may initiate the movement of the reels in display area 1105 by pulling on the handle 1120. Alternatively, a player may initiate the movement of the reels in display 1105 by actuating the start button 1125. Either or both of handle 1120 and start button 1125 are exemplary embodiments of the input device 365, described with respect to FIG. 3.

Slot machine 1100 also comprises a player tracking device 1130, which is an example of the player tracking device 360 that was described with respect to FIG. 3. The player tracking device 350 may comprise a player tracking card reader and a display (e.g., an LED display) for outputting information related to the player identifier (e.g., player's name and number of comp points associated with player's account).

Also a component of slot machine 1100 is another display area 1135, for outputting information to a player. The display area 1135 may be utilized, for example, to inform a player of which features are currently active on the slot machine 1100 and/or may provide a way for the player to deactivate an active feature. The display area 1135 may, for example, be a video display including a touch screen. Display area 1135 is another exemplary embodiment of the display device 355, described with respect to FIG. 3.

Payment system 1140, an exemplary embodiment of payment system 375, comprises a bill acceptor and/or a credit card reader 1150, and a coin acceptor 1155. A player may utilize payment system 1140 to provide a wager for playing a game and/or for providing payment for provision of a feature available on slot machine 1100.

Slot machine 1100 further comprises a credit meter balance 1160, which is an exemplary embodiment of a benefit output device 350 that was described with respect to FIG. 3. The credit meter balance reflects the amount of electronic credits currently available to a player. The electronic credits may be used by a player, for example, as wagers for games played on the gaming device. The electronic credits may also be "cashed out" as coins, bills, tokens, a cashless gaming receipt, and/or credits to another financial account associated with the player.

The slot machine 1100 includes yet another display area, display area 1165, which displays a payout schedule of the slot machine 1100. The payout schedule displays payouts that correspond to various outcomes obtainable on the slot machine 1100. In one or more embodiments, if an outcome is displayed in display area 1105 that, as indicated in display area 1165, corresponds to a payout, the credit meter balance 1160 may be increased by an amount of electronic credits corresponding to the payout.

Finally, the slot machine 1100 comprises a coin tray 1170. Payment to the player may be rendered by dispensing coins into the coin tray 1170. Such coins may be dispensed based on, for example, a player's indication that the player would like to cash out his credit meter balance and/or a payout obtained by a player as a result of playing a game on the slot machine 1100. The coin tray 1100 is an exemplary embodiment of the benefit output device 350, described with respect to FIG. 3. Note that slot machine 1100 may include different and/or additional components besides those illustrated in FIG. 11.

Figure 12:
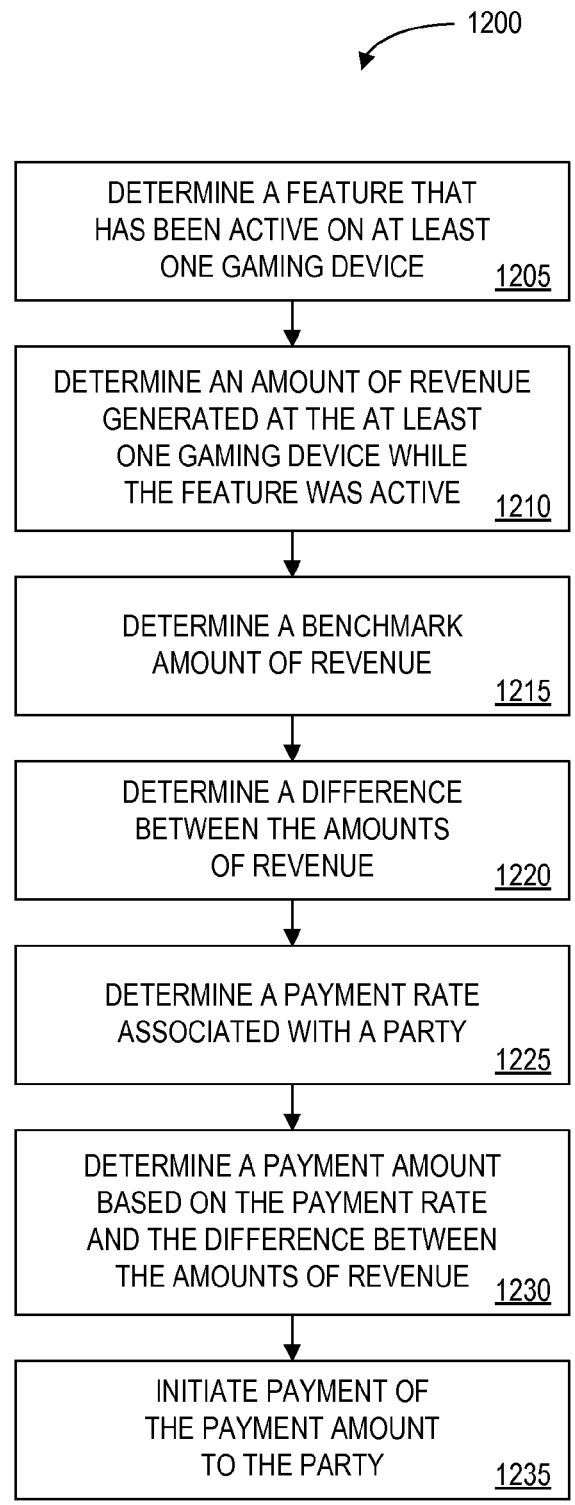
FIG. 12 is a flowchart depicting an exemplary process consistent with one or more embodiments of the present invention.

Referring now to FIG. 12, a flowchart illustrates a process 1200 that is consistent with one or more embodiments of the present invention. The process 1200 is a method for determining a payment based on a measure of performance, in which the measure of performance involves determining a difference between two measures of usage for one or more gaming devices. For illustrative purposes only, the process 1200 is described as utilizing an amount of revenue generated as the measure of usage. Of course, the process 1200 may be adjusted for any type of measure of usage (e.g., an amount wagered, a number of product/service offers accepted, a theoretical win, etc.). Also for illustrative purposes only, the process 1200 is described as being performed by a slot server. Of course, the process 1200 may be performed by a gaming device 230 and/or a computer 210.

In step 1205 the slot server determines a feature that has been active on at least one gaming device. For example the slot sever looks up information stored in the gaming device 435 and/or the performance database 445 and identifies a feature that has been in use of one or more gaming devices. In step 1210, the slot server determines an amount of revenue generated at the at least one gaming device while the feature was active. For example, by reference to a performance database that stores indications of use of features by session, as in tabular representation 900A (FIG. 9A), the slot server could determine the total coin-in 910 and the active features 916 for each session. For instance, in "SESS-01", a total of "345.00" was received while "FEAT-02" was active.

In step 1215, the slot server determines a benchmark amount of revenue. The second amount of revenue may be revenue generated at the at least one gaming device, may have been generated at one or more other gaming devices, or may be some other amount being used as benchmark. For example, the slot server may determine that the benchmark amount of revenue is equal to a revenue projection for the at least one gaming device.

In step 1220, the slot server determines a difference between the amount of revenue generated while the feature was active and the benchmark amount. In other words, the slot server compares the two amounts to determine a measure of performance of the feature. For example, if the benchmark amount is less than the amount of revenue generated, the difference by which the revenue exceeded the benchmark value may be correlated to the use of the feature on the at least one gaming device.

In step 1225, the slot server determines a payment rate that is associated with a party (e.g., a proprietor or other provider of the feature) and in step 1230 determines a payment amount based on the payment rate and the difference between the amount of revenue generated and the benchmark amount. For example, the slot server looks up the appropriate payment rate for the feature in payment database 450. For instance, the payment rate may be a flat rate payable only if the benchmark is exceeded. In another example, the payment rate may be based on the amount of the difference, such as a percentage (e.g., 5%) of the difference. In step 1235, the slot server initiates payment of the payment amount to the party. For example, the slot server may send an encrypted indication of the usage statistics to the party, and the party may confirm the amounts and bill the casino. Methods of encrypting usage statistics and other data for transmission to the party are described in detail below. In another example, the slot server may provide payment (e.g., via an electronic funds transfer).

It should be noted that, similar to the determinations in process 100B, process 1200 may further include a determination of whether the feature should remain enabled on one or more gaming devices. Such a determination may be based, for example, on a determination of whether a predetermined condition has been satisfied (e.g., whether the difference is greater than a predetermined increase in revenue). Such a predetermined condition may comprise a condition similar to those described with respect to step 165 of process 100D.

According to some alternative embodiments of the present invention, systems and methods for managing features, determining measures of performance of features and devices, and/or determining payment owed to proprietors and providers of features and devices may be applied to industries other than gaming, such as the industries for vending machines and other point-of-sale terminals.

According to various embodiments of the present invention, a provider of a feature, gaming device and/or game (e.g., a trademark holder, a game manufacturer, a controller) may provide an indication of at least one authorization code (e.g., to a sever computer, to a gaming device). The authorization code may be used in determining whether to enable or disable one or more features (e.g., of one or more games, of one or more gaming devices, of one or more gaming systems).

An authorization code (e.g., a password, an access code, a feature control authentication code) may comprise any of various types of information suitable for indicating that an entity having the code (e.g., a slot server, a slot machine) is permitted to enable and/or disable a feature. For example, an authorization code may comprise, without limitation, one or more alphanumeric characters, a sequence of digits, a digital certificate, and/or a combination thereof. In some alternative embodiments, the authorization code may comprise all or a portion of a program for using, enabling, and/or disabling the feature.

According to some embodiments, an authorization code may be indicated to a server computer (e.g., a slot machine server). For example, an employee of a casino may input an authorization code when prompted by a slot server in accordance with a program for managing features in a slot machine network. The controller (and/or the employee) may then be permitted to enable or disable one or more features in accordance with the authorization code (e.g., based on a stored condition for enabling a feature). Alternatively, or in addition, an indication of an authorization code may be provided to a gaming device. The gaming device may then enable or disable features as appropriate.

An authorization code may be provided by any one or more of a variety of different parties. For example, a casino (e.g., a representative of a casino, such as a slot host, system administrator, or other employee) may provide an authorization code (e.g., to a slot server, to a gaming device). In another example, a regulatory body or group (e.g., a state, federal, or local government regulating agency; an industry regulatory or standardization group) may provide an authorization code for a feature. For example, if a state regulatory agency does not approve of a feature, then it may refuse to issue an authorization code for the feature, thereby preventing the feature from being enabled on gaming devices. Alternatively, the agency may issue an authorization code that disables a previously-enabled feature. In another example, the state regulatory agency may mandate that a particular feature be enabled, and may issue a corresponding authorization code. A proprietor of a feature (e.g., a game manufacturer, a patent holder) may provide an authorization code. For example, a game manufacturer may sell authorization codes for a particular feature. In another example, in order to enable a pre-installed feature (e.g., a program including instructions for providing the feature was previously provided to a casino) on a gaming device, a casino can purchase the appropriate authorization code from the game manufacturer.

According to some embodiments, an authorization code may be generated in a manner so as to prevent, discourage, or make computationally unfeasible forgery of authorization codes (e.g., using cryptographic techniques). An authorization code may be generated by a trusted third party. For example, a proprietor may request that a third party generate an authorization code. The third party may generate the code and transmit the code to the requesting party. Alternatively, or in addition, the third party may transmit the authorization code to a controller, a player, or a gaming device for use in accordance with various embodiments of the present invention.

According to some embodiments of the present invention, it may be difficult or impossible to enable a feature of a game or a gaming device without an authorization code. For example, a casino may not be able to enable a particular feature unless an authorization code has been received (e.g., from a proprietor of the feature). In another example, a gaming device may not be able to provide for a feature unless the authorization code has been provided to the gaming device (e.g., by a controller, by a game manufacturer). Similarly, according to some embodiments, it may be difficult or impossible to disable a feature of a game or a gaming device without a corresponding authorization code.

In one or more embodiments, an authorization code may enable a feature and prevent subsequent disabling of the feature (e.g., for a predetermined minimum number of uses of the feature). Similarly, in some embodiments an authorization code may disable a feature and prevent enabling of the feature (e.g., for a period of time).

In one or more exemplary embodiments for enabling a feature, the authorization code provides a processor or operator of a gaming system with access to a file, storage device, program, and/or program module that is necessary to enable or disable a feature. For example, in a manner known in the art, a program for providing one or more features in a gaming system may require that an operator of the system provide an appropriate authorization code (e.g., a password, an access code) before allowing a feature to be enabled. One or more authorization codes may be stored, for example, in feature database 425 (FIG. 4). According to some embodiments of the present invention, an authorization code may be required in order to add, delete, or modify one or more conditions for enabling and/or disabling a feature.

A condition for whether to enable and/or disable a feature may be related to one or more authorization codes. In some exemplary embodiments, a condition for enabling a feature may require that one or more authorization codes have been provided. For example, in order for a casino to enable a "Jackpot Only" feature on its slot machine network, the casino may have to acquire one authorization code from the owner of a patent for "Jackpot Only" and another authorization code from the manufacturer of the casino's slot machines at which "Jackpot Only" can be enabled. Accordingly, to enable the "Jackpot Only" feature, the slot network controller determines whether or not the two authorization codes have been received (i.e. whether the exemplary condition for enabling "Jackpot Only" is satisfied).

According to some embodiments, a plurality of authorization codes may be required to enable a feature. For example, a feature on a gaming device may only be enabled if a first authorization code is provided by a first party (e.g., a regulator) and a second authorization code is provided by a second party (e.g., a proprietor). Alternatively, an authorization code may comprise multiple parts that may be provided by multiple parties. Of course, a plurality of authorization codes (or parts of an authorization code) may be provided by one party rather than multiple parties.

In some exemplary embodiments, whether or not a feature may be enabled and/or disabled may be based on a period of time since an authorization code was provided. For example, the authorization code may have an associated period of validity (e.g., thirty days after providing of the authorization code, thirty days after a corresponding feature is enabled or disabled). After the associated period of time (e.g., when the authorization code "expires"), a controller, for example, may be prevented from enabling and/or disabling a feature. Thus, a casino may be allowed by a proprietor (or a regulatory body, etc.) to enable a feature for only a limited period of time. Conversely, a casino may be prevented by a proprietor of a feature from disabling the feature until after the feature is used for a minimum period of time. In some embodiments, a new authorization code must be provided after (or before) the period of time in order to allow for enabling and/or disabling of the feature (e.g., by a controller, by a gaming device). Alternatively, or in addition, an authorization code may have an expiration date after which the authorization code is no longer valid for enabling and/or disabling one or more features.

In other exemplary embodiments, whether or not a feature may be enabled and/or disabled may be based on an amount of use of a feature (e.g., since an authorization code was provided, since a corresponding feature was enabled or disabled). For example, the authorization code may be associated with a number of uses of a feature (e.g., 500 uses by a gaming system, 5 uses by a player, 200 uses by a gaming device). Thus, a casino may be allowed to enable a feature for only a limited period of time based on the provided authorization code. Conversely, a casino may be prevented from disabling an enabled feature until the feature has been used a minimum number of times. Of course, usage of a feature may be measured in various ways other than a number of uses, as discussed herein. For example, an authorization code may expire after an associated total wager amount in games using the feature.

According to one or more embodiments of the present invention, a feature may be automatically disabled or enabled if an authorization code is not provided in accordance with various criteria. Examples of predetermined conditions that must be satisfied for automatically disabling or enabling a feature include, but are not limited to:

(i) requiring that an authorization code be entered every thirty days to keep a feature enabled on a gaming device;

(ii) requiring that an authorization code be entered every two hundred thousand spins to keep a feature enabled for a slot machine game; and (iii) requiring that an authorization code be provided in order to disable at a gaming device a feature for automatically displaying advertisements.

A feature may be associated with more than one authorization code (or type of authorization code). For example, one authorization code may allow a casino to enable a feature for thirty days at a first type of gaming device at any time of day, and a different authorization code may permit a casino to enable the same feature for a year at a different type of gaming device only during peak hours. Accordingly, determining whether a condition for enabling and/or disabling a feature is satisfied may include determining the type of authorization code provided.

An authorization code in accordance with various embodiments of the present invention may allow for enabling and/or disabling of: (i) multiple (or all) features for multiple (or all) games on multiple (or all) gaming devices; (ii) multiple (or all) features for multiple (or all) games on one gaming device (e.g., a different code is needed for a different gaming device, an authorization code is associated with a particular gaming device); (iii) multiple (or all) features for one game on multiple (or all) gaming devices (e.g., a different code is needed for a different game, an authorization code is associated with only one game); (iv) multiple (or all) features for one game on one gaming device (e.g., a different code is needed for a different game on the same gaming device, or for the same game on a different gaming device; an authorization code is associated with only one gaming device and with only one game); (v) one feature for multiple (or all) games on multiple (or all) gaming devices (e.g., a different code is needed for a different feature, an authorization code is associated with only one feature); (vi) one feature for multiple (or all) games on one gaming device (e.g., a different code is needed for a different feature on the same gaming device, or for the same feature on a different gaming device; an authorization code is associated with only one feature and with only one gaming device); (vii) one feature for one game on multiple (or all)

gaming devices (e.g., a different code is needed for a different feature in the same game, or for the same feature in a different game; an authorization code is associated with only one feature and with only one game); and (viii) one feature for one game on one gaming device (e.g., a different code is needed for every single feature on every single game on every single gaming device, an authorization code is associated with only one feature and with only one game and with only one gaming device).

Thus, according to one exemplary embodiment of the present invention, one or more authorization codes may be used to enable or disable only a single feature on only a single gaming device. Thus, an additional authorization code (or codes) may be necessary to enable or disable a different feature on the same gaming device, and an additional authorization code (or codes) may be necessary to enable or disable the same feature on a different gaming device. Such an embodiment would prevent a casino, for example, from using the same authorization code to enable the same feature on multiple gaming devices and/or to enable multiple features on one or more gaming devices.

Some embodiments of the present invention permit an interested party to verify usage data relating to a game machine and know that an "attacker" has not misrepresented this usage data. According to some embodiments, the invention may provide the following benefits: data legitimacy (i.e., knowing that usage data is based on usage of a game machine. For example, an authentication code may authenticate that an attacker did not simply fabricate data relating to usage of a game machine); data paternity (i.e., knowing where usage data comes from. For example an authentication code may authenticate that usage data was generated by a specific game machine, a specific type of game machine, or a game machine from a specific group); data integrity (i.e., knowing that usage data has not been tampered with or modified in any manner. For example, an attacker may attempt to modify usage data to reduce a payment that it owes to a game manufacturer); data temporality (i.e. knowing that usage data corresponds to activities during a given time. For example, time stamping a feature activation time); game machine integrity (i.e. knowing that a game machine has not been tampered with or modified in any manner. For example an attacker may attempt to modify a game machine to change the way an authentication code is generated or determine a secret key stored in the game machine); transmission integrity (i.e., knowing that usage data or an authentication code has not been modified during transmission, either accidentally or intentionally. Different methods of transmitting an authentication code from a game machine to an authentication server are described in detail below); and non-repudiation (i.e., preventing a party from denying that it provided an input. For example, an attacker may attempt to deny that he chose to enable a feature on a game machine).

According to some embodiments, data regarding usage of a game machine may be verified for an interested party. An interested party may be a party that is interested in knowing that usage data relating to game machine is authentic. Examples of interested parties include:

(i) regulatory groups (e.g., state government)—For example, a state government may be interested in verifying that a casino is paying the appropriate taxes for game machines that it operates.

(ii) licensors (e.g. patent, trademark, and/or copyright holders)—For example, a licensor may be interested in verifying that a casino is paying the appropriate licensing fees for a trademark, patent, or copyright.

(iii) game manufacturers—For example, a game manufacturer may lease a game machine to a casino for a percentage of revenues generated by the game machine. The game manufacturer may be interested in verifying the revenues generated by the game machine to ensure that the casino provides the correct lease payments.

(iv) subsidizers or sponsors (e.g., credit card companies, consumer product manufacturers, retailers)—For example, a game machine may present offers or advertisements to players. A subsidizer or sponsor may pay a fee based on offers presented, advertisements viewed, or offers accepted by a player. The subsidizer may be interested in verifying that it is not being overcharged.

(v) casino—For example, a game machine may be a portable device that a player may take out a casino. The casino may wish to verify that the player did not tamper with the game machine in any way.

(vi) player—For example, a player may wish to prove his usage of a game machine to obtain a benefit as part of a non-networked comp system.

Note that as discussed in detail above, according to some embodiments, a casino may provide consideration to an interested party based on usage data and an interested party may provide consideration to a casino based on usage data. Note also that it is possible for a party (e.g., a casino) to be both an interested party and an attacker.

Various parties may be interested in misrepresenting usage data from a game machine and thereby deceiving one or more interested parties. For clarity, the term "attacker" is used to refer to any party that may attempt to tamper with, forge, hide, or otherwise misrepresent usage data from a game machine. Examples of attackers include disreputable casinos, untrustworthy or error prone casino employees, and/or players. Casinos may include any party that owns or leases a gaming device and enables a player to play games on the gaming device. Examples of a casino as an attacker include:

(i) A casino employee may inadvertently misrepresent usage data that is reported to a regulatory group. For example, a casino may unintentionally overstate the revenues from a game machine, thereby unnecessarily increasing its taxes due to a tax collector.

(ii) A casino employee may misrepresent usage data that is reported to a licensor. For example, a casino may understate the usage of a patented feature on a game machine, thereby reducing a licensing fee that it owes to the holder of a patent on the patented feature.

(iii) A casino employee may misrepresent usage data that is reported to a game manufacturer. For example, in an effort to qualify for a personal bonus, a casino employee may overstate the revenues from a game machine to make it appear that the gaming activity associated with him as a host is larger than it actually is. The end result is that not only has the employee cheated the casino, but the fee owed to the game manufacturer is inflated.

(iv) A casino employee may misrepresent usage data that is reported to a third-party subsidizer. For example, a casino may unintentionally overstate the number of advertisements displayed on a game machine and erroneously attempt to overcharge the advertiser for displaying the advertisements.

Examples of a player as an attacker include:

(i) A player may misrepresent usage data relating to comps. For example, a player may overstate his usage of a game machine (e.g., a portable game machine), thereby entitling himself to more comps from a casino.

(ii) A player may misrepresent usage data relating to outcomes. For example, a player may overstate his winnings or understate his losses achieved at a game machine (e.g., a portable game machine, or a game machine that player has tampered with or stolen money out of), thereby defrauding one or more parties associated with the game machine (e.g. a casino, a game manufacturer, a regulatory group).

(iii) A player may misrepresent usage data relating to features. For example, a player may claim that he did not activate a feature on a game machine, thereby avoiding the affects of the feature, or paying a fee to an interested party (e.g., a casino) based on usage of the feature.

(iv) A player may misrepresent usage data relating to location. For example, a player may hide the fact that he used a portable game machine in a state where they are prohibited, thereby avoiding being arrested and/or fined.

(v) A player may tamper with a game machine. For example, a player at a casino may alter a game machine so that it produces one or more winning outcomes.

Note that an attacker (e.g., a player) may cheat or otherwise attack an authentication system in a variety of different ways. According to various embodiments, the invention may prevent some or all of the following attacks:

(i) Usage data may be miscommunicated to an interested party. For example, two subsidizers may agree to pay a casino $0.25 for each promotional offer that is presented to a player at a game machine. During the course of a month, the game machine may present 300 promotional offers to players from the first subsidizer and 100 from the second. However, the casino might unintentionally report to the first subsidizer that only 100 promotional offers were presented to players and report to the second subsidizer that 300 of their offers were presented. The present invention helps avoid any confusion as to the number of offers presented and to whom.

(ii) An attacker may attempt to reuse usage data from a previous time period. For example, a casino employee may record the usage data for May 2001 (e.g., a month with low revenues) and then claim that this usage data corresponds to June 2002, thereby reducing the claimed revenues for June 2002. Without the present invention, an interested party (e.g., a licensor) may have no way of knowing that it had received incorrect data.

(iii) An attacker may attempt to reuse usage data on a second game machine. For example, a first game machine (e.g., one that generates few revenues) may generate usage data for May 2002. This usage data may be transmitted to the authentication server in an appropriate manner. However, the casino employee may claim that this usage data also corresponds to a second game machine for May 2002 (e.g., one that in fact generated greater revenues), thereby reducing the claimed revenues for the second game machine. Without the present invention, an interested party (e.g., a game machine manufacturer) may have no way of authenticating the temporality and/or reuse of usage data.

(iv) A attacker may attempt to switch usage data between two or more game machines. For example, a first game machine (e.g., one with a high percentage of revenues as a license fee) may generate a first set of usage data (e.g., corresponding to high revenues) and a second game machine (e.g., one with a low percentage of revenues as a license fee) may generate a second set of usage data (e.g., corresponding to low revenues). A casino employee may inadvertently report that the first set of usage data corresponds to the first game machine and the second set of usage data corresponds to the second game machine, thereby reducing its total license fees. Without the present invention, an interested party (e.g., a game machine manufacturer) may have no way of authenticating the source of the usage data.

(v) An attacker may deny that it enabled or disabled a game machine or a feature on a game machine. For example, a route operator (i.e. a business that manages multiple game machines at multiple locations often for multiple gaming device owners) may pay a fee to a game manufacturer for each feature that it enables on a game machine. Without the invention, a route operator might enable a feature and then claim that this feature was not enabled. Similarly, a route operator may claim that a game machine activated a feature without the permission of the route operator. Using a combination of activation codes (discussed above) and authentication codes, the present invention may clarify that only the route operator could have activated the feature.

(vi) An attacker (e.g., a player) may tamper with a game machine (e.g., by modifying the software or hardware of the game machine). For example, a player may attempt to modify a game machine to change a payout table. According to various embodiments, the present invention may prevent such an attacker from modifying a game machine or alert a casino or interested party if a game machine has been modified.

In addition, the present invention may prevent accounting errors relating to tracking usage data. For example, usage data may be accidentally miscommunicated to an interested party. For example, when copying usage about a game machine, a casino employee may accidentally mistake a "7" for a "1", thereby reducing a license fee from $7000 to $1000. Using authentication codes, the invention may allow a system to identify and correct this error. In another example, a transmission error may cause usage data to be modified. For example, a packet of data may be modified during transmission from a game machine to an authentication server. Using authentication codes, the invention may allow a system to identify and correct this error. Note that many other attacks are also possible.

Figure 13A:
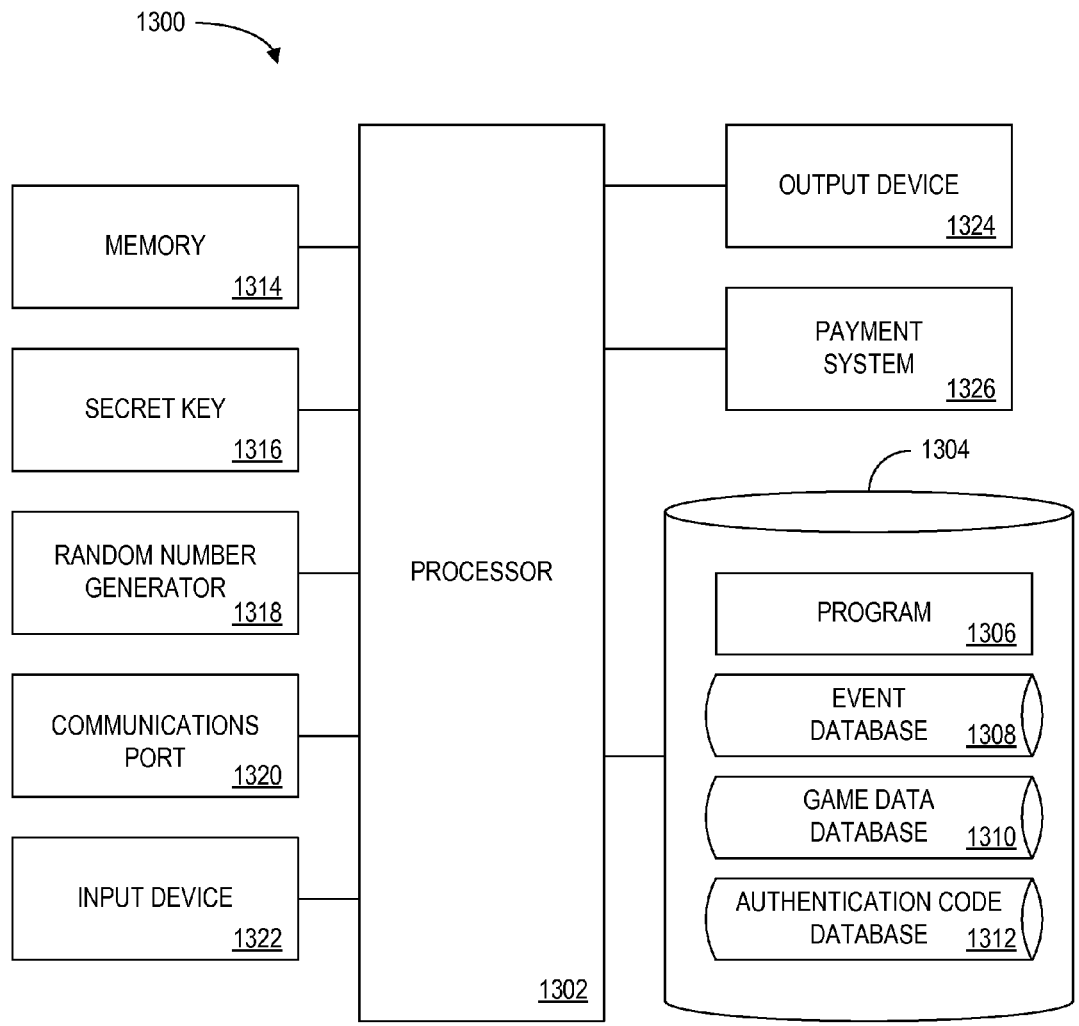
FIG. 13A is a block diagram of an exemplary gaming device consistent with one or more embodiments of the present invention.
Figure 13B:
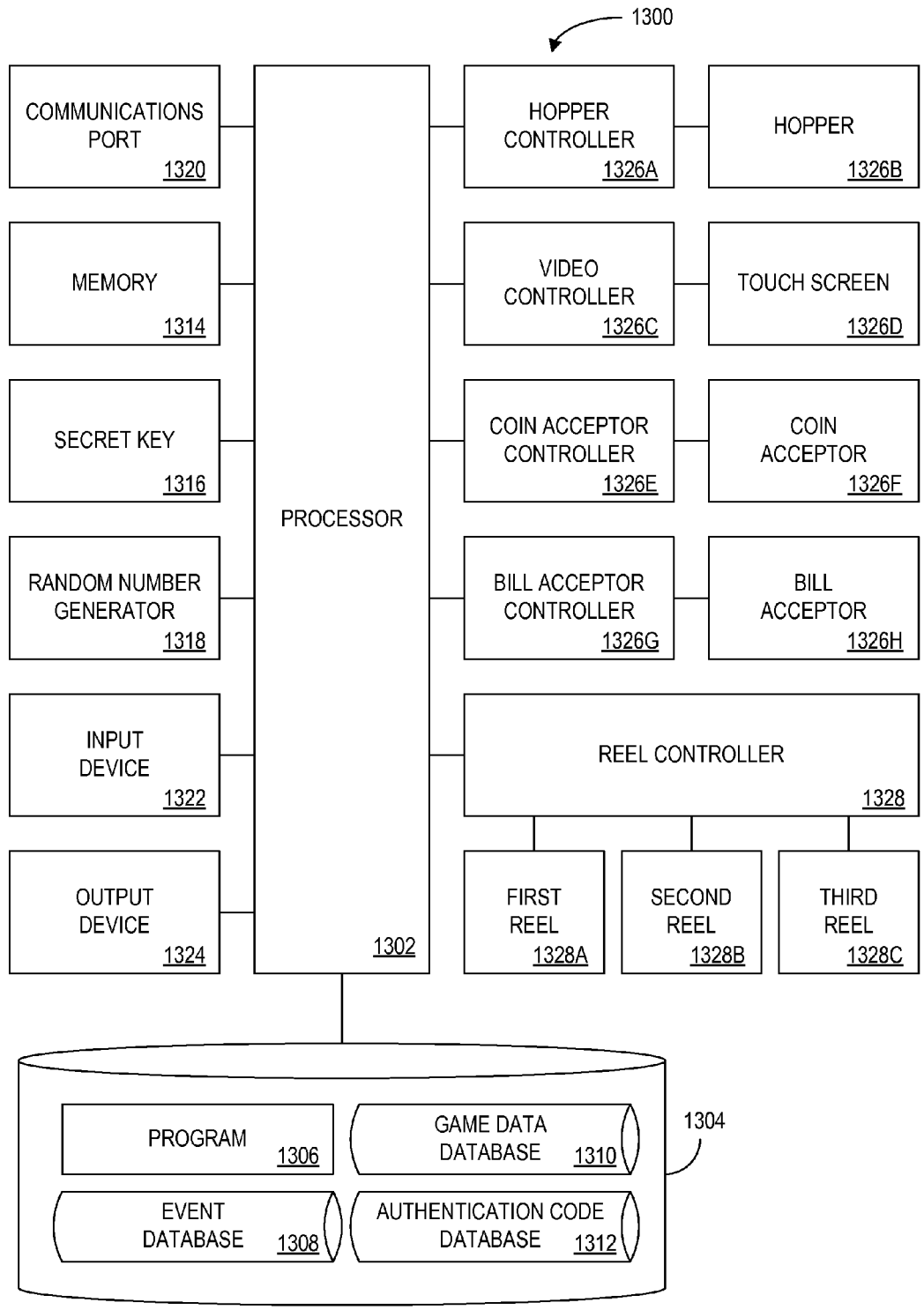
FIG. 13B is a block diagram of an exemplary gaming device consistent with one or more embodiments of the present invention.

Turning to FIGS. 13A and 13B, block diagrams of other examples of a gaming device 1300 according to some embodiments of the present invention are provided. The gaming devices 1300 depicted include features to support embodiments that including outputting authentication codes that allow interested parties to verify usage data. As indicated above, examples of such gaming devices 1300 may include slot machines (e.g., located in a casino or on a riverboat), video poker terminals, video lottery terminals, pachinko machines, table-top games (e.g., located in a bar or other commercial establishment), personal computers (e.g., to communicate with website that provides gambling services), telephones (e.g., to communicate with an automated sports book that provides gambling services), portable gaming devices (e.g., a personal digital assistant, a laptop computer, or Nintendo® GameBoy®), and in embodiments of the present invention addressing table game play such as blackjack, craps, roulette, poker, baccarat, keno, bingo, and the like, the gaming device may include hardware (e.g., a table-top box) located at the game table suitable for tracking events at the game table. The embodiments shown in FIGS. 13A and 13B include a processor 1302, memory 1314, a secret key 1316, a secure perimeter (not shown), a random number generator 1318 (e.g., to generate random or pseudo-random outcomes), a communication port 1320 (e.g., to communicate with a casino server or authentication server), at least one input device 1322, at least one output device 1324, a payment system 1326 (1326A to 1326H in FIG. 13B), a data storage device 1304, and a clock (not shown). As illustrated in FIG. 13B, a gaming device 1300 such as a reeled slot machine will also include a reel controller 1328 and one or more reels 1328A to 1328C.

As with other embodiments described above, the processor 1302, also referred to as a microprocessor, "CPU" or "central processing unit," is suitable for executing instructions and performing processes of the invention. For example, a gaming device 1300 may include an Intel® Pentium 4® microprocessor. According to some embodiments, a gaming device 1300 may include a plurality of processors. For example, a gaming device 1300 may include a first processor for executing operations relating to game play and a second processor for performing cryptographic functions relating to authenticating usage data.

Note that in some embodiments a player may operate multiple gaming devices. For example, a player may simultaneously play two side-by-side gaming devices, a player may play a gaming device and then continue his gambling session at a video poker machine, and/or a player may use a telephone or other device to remotely operate a gaming device. According to various embodiments, a gaming device may enable a player to play a variety of different types of games. Notable embodiments of different types of games include a game of chance (e.g., a slot machine, video poker, pachinko, blackjack); a game of skill (e.g., skill crane, skee-ball, a video game which may be more appealing to certain players or may be permitted in areas where it is illegal to gamble on games of chance); a game that provides a prize; a game that has an entry fee; and/or a game that is a combination of any of these types.

Output devices 1324 include devices that may be used to output information from a gaming device (e.g., to a player). Examples of output devices include: a video monitor, a light-emitting diode (LED), an audio speaker, an electric motor, a printer, a coupon or product dispenser, an infra-red port (e.g., for communicating with a second slot machine), a Braille computer monitor, a coin or bill dispenser, a floppy disk drive, a compact disc burner. For gaming devices, examples of common output devices include a cathode ray tube (CRT) monitor on a video poker machine, reels on a slot machine, a bell on a slot machine (e.g., rings when a player wins), an LED display of a player's credit balance on a slot machine, an LCD display of a personal digital assistant (PDA) for playing keno numbers, and a printer to provide a receipt for a player's gambling credits. An output device may output information relating to game play, as is known to those skilled in the art. An output device 1324 may output an authentication code, as described below.

Input Devices 1322 include devices that may be used to receive an input (e.g., from a player). Examples of input devices 1322 include a "spin" button, a coin or bill acceptor, a lever on a slot machine, a touch screen (e.g., on a video poker machine), a magnetic stripe reader (e.g., to read a player tracking card), a computer keyboard, a computer mouse, microphone (note that a microphone may be part of, or be otherwise associated with a voice recognition module), a video camera, biometric input device (e.g., a fingerprint reader, a camera with facial recognition capability, a retinal scanner, a DNA sequencer), a radio antenna (e.g., for receiving inputs from a second slot machine), a position sensor (see details below), a voice recognition module, voltage sensor (e.g., some touch screens use voltage sensors to determine where a user touches the screen), current sensor (e.g., some touch screens use current sensors to determine where a user touches the screen), and a weight sensor (e.g., to determine how many coins are in the hopper of a gaming device).

According to some embodiments, a gaming device 1300 may include a position sensor suitable for determining a location of the gaming device. Examples of position sensors include a GPS (global positioning system) device, a radio beacon, a cellular telephone (note that the FCC has mandated that all cellular telephones include Automatic Location Identification (ALI) by January 2006), an inertial measurement unit (IMU) (e.g., an inertial measurement unit may include a plurality of gyroscopes and accelerometers and, by using measurements from these sensors, it may be possible to determine the position of the gaming device), and/or a dead-reckoning system (e.g., a gaming device may be located in an automobile. By tracking the distance and direction traveled by the automobile, it may be possible to determine the location of the automobile). It may be particularly useful to include a position sensor in a gaming device that is portable. For example, a gaming device may be a laptop computer, a tablet computer, a personal digital assistant, or a handheld gaming device (e.g., a Gameboy®).

A gaming device 1300 may include a payment system 1326 that performs two main functions, accepting payment from a player (e.g., a bet) and providing payment to a player (e.g., a prize). It should be noted that payment is not limited to money but may also include other types of consideration, including products, services, and alternate currencies (e.g., casino chips). Exemplary methods of accepting payment from a player include receiving hard currency (i.e., coins or bills via a coin or bill acceptor), receiving an alternate currency (e.g., a paper cashless gaming voucher, a coupon, a casino token), receiving a payment identifier (e.g., a credit card number, a debit card number, a player tracking card number wherein the account identified by the payment identifier may then be debited accordingly), and/or determining that a player has performed a value-added activity.

Exemplary methods of providing payment to a player include dispensing hard currency (i.e., coins or bills), dispensing an alternate currency (e.g., a paper cashless gaming voucher, a coupon, a casino token), crediting a player account (e.g., a bank account or other financial account identified by a payment identifier such as a credit card number, a debit card number, and/or a player tracking card number), and/or providing a product or service to the player (e.g., a jackpot prize may be a new car).

According to some embodiments, a gaming device may store a secret key 1316. This secret key 1316 may be used for a variety of purposes relating to encryption, including encrypting authentication codes, encrypting usage data, encrypting information that is stored on a data storage device, decrypting information that is stored on a data storage device, decrypting messages from an authentication server, and encrypting messages to send to an authentication server. A variety of different types of secret keys 1316 are possible, depending on what type of encryption is employed by the gaming device 1300. Examples include a key for a symmetric encryption algorithm, a private key for a public-key encryption algorithm (a public key for a gaming device may be published through an authentication server), and/or a one-time pad. Different types of encryption are discussed in detail below.

A secret key 1316 may be generated or stored in a gaming device's memory 1314 in a variety of different ways, including:

(i) A secret key 1316 may be generated and stored in a gaming device when the gaming device is manufactured. For example, a gaming device manufacturer may generate a secret key 1316 and store this secret key in a ROM on a gaming device 1300. A duplicate copy of this secret key 1316 may be stored on an authentication server.

(ii) A secret key 1316 may be indicated to a gaming device 1300 using an input device 1322 or communication port 1320. For example, an employee of a casino or a gaming device manufacturer may use a numeric keypad to enter a secret key 1316 into a gaming device 1300.

(iii) A gaming device 1300 may generate its own secret key 1316. For example, a gaming device 1300 may generate a public key/private key pair for use in public key encryption. The gaming device 1300 may store the private key in memory as a secret key 1316, and output the public key for use by one or more interested parties.

Note that a secret key 1316 may be stored in a variety of different types of memory or data storage devices. Note that a secret key 1316 may be stored in a separate memory bank from a gaming device's random access memory. For example, a secret key 1316 may be stored in read-only memory in a gaming device's processor. According to some embodiments, a secret key 1316 may be protected by a secure perimeter. See below for details about secure perimeters. According to some embodiments, an attempt to access the key 1316 may result in the key being erased or destroyed. According to some embodiments, the same secret key 1316 may be used for a plurality of gaming devices. This may make it more convenient to manufacture gaming devices or decrypt authentication codes generated by gaming devices. However, note that if this secret key 1316 is compromised on one gaming device, then all the gaming devices that share the secret key may be compromised. Using a different secret key 1316 for each gaming device helps to avoid this risk. According to some embodiments, a secret key 1316 for a gaming device may be kept secret from at least one party (e.g., a casino) to prevent the party from tampering with one or more authentication codes generated by the gaming device.

According to some embodiments, a gaming device 1300 may include a secure perimeter (not shown). According to some embodiments, a secure perimeter may be a defined physical area of hardware which is tamper-resistant and/or temper-evident, in which resides data or algorithms whose characteristics must not be alterable in order for a system to remain secure. According to some embodiments, a secure perimeter may protect an entire gaming device. Alternatively, the secure perimeter may protect only a portion of the gaming device 1300, for example a secret key 1316 of the gaming device 1300; the processor 1302, memory 1314, and a secret key 1316; the processor 1302 of the gaming device 1300; the processor 1302 and memory 1314 of the gaming device 1300; the processor 1302, memory 1314, and data storage device 1306 of the gaming device 1300; and/or the processor 1302, memory 1314, and clock of the gaming device 1300.

A secure perimeter may help to prevent an attacker (e.g., a casino employee) from performing various activities that may compromise the objectives of the invention, including reading or determining information (e.g., a secret key 1316, or information stored in a database 1308, 1310, 1312); removing, adding, or otherwise altering data that is tracked by a gaming device 1300; altering a portion of a program 1306 that is run by a gaming device 1300; altering the hardware of a gaming device 1300; and/or altering an authentication code generated by a gaming device.

According to some embodiments, a secure perimeter may make at least a portion of the gaming device 1300 tamper-resistant. Tamper-resistant hardware or software may be difficult to modify or alter from its intended purpose. In some cases, attempts to alter such hardware or software will render the hardware or software inoperable. Examples of tamper-resistance include input/output pins of a computer chip may be electrically isolated to prevent pin-level probes; a computer chip may contain mechanical and/or chemical protection to prevent chip-probing equipment from accessing information in the chip; and/or if a gaming device is tampered with, then encryption keys and other data may be erased from memory. According to some embodiments, a secure perimeter may make at least a portion of the gaming device tamper-evident. Tamper-evident hardware or software may show, upon inspection or interrogation, evidence of any attempt or success at the modification or alteration of its intended purpose or stored data.

Examples of devices which incorporate secure perimeters include U.S. military encryption devices such as the STU-III telephone made by Motorola and AT&T, and the iPower card, available from National Semiconductor Corp.

According to some embodiments, a gaming device may include multiple secure perimeters. For example, a first secure perimeter may surround a gaming device's CPU and a second secure perimeter may protect a data storage device of the gaming device. Note that a secure perimeter is not shown in FIG. 13A or 13B.

As discussed above, a gaming device 1300 may include volatile or non-volatile memory, or a combination thereof. This memory may be electronic, capacitive, inductive, or magnetic in nature. Examples of memory include: RAM (random access memory), ROM (read-only memory). Memory may be used for storing information such as program instructions, encryption keys (e.g., a secret key), authentication codes, and/or activation codes.

As shown in FIGS. 13A and 13B, a gaming device 1300 may also include a data storage device 1304. According to some embodiments, this data storage device 1304 may store a program 1306, an event database 1308, a game data database 1310, and/or an authentication code database 1312.

Turning to FIG. 14, an embodiment of an event database 1308 is depicted. According to some embodiments, an event database 1308 may store a list of events that occur at a gaming device 1300. For example, the particular embodiment depicted stores the time of the event 1400, a player identifier 1402, and a description of the event 1404. Many other details regarding events may be tracked and the three chosen merely represent an example of the types of information that may be stored. Likewise, each row of the event database 1308 provides an example entry. For example, the second row indicates that a $20 bill was inserted into the gaming device 1300 at 3:45 PM on May 5, 2002 by a player with ID number PLAY-1-89403125.

Turning to FIG. 15, an example embodiment of a game data database 1310 is depicted. According to some embodiments, the game data database 1310 may store descriptions of data 1500 and values 1502 of information about usage of the gaming device 1300. For example, the particular example embodiment depicted stores total coin-in 1504; average coin-in per session 1506; number of offers presented 1508; percentage of offers accepted 1510; average revenue per hour 1512; total theoretical win 1514; percentage of game sessions longer than three hours 1516; and the total time that 3D graphics mode was used 1518. Details regarding these and other statistics that may be tracked in the game data database 1310 are described below. Note that offers presented and accepted refers to gaming device features that actually cause the gaming device to present offers to, and receive acceptances from, players.

Turning to FIG. 16, an example embodiment of an authentication code database 1312 is depicted. According to some embodiments, an authentication code database 1312 may store authentication codes and information that may be used in determining authentication codes. For example, for each entry, the particular example embodiment depicted stores a time 1600; a year-to-date coin-in 1602; the number of credit card offers presented since last update 1604; and an authentication code 1606. Note that the authentication code database 1312 may store information similar to that which is stored in the game data database 1310 (e.g., year-to-date coin in, and revenues since last update in this example).

According to some embodiments, some or all information stored on a data storage device 1304 may be encrypted (e.g., using a secret key 1316). For example, a program may be encrypted to prevent an attacker from tampering with the program and altering the operation of a gaming device, and/or an event database may be encrypted to prevent an attacker from altering stored information about usage of a gaming device. According to some embodiments, information on a data storage device 1304 that is encrypted may only be encrypted or decrypted using a secret key 1316, such as the type described above. According to some embodiments, a data storage device 1304 may be protected by a secure perimeter as described above.

As described above, the system of the present invention may include at least one communication network to enable communication between a gaming device 1300 and at least one other device. Examples of communication networks include local area networks (LANs), a wide area networks (WANs), the Internet, telephone lines, cable lines, radio channels, optical communications lines, and/or satellite communications links. Examples of communications protocols include Ethernet, Token Ring, Bluetooth™, and/or TCP/IP. Communication may be encrypted to ensure privacy and prevent fraud. In addition to those described above, examples of devices that a gaming device 1300 may communicate with include a casino server, an authentication server, and other gaming devices.

Figure 17A:
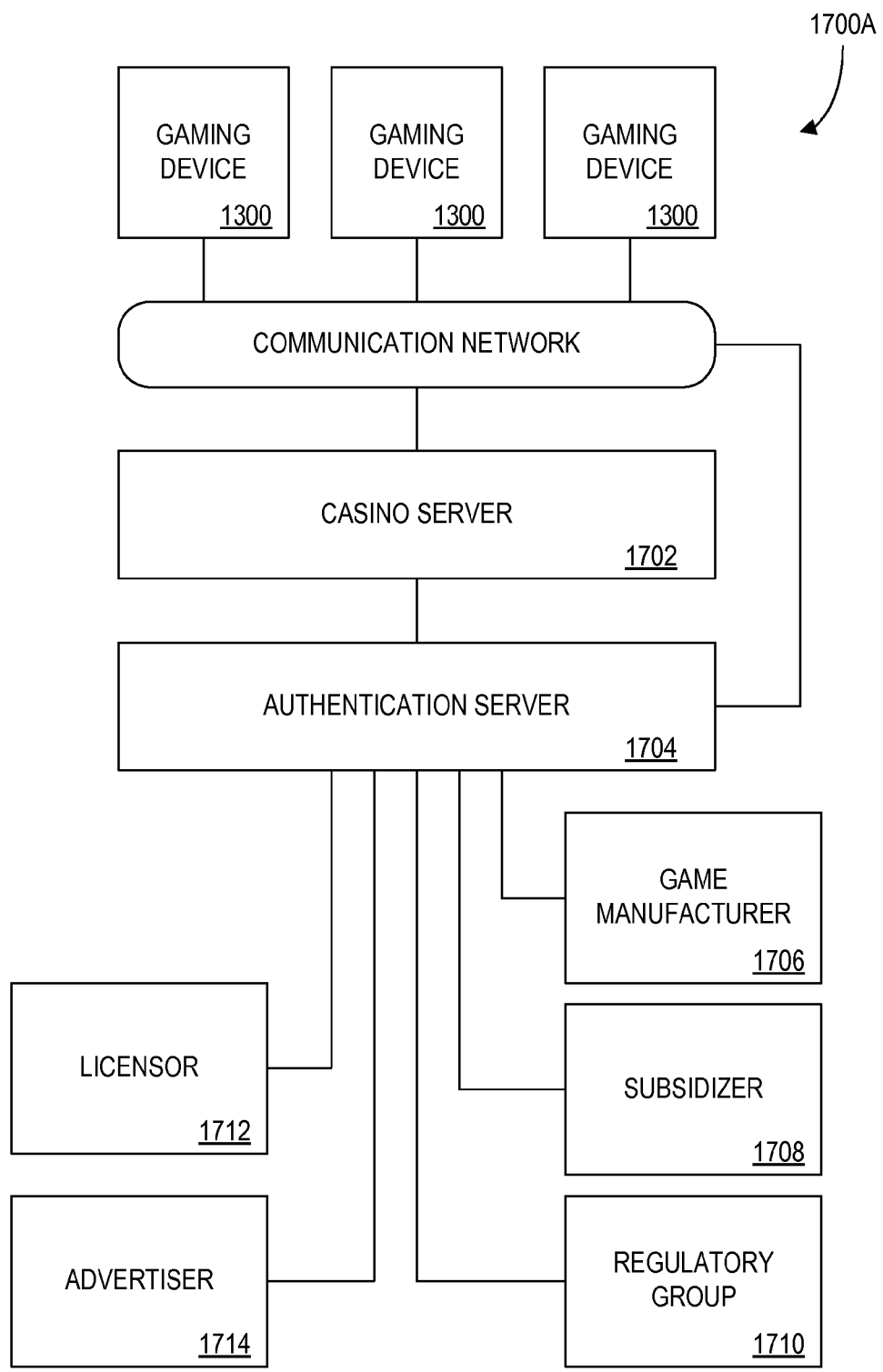
FIG. 17A is a block diagram of another exemplary system consistent with one or more embodiments of the present invention.

Turning to FIG. 17A, an embodiment of a system 1700A in which gaming devices 1300 communicate with a casino server 1702 and an authentication server 1704, is depicted. According to this embodiment, a gaming device 1300 may communicate with a casino server 1702 to perform traditional operations like enabling game play and providing comp points. In addition, a gaming device 1300 may also communicate with an authentication server 1704 to authenticate data relating to usage of the gaming device 1300. The authentication server 1704 may in turn communicate with one or more interested parties and/or their servers 1706, 1708, 1710, 1712, 1714.

Figure 17B:
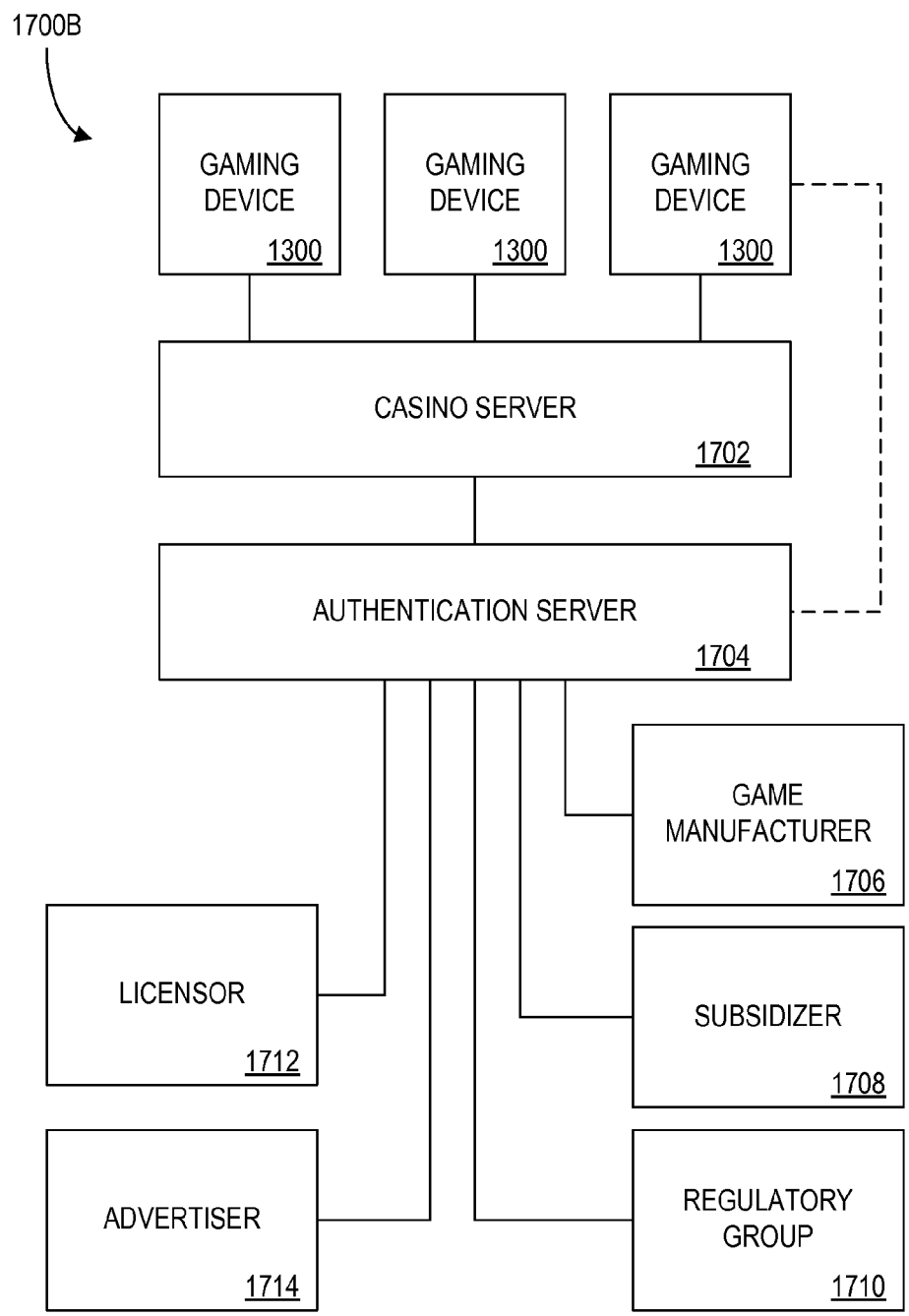
FIG. 17B is a block diagram of another exemplary system consistent with one or more embodiments of the present invention.

Turning to FIG. 17B, an embodiment of an alternative system 1700B in which gaming devices 1300 communicate with a casino server 1702 and the casino server 1702 in turn communicates with an authentication server 1704, is depicted. In certain circumstances, this embodiment may be preferred, possibly for security reasons. For example, a casino server 1702 may be located at a casino, and communicate with gaming devices 1300 using a secure, private network. An authentication server 1704 may communicate with the casino server 1702 using a public network (e.g., the Internet) and only establish virtual connections (dotted line) to the gaming devices 1300. Having the authentication server 1704 communicate through the casino server 1702 instead of directly with the gaming devices 1300 may help to minimize the risk that a malicious attacker/hacker on the public network gains access to the gaming devices 1300 by allowing the casino server 1702 to function as a gateway or firewall.

According to some embodiments, a casino server 1702 may be insecure (e.g., a casino employee may be an attacker). In such an embodiment, it would be very easy for an attacker (e.g., a casino employee) to perform various man-in-the-middle attacks on communication between a gaming device 1300 and an authentication server 1704. One way to prevent these attacks from being successful is to use an authentication code to communicate information about usage data, as described below.

Figure 17C:
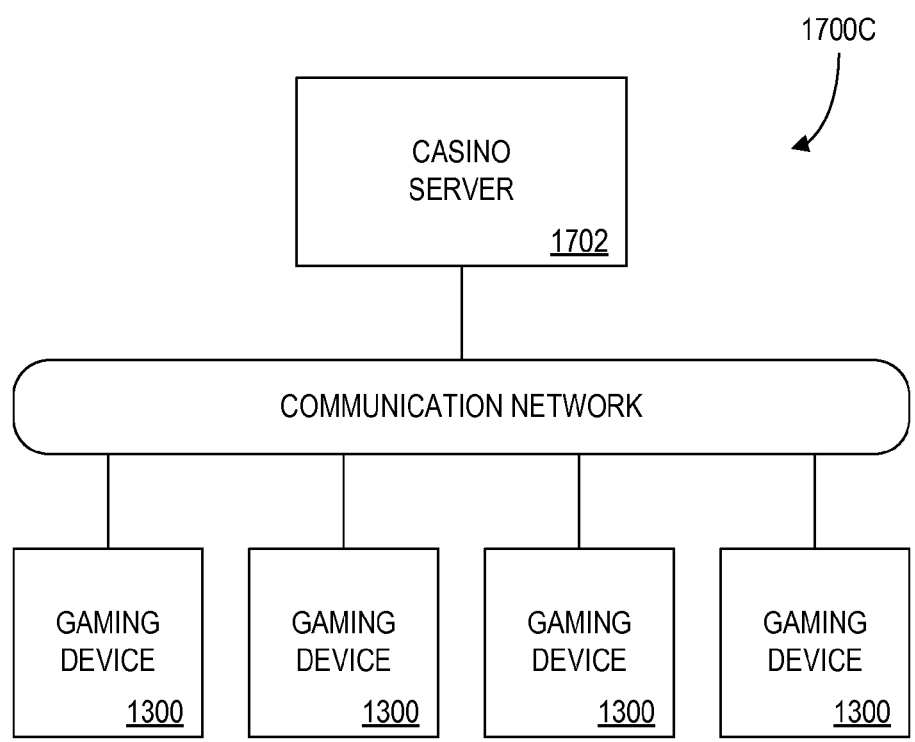
FIG. 17C is a block diagram of another exemplary system consistent with one or more embodiments of the present invention.
Figure 17D:
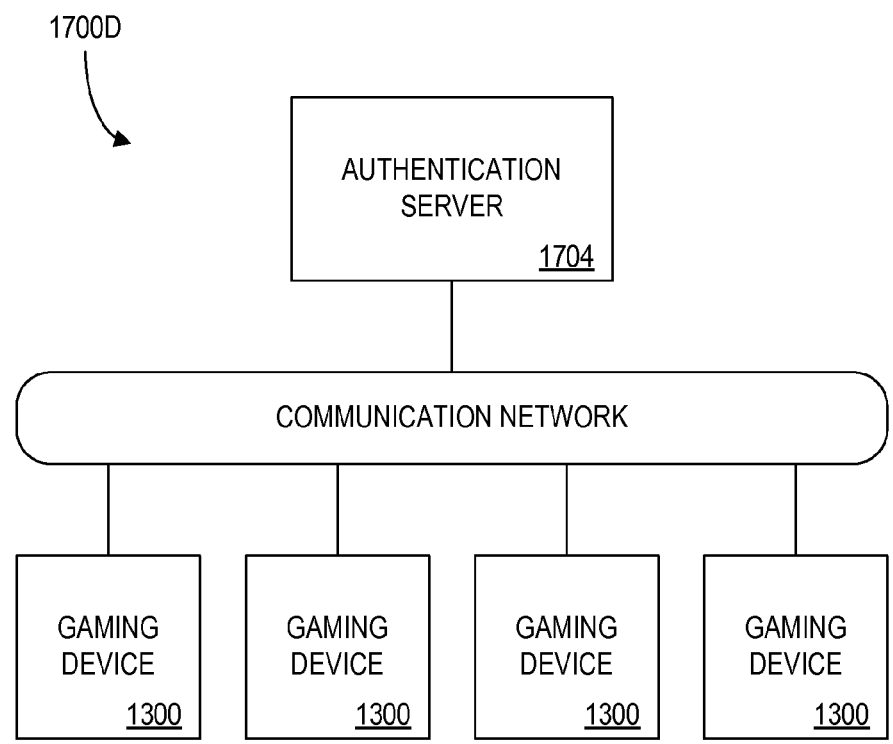
FIG. 17D is a block diagram of another exemplary system consistent with one or more embodiments of the present invention.

Turning to FIG. 17C, an embodiment of an alternative system 1700C in which gaming devices 1300 communicate with only a casino server 1702, is depicted. In such embodiments, authentication codes may be output to the casino server, or using other methods as described below. Likewise, FIG. 17D depicts an alternate embodiment of a system 1700D in which gaming devices 1300 communicate with only an authentication server 1704. For example, a gaming device 1300 may operate independently, without any need for a network connection to a casino server.

In some embodiments, a casino server 1702 and an authentication server 1704 may be operated by different entities or by the same entity. For example, a casino server 1702 may be operated by a casino where a gaming device 1300 is located, whereas an authentication server 1704 may be operated by a trusted third party (e.g., an authentication service provider). In some embodiments, a casino server 1702 and/or an authentication server 1704 may be remote from a gaming device 1300. In some embodiments, a gaming device 1300 may communicate with multiple casino servers and/or multiple authentication servers. In some embodiments, different gaming devices 1300 may communicate with different casino servers and/or different authentication servers. Note that, according to some embodiments, a gaming device 1300 does not communicate using a communication network. For example, a gaming device 1300 may output an authentication code to an operator using an output device 1324 (e.g., an LCD display).

Figure 18:
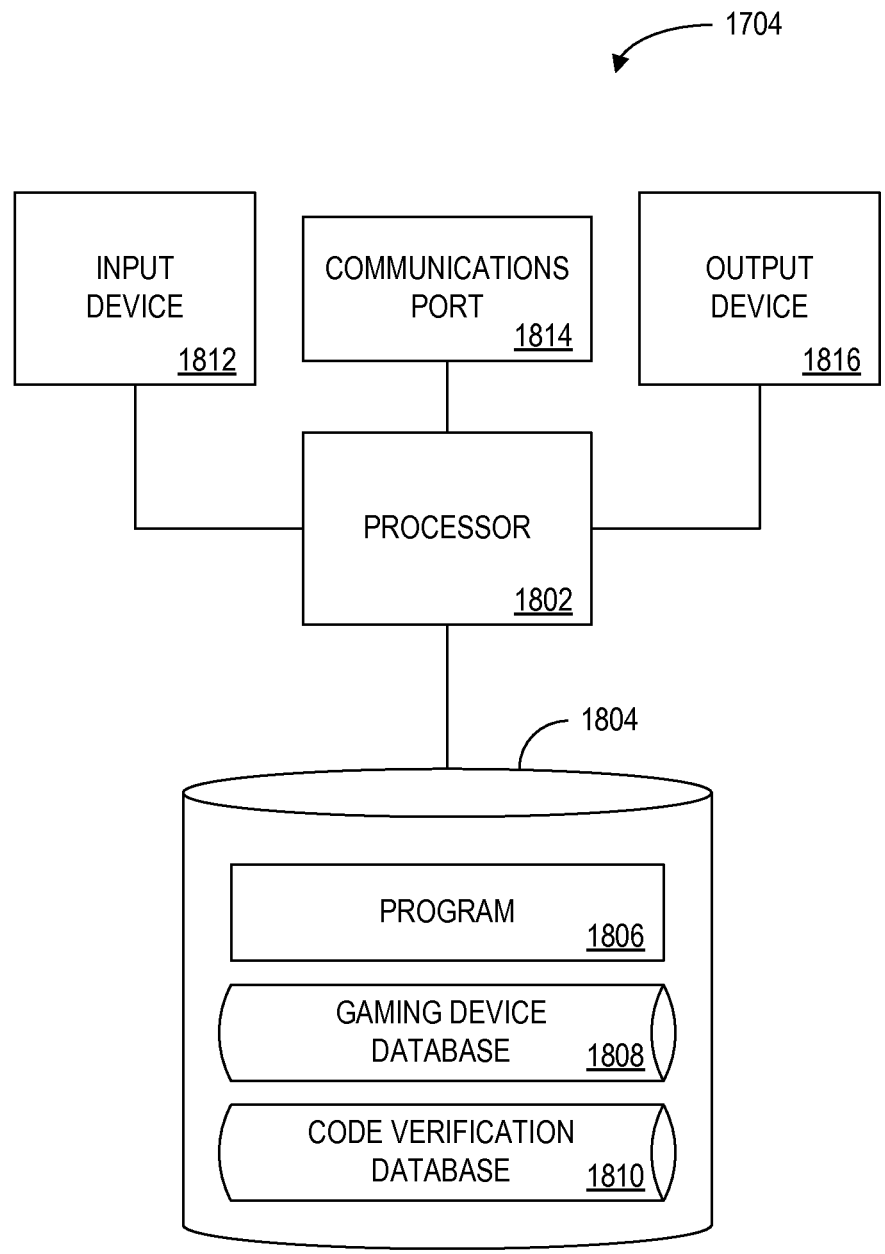
FIG. 18 is a block diagram of an exemplary authentication server consistent with one or more embodiments of the present invention.

Thus, according to some embodiments, the system of the present invention may include an authentication server 1704, which may perform functions relating to decrypting or verifying authentication codes. FIG. 18 depicts an example embodiment of an authentication server 1704. This example embodiment includes a processor 1802, an input device 1812, an output device 1816, a communication port 1814, and a data storage device 1804. In some embodiments, the components of the authentication server 1704 may include those of the other devices, computers, and servers as described above. In some embodiments, an authentication server 1704 may be part of a casino server or other device. In some embodiments, an authentication server 1704 may exist entirely as software. According to some embodiments, the data storage device 1804 may store a program 1806, a gaming device database 1808, and a code verification database 1810.

Turning to FIG. 19, an example embodiment of a gaming device database 1808 is depicted. According to some embodiments, a gaming device database 1808 may store information about gaming devices 1300 that generate authentication codes. For example, this example embodiment stores a gaming device identifier 1900 that uniquely identifies a gaming device 1300, a gaming device location 1902 (e.g., what casino or other party currently owns or leases the gaming device 1300); a decryption key 1904; and the gaming device year-to-date coin-in 1906 (an example of usage data).

According to some embodiments, an authentication server 1704 may use a decryption key to determine usage data based on an authentication code. Alternatively, or in addition, an authentication server 1704 may receive an indication of usage data in an unencrypted format and verify this usage data using an authentication code. According to some embodiments, an authentication server 1704 may store at least one decryption key 1904 for at least one gaming device. This decryption key 1904 may be used for a variety of purposes relating to encryption, including decrypting at least one authentication code, verifying at least one authentication code, decrypting usage data, verifying usage data, decrypting messages from a gaming device 1300, and/or encrypting messages to send to a gaming device. Various methods of verifying usage data using a decryption key are described in detail below along with the use of a wide variety of alternative encoding/decoding methods.

According to some embodiments, a decryption key 1904 stored by an authentication server 1704 may be based on a secret key 1316 stored by a gaming device 1300. For example, different types of decryption keys 1904 may be appropriate for different methods of generating an authentication code. Examples of decryption keys include a secret key (e.g., in a symmetric-key encryption system), a public key (e.g., in a public-key encryption system), and a one-time-pad (e.g., corresponding to a one-time pad stored in a gaming device).

FIG. 20 depicts an example embodiment of a code verification database 1810. According to some embodiments, a code verification database 1810 may store information relating to verifying at least one authentication code. For example, the depicted embodiment stores an authentication code 2000; a time received 2002; an indication of the gaming device that generated the authentication code 2004; and an indication of whether the usage data has been verified 2006. Each authentication code 2000, for example, that an authentication server 1704 receives may be stored in a code verification database 1810. According to some embodiments, an authentication server 1704 may store an indication of when 2002 an authentication code is received. According to some embodiments, an authentication server 1704 may store an indication 2004 of what gaming device 1300 generated an authentication code 2000 (e.g., based on information that is provided along with the authentication code 2000). According to some embodiments, an authentication server 1704 may use an authentication code 2000 to verify usage data for a gaming device and store an indication of whether this usage data was verified 2006. Details regarding how usage data is verified using an authentication code are provided below.

Note that any of number of various devices may function as an authentication server, including a computer server (note that a computer server may be operated by a variety of different parties, as described below); a casino server; and/or a gaming device 1300 (e.g., a gaming device 1300 may verify its own authentication code 2000, or an authentication code 2000 generated by another gaming device, such embodiments like these may be known as "self-authentication" or "mutual-authentication" or "self-verification" or "mutual verification").

According to some embodiments, an operator of an authentication server may use a terminal device (not shown) to communicate with the authentication server 1704. Examples of terminal devices include a personal computer, a network terminal, a laptop computer, a personal digital assistant (PDA), a cellular telephone, a kiosk. For example, an operator may use a PDA with a wireless Internet connection to provide inputs to an authentication server and receive outputs from the authentication server. A mobile terminal device may be particularly useful for verifying authentication codes on the floor of a casino while still maintaining an authentication server in a secure location.

According to some embodiments, an authentication server may be operated by an interested party. For example, a government regulatory group may operate an authentication server that verifies revenue information relating to a gaming device. This revenue information may then be used to determine taxes owed by a casino that owns or leases the gaming device. In another example, a gaming device manufacturer may operate an authentication server to verify that a casino is not unintentionally misrepresenting usage data for a gaming device. For example, a gaming device manufacturer may have a licensing agreement with a casino in which the casino agrees to pay the gaming device manufacturer a percentage of revenues from a gaming device. In another example, a gaming device feature licensor may operate an authentication server to verify that a casino or gaming device manufacturer is not misrepresenting usage data for a licensed feature on a gaming device. For example, a gaming device feature licensor may have a licensing agreement with a casino or gaming device manufacturer in which the casino or gaming device manufacturer agrees to pay the feature licensor a fee based upon incremental increases of revenues related to use of the licensed feature operating on a gaming device. In another example, a casino may operate an authentication server to verify usage data relating to a portable gaming device that is operated by players. For example, the casino can verify that the version of the software operating on the portable gaming device has not been altered or otherwise tamped with.

Figure 21:
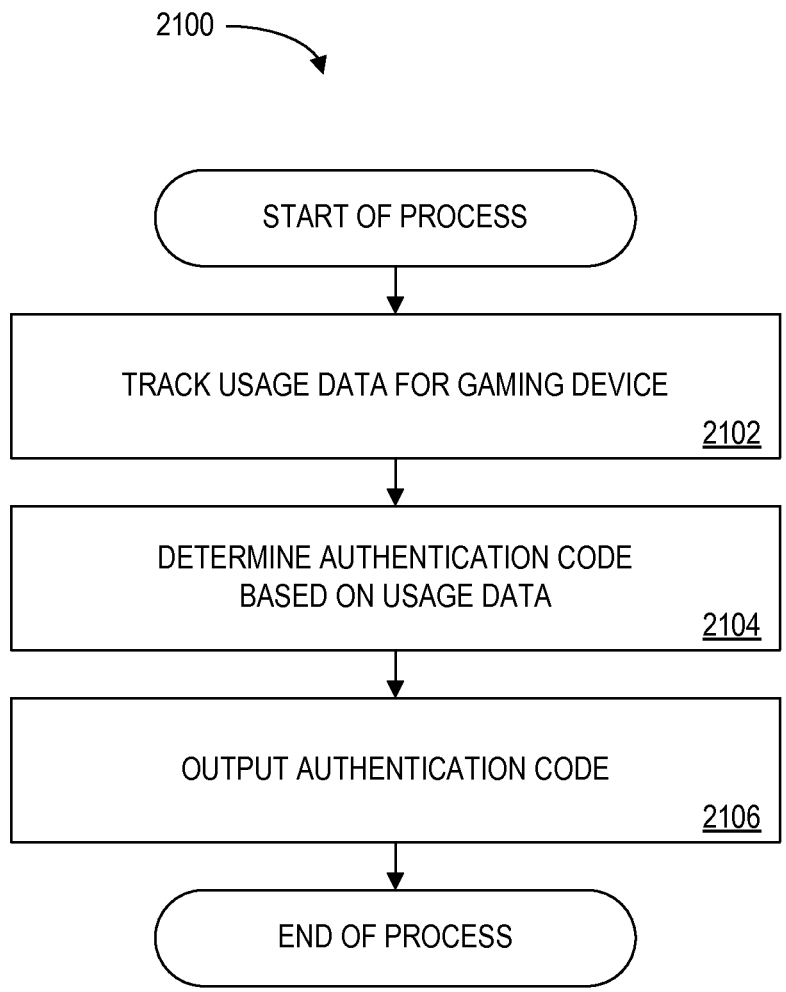
FIG. 21 is a flowchart depicting an exemplary process consistent with one or more embodiments of the present invention.
Figure 22:
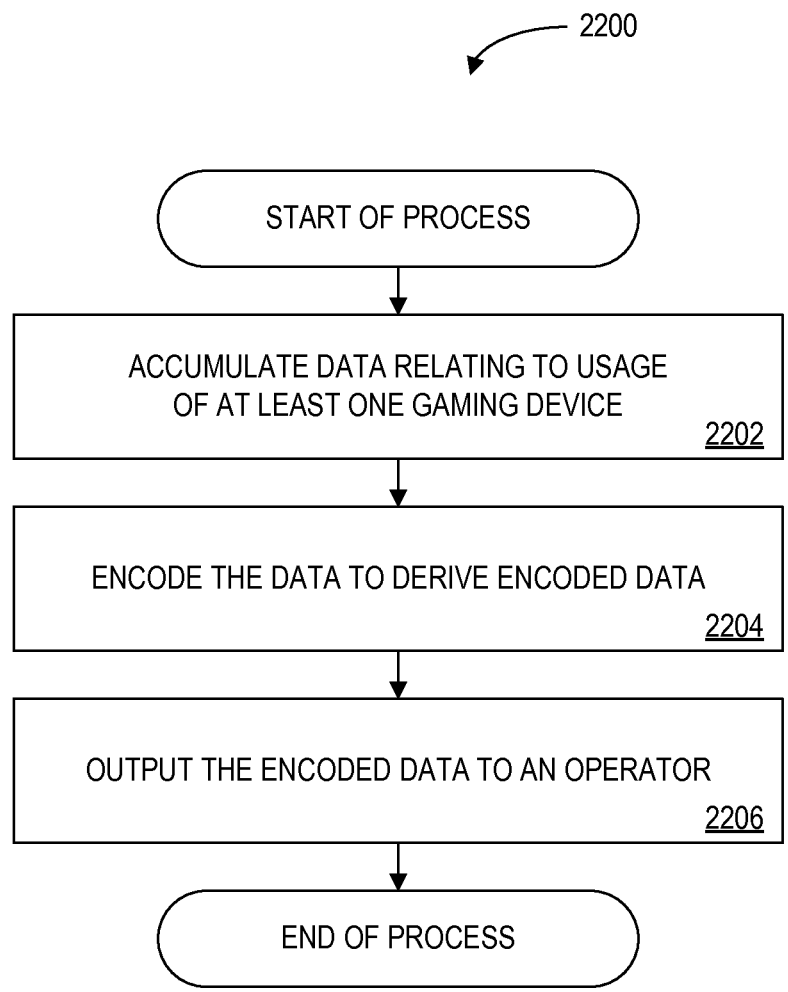
FIG. 22 is a flowchart depicting an exemplary process consistent with one or more embodiments of the present invention.
Figure 23:
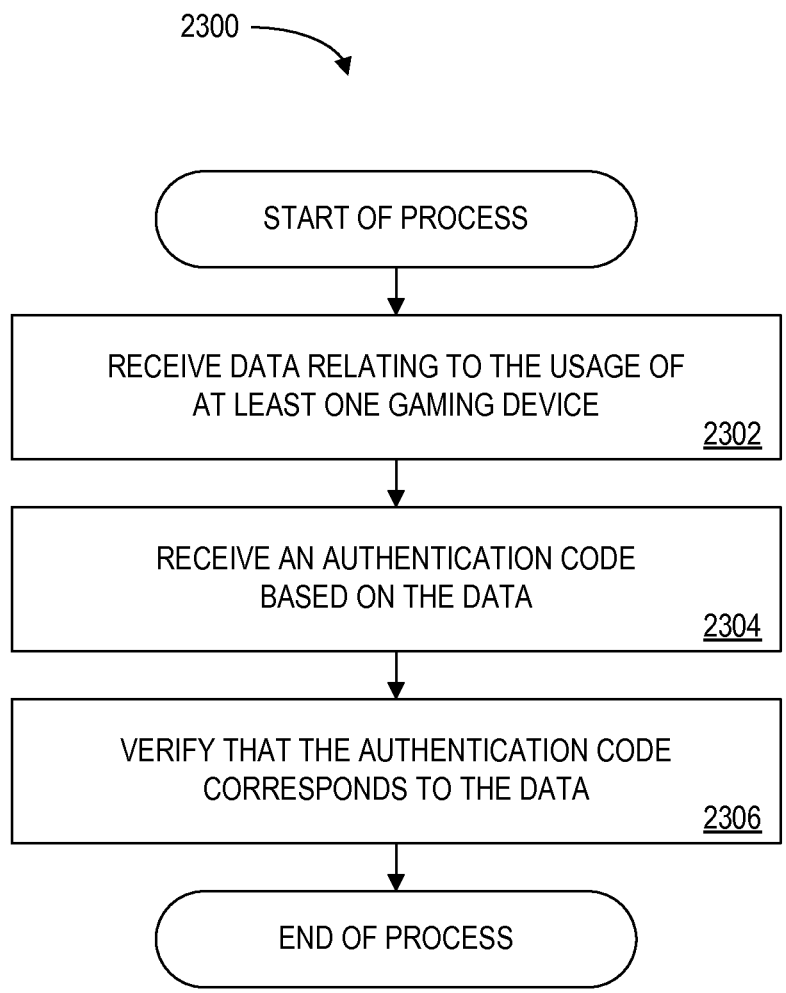
FIG. 23 is a flowchart depicting an exemplary process consistent with one or more embodiments of the present invention.

Turning to FIGS. 21 to 23, according to some embodiments, the present invention may include one or more of the following example processes: reporting usage data using an authentication code 2100; reporting usage data using encoding of the data (i.e., without an authentication code) 2200; and authenticating usage data 2300. Reporting usage data using an authentication code 2100 may include tracking usage data 2102, determining an authentication code 2104, and outputting an authentication code 2106. Reporting usage data using encoding of the data 2200 may include accumulating usage data 2202, deriving encoded data from the accumulated usage data 2204, and outputting the encoded data to an operator 2206. Authenticating usage data 2300 may include receiving usage data 2302, receiving an authentication code 2304, and verifying that the usage data corresponds to the authentication code 2306.

According to some embodiments, a gaming device may track or record data about usage of the gaming device (also known as "usage data"). As indicated above, a variety of different types of information may be recorded by a gaming device. According to some embodiments, a gaming device may track events that occur at the gaming device and information about these events. Examples of events include:
  (i) outcomes that are generated by the gaming device
  (ii) intra-game events (e.g., a player is dealt a card in video poker, a player discards a card in video poker, a player gains access to a bonus round on a slot machine)
  (iii) payouts that are provided by the gaming device (e.g., 10 coin payout, a $100 jackpot)
  (iv) money is inserted into the gaming device by a player (e.g., using a bill acceptor or a coin slot)
  (v) money is removed from the gaming device by a player (e.g., a player presses the 'cash out' button)
  (vi) a bonus is provided to a player (e.g., a player may earn a 10 coin bonus for inserting a $20 bill into a gaming device)
  (vii) a feature is activated (e.g., a player activated Auto-Play Mode on a gaming device)
  (viii) a feature is deactivated (e.g., a player deactivates a Betting the Don't Mode on a gaming device)
  (ix) a feature affects operation of the gaming device (e.g., a player wins a jackpot when a Double Jackpots mode is enabled on a gaming device)

(x) a player identifies himself (e.g., a player may insert a player tracking card into the gaming device)

(xi) a player operates an input device on the gaming device (e.g., a player presses the 'spin' button on a slot machine, a player uses a touch screen to select a card on a video poker machine)

(xii) information may be output to a player using an output device (e.g., an message may be displayed to a player on a video screen alerting him that he only has 10 coins left)

(xiii) a casino employee opens the gaming device (e.g., to add coins to the hopper)

(xiv) a casino employee closes the gaming device (e.g., after adding coins to the hopper)

(xv) indications from sensors (e.g., a gaming device may have a weight sensor that determines when a player is standing in front of the gaming device)

(xvi) a gaming device incurs a cost (e.g., a player orders a drink using an electronic menu on the gaming device, a player contacts customer service to learn how a gaming device works, a player is given a free tour of a gaming device)

(xvii) an authentication code is output from the gaming device (e.g., according to the methods described below)

(xviii) an activation code is indicated to the gaming device (e.g., according to the methods described below)

(xix) software or hardware on the gaming device is modified (e.g., a machine is upgraded to include a new bonus round)

(xx) an attacker (e.g., an untrustworthy casino, a player) tampers with the gaming device (xxi) a gaming device is moved to a new location (e.g., if a gaming device is portable)

In addition to events themselves, a gaming device may track information about events, including:

(i) what event occurred (ii) when the event occurred (e.g., what date, what time of day, ordering of events)

(iii) how often an event occurred (e.g., 14 times, an average of 32.6 times per hour)

(iv) how much money was added/removed/involved in the event (e.g., How much money did a player insert into a gaming device? What size payout was provided to a player?)

(v) results of the event (e.g., What was a player's credit balance after he won a jackpot? What is the state of a program on a gaming device after the gaming device's software is upgraded?)

(vi) what player was operating a gaming device when an event occurred (vii) what caused an event to occur (e.g., why did a player win a jackpot of 100 coins?)

(viii) other information describing the event (e.g., what authentication code was provided, what activation code was provided)

(ix) conditions under which an event occurred (e.g., what percentage of gaming devices were in operation when an event occurs)

(x) where an event occurred (e.g., if a gaming device is portable) For example, a gaming device may include a position sensor that determines where the gaming device is located when a game is played.

According to some embodiments, a gaming device 1300 may store information about events in an event database 1308. One example of an event database is shown in FIG. 14.

Alternatively, or in addition, a gaming device 1300 may track statistics relating to usage of the gaming device 1300. Examples of statistics include totals, averages, percentages and ratios, revenues (i.e., "win"), theoretical win, number of prizes won, number of offers presented or accepted, and play patterns (events, times, order, speed of play, strategies used by players). Totals, averages, percentages and other statistics may be calculated over a variety of different data sets, including:

(i) a set of sessions (e.g., all sessions longer than 10 minutes, all sessions since an authentication code was output)

(ii) a set of players (e.g., players staying at a casino hotel, female players, players who are senior citizens, players who have accepted offers in the past)

(iii) a period of time (e.g., the last 1 year, the last 1 month, between 12 noon and 4 pm on Apr. 15, 2002)

(iv) a set bounded by at least one event (e.g., since an authentication code was output, since an activation code was received, since a jackpot or other outcome)

(v) a set of events at a location (e.g., games played Las Vegas downtown, games played in Reno).

Examples of totals include:

(i) total revenues (e.g., the total revenues during a period of time, the total revenues while a portable gaming device was at a certain location)

(ii) a total number of occurrences of an event (e.g., a total number of offers accepted by players, a total number of times that a feature is activated)

(iii) a total value of a plurality of events (e.g., a total amount of money cashed out of a gaming device, a total amount of payouts provided)

(iv) a total amount of time (e.g., how many hours a gaming device is operated, how many minutes a feature is used)

Examples of averages include:

(i) average session duration (ii) an average number of occurrences of an event (e.g., an average number of offers accepted by players)

(iii) an average value of a plurality of events (e.g., an average credit balance, an average price of hotel rooms sold to players through a gaming device)

Note that averages may be calculated on a 'per unit' basis. For example, a gaming device may calculate an average coin-in per game (e.g., 2.3 coins per game) or an average coin-in per session (e.g., 165.2 coins per session). Examples of units for averages include:

(i) per session (ii) per game (iii) per player (iv) per hour (or other unit of time—seconds, minutes, days, etc.)

(v) per event (e.g., per usage of a feature)

Examples of percentages and ratios include:

(i) a percentage of players (e.g., what percentage of players use a feature)

(ii) a percentage of sessions (e.g., what percentage of sessions are longer than 3 hours)

(iii) a percentage of games (e.g., what percentage of games are played with a particular feature enabled)

(iv) a percentage of events (e.g., what percentage of offers presented to players are accepted)

(v) a percentage of time (e.g., what percentage of time a gaming device is in use)

According to some embodiments, a gaming device may store information about events in a game data database 1310. One example of a game data database 1310 is shown in FIG. 15. Note that information stored in the game data database 1310 may be redundant with information stored in an events database. It is possible that a gaming device may store either database, or both databases. In the examples provided herein, both databases are included to demonstrate that usage data may be accumulated in a variety of different forms.

According to some embodiments a gaming device may store relative performance data. In other words, data that indicates the performance of the gaming device compared to: (i) a baseline measure and/or (ii) an average performance level of similar machines, may be stored.

According to some embodiments, a gaming device may determine and/or track one or more payments to be provided based on usage of a gaming device. For example a gaming device may determine a payment that should be provided to an interested party such as a regulatory group, licensor, or game manufacturer. In another example, a gaming device may determine a payment to be provided by an interested party such as a subsidizer.

Note that information about the location of a gaming device (e.g., as determined by a position sensor) may be a type of usage data. Information about the position of a gaming device may be particularly useful for ensuring that a gaming device complies with local laws. Examples include:
   (i) Certain games may be illegal in certain locations. For example, it may be illegal to play games of chance in Massachusetts.
   (ii) Certain locations may levy taxes on games. For example, the state of Nevada may require that a proprietor of a gaming device (e.g., a casino) pay a tax on all profits obtained from a gaming device.
   (iii) In some locations, games may be only be legal for certain players. For example, it may be illegal for players under the age of 19 to play games of skill for cash prizes in Nebraska and Alabama.
   (iv) In some locations, there may be limits on the value of a prize that may be provided to a player. For example, Arizona limits the amount of prize money that players can win by playing games.

Note that various interested parties may be interested in the location of a gaming device, including:
   (i) regulatory groups (e.g., state government)—For example, law enforcement may be interested in ensuring that players do not play games in locations where it is illegal. In a second example, tax collectors may be interested in collecting taxes based on games played in their jurisdiction.
   (ii) casinos—For example, a casino may be interested in ensuring that players do not break the law and in determining appropriate taxes and licensing fees to pay based on the location of a gaming device.
   (iii) game manufacturers—For example, a game manufacturer may lease a gaming device to a casino for a percentage of revenues generated by the gaming device. The game manufacturer may be interested in verifying the revenues generated by the gaming device to ensure that the casino provides the correct lease payments.

Information about the location of a gaming device may be tracked in various ways, including:
   (i) the general location of a gaming device (e.g., the state of California)
   (ii) a precise location (e.g., a latitude and longitude)
   (iii) borders crossed by the gaming device (e.g., a gaming device moved outside of a casino and onto the street in Las Vegas)

According to some embodiments, game play on a gaming device may be enabled or disabled based on the location of the gaming device. For example, if a player takes a portable gaming device into an area where games of chance are illegal, then games of chance may be disabled on the gaming device. In a second example, a gaming device may disable games of skill if a player is under the age of 19 and the gaming device is currently located in Nebraska. Information about the enabling and disabling of game play on a gaming device may be tracked as usage data.

In the embodiments described above, information about usage of a gaming device is tracked by the gaming device. Alternatively, or in addition, information about usage of a gaming device may be tracked using a server (e.g., a casino server 1702 or an authentication server 1704). For example, a gaming device 1300 may transmit usage information to a casino server 1702 and the casino server 1702 may store this information in an event database 1308 and a game data database 1310. If a server is used to track data, then the gaming device, communications link, and server should all be secure to avoid tampering with the data (e.g., by a casino employee). For example, a casino employee may intercept or modify communications between a gaming device and the server, thereby altering the data. It may be difficult or costly to ensure that the casino employees cannot tamper with data transmitted from a gaming device to a server or stored on a hard drive on the server.

Using a server to track data from a plurality of gaming devices may be more cost effective or convenient than tracking data individually on each of the gaming devices. For example, it may be costly to include a secure memory and authentication code generation capabilities in each gaming device.

According to some embodiments, a gaming device may generate an authentication code based on data described above. According to various embodiments of the invention, an authentication code may, for example, include:
   (i) a digital signature
   (ii) a message digest
   (iii) a fingerprint
   (iv) a cryptographic checksum
   (v) a cryptographic hash
   (vi) a data integrity check (DIC)
   (vii) a manipulation detection code (MDC)
   (viii) a message authentication code (MAC)
   (ix) a data authentication code (DAC)

Many other embodiments of authentications codes are also possible.

According to some embodiments, determining an authentication code may include hashing or compressing usage data. Various types of hash functions or compression functions maybe used in accordance with the present invention. Alternatively, determining an authentication code may not include any hashing or compression. For example, an authentication code could be determined by just encrypting a set of usage data as described below. According to some embodiments, determining an authentication code may include using a one-way function. According to some embodiments, a function H may be considered to be a one-way function if $h=H(M)$, where h is known as a "hash value" and M is a message; given M, it is easy to compute h; given h, it is hard to compute M such that $H(M)=h$; and given M, it is hard to find another message M' such that $H(M)=H(M')$.

Advantages and disadvantages of one-way functions and other functions described below are known to those skilled in the art. For further details, one of ordinary skill in the art may refer to a book by Bruce Schneier, entitled APPLIED CRYPTOGRAPHY, PROTOCOLS, ALGORITHMS, AND SOURCE CODE IN C, (2d Ed, John Wiley & Sons, Inc., 1996), which is incorporated herein by reference in its entirety. For example, one advantage of using a one-way function to determine an authentication code is that it prevents a casino from reading an authentication code, generating counterfeit usage data based on the authentication code, and then claiming that authentication code corresponds to the counterfeit usage data. If a one-way function is used to generate an authentication code, it should be very difficult for a casino to generate counterfeit usage data based on the authentication code.

According to some embodiments, determining an authentication code may include using a one-way compression function. A one-way compression function may be a one-way function with an additional restriction that the length of h is less than the length of M.

According to some embodiments, determining an authentication code may include using a one-way hash function. A one-way hash function may be a one-way function with an additional restriction that the length of h is constant. Examples of one-way hash functions include:
 (i) Snefru by Ralph Merkle
 (ii) N-Hash by Nippon Telephone and Telegraph
 (iii) MD4 (Message Digest 4) by Ron Rivest
 (iv) MD5 (Message Digest 5) by Ron Rivest
 (v) MD2 (Message Digest 2) by Ron Rivest
 (vi) SHA (Secure Hash Algorithm) by the NIST and the NSA
 (vii) RIPE-MD by the RIPE Project
 (viii) NAVAL Similarly, determining an authentication code may include determining one or more of the following:
 (i) contraction function
 (ii) message digest
 (iii) fingerprint
 (iv) cryptographic checksum
 (v) cryptographic hash
 (vi) data integrity check (DIC)
 (vii) manipulation detection code (MDC)
 (viii) message authentication code (MAC)
 (ix) data authentication code (DAC)
 (x) digital signature It may be noted from the above examples that an authentication code may be encrypted.

According to some embodiments, a function used in determining an authentication code may be collision resistant. A function H may be collision-resistant if it is hard to find two random messages M and M', such that H(M)=H(M').

According to some embodiments, any compression function (i.e., a one-way or two-way compression function) may be used to compress usage data into an authentication code. Using a compression function may be helpful in reducing the size of an authentication code (e.g., to reduce bandwidth costs or to make it easier for a person to remember or communicate). Note that a compression function may be "lossy" (i.e., some usage data that is compressed may not be recoverable) or "loss-less" (i.e., all usage data that is compressed is recoverable). Similarly, determining an authentication code may include a step of evaluating a two-way hash function.

As noted above, determining an authentication code may or may not include determining a result of a hash function/compression function. In either case, determining an authentication code may include determining a result of an encryption function or cryptographic protocol. For example, a gaming device may determine an authentication code by hashing or compressing a set of usage data to produce a hash value (as described above) and encrypting the hash value to produce the authentication code. Alternatively, these steps could be performed in reverse order (i.e., the usage data could be encrypted and then hashed to produce an authentication code). In another example, a gaming device may determine an authentication code by encrypting a set of usage data to produce the authentication code. In another example, a gaming device may determine an authentication code using a one-way hash function with a key (also known as a message authentication code). Methods of encryption are known to those skilled in the art, and are not described in detail herein.

According to some embodiments, an authentication code may be generated using a public-key encryption algorithm. For example, a gaming device may store a private key that it keeps secret and publish a public key. The gaming device may then encrypt usage data using the private key to produce an authentication code. It may then transmit this authentication code to an authentication server. The authentication server may then use the public key to decrypt the authentication code and verify the usage data. Examples of public-key encryption algorithms include:
 (i) RSA
 (ii) Pohlig-Hellman
 (iii) Diffie-Hellman
 (iv) ElGamal
 (v) Rabin
 (vi) McEliece
 (vii) elliptic curve cryptosystems
 (viii) LUC
 (ix) finite automaton public-key cryptosystems Note that public-key encryption is generally much more computation-intensive than symmetric key encryption. Therefore symmetric key encryption may be preferred for use in generating an authentication code.

According to some embodiments, an authentication code may be generated using a symmetric encryption algorithm. For example, a gaming device may use a secret key to encrypt usage data and generate an authentication code. It may then transmit this authentication code to an authentication server. The authentication server may then use the same secret key to decrypt the authentication code and verify the usage data.

According to some embodiments, an authentication code may be generated using a block cipher. Examples of block ciphers include:
 (i) DES
 (ii) Triple DES
 (iii) IDEA
 (iv) Blowfish
 (v) Luficer
 (vi) Madryga
 (vii) NewDES
 (viii) FEAL
 (ix) REDOC, REDOC II, REDOC III
 (x) LOKI, LOKI91
 (xi) Khufu and Khafre
 (xii) RC2
 (xiii) MMB
 (xiv) CA-1.1
 (xv) Skipjack
 (xvi) GOST
 (xvii) CAST
 (xviii) SAFER K-64
 (xix) 3-Way
 (xx) Crab
 (xxi) SXAL8/MBAL
 (xxii) Pohlig-Hellman According to some embodiments, an authentication code may be generated using a stream cipher. Examples of stream ciphers include:
 (i) LFSR
 (ii) FCSR
 (iii) A5
 (iv) Hughes XPD/KPD (v) Nanoteq
(vi) Rambutan
(vii) Additive generators
(viii) Gifford
(ix) Algorithm M
(x) RC4
(xi) SEAL
(xii) WAKE
(xiii) Non-Linear Feedback Shift Registers
(xiv) Pless Generator
(xv) Cellular Automation Generator
(xvi) 1/p Generator
(xvii) crypt(1)
(xviii) Rip van Winkle Cipher
(xix) Diffie's Randomized Stream Cipher
(xx) Maurer's Randomized Stream Cipher According to some embodiments, a single function may perform both hashing and encryption. For example, an authentication code may be a "message authentication code" or MAC. According to some embodiments, a MAC may be generated using a one-way hash function that requires the use of both an input string and a specific key string. (The "key" is an additional input string, which may be secret.) Only someone with the key can calculate the hash value (e.g., because the hash value is encrypted with the key). Some examples of MACs include:
  (i) CBC-MAC
  (ii) Message Authenticator Algorithm (MAA)
  (iii) Bidirectional MAC
  (iv) Jueneman's Methods
  (v) RIPE-MAC
  (vi) IBC-Hash
  (vii) A one-way hash function may be used as a MAC by concatenating a key with a message and then hashing the concatenation.
  (viii) Stream Cipher MAC It is also possible to use a symmetric or public key block encryption algorithm to produce a MAC. Examples include:
  (i) Modified Davies Meyer
  (ii) Preneel-Bosselaers-Govaerts-Vandewalle
  (iii) Quisquater-Girault
  (iv) LOKI Double-Block
  (v) Parallel Davies-Meyer
  (vi) Tandem and Abreast Davies-Meyer
  (vii) MDC-2 and MDC-4
  (viii) AR Hash Function
  (ix) GOST Hash Function
  (x) DSA (Digital Signature Algorithm)
  (xi) Ong-Schnorr-Shamir
  (xii) ESIGN According to some embodiments, an authentication code may be generated using a one-time pad. For example, when a gaming device is manufactured, a one-time pad may be generated and stored in a ROM on the gaming device. A duplicate copy of this one-time pad may be stored on an authentication server. Each time an authentication code is generated, an unused portion of the one-time pad may be used to encrypt the authentication code. When the one-time pad runs out, a gaming device manufacturer or other party may supply a new one-time pad (e.g., by manually installing a new ROM in the gaming device). Note that using a one-time pad may be well-suited to encryption for gaming devices, since a gaming device manufacturer can easily generate a large one-time pad and securely implant in a gaming device when the gaming device is being manufactured. Depending on how this one-time pad is used, the pad may last for the entire lifetime of the gaming device. For example, an average gaming device only stays on the floor of a casino for two to four years before being replaced, and it would be feasible for a gaming device to generate an authentication code of size 5 kb on a monthly basis. In such an example a gaming device would only need to store a one-time pad that was at least 240 kb.

Note that generating an authentication code may or may not include using a secret key. If a secret key is used to generate an authentication code, this secret key may be stored by the gaming device, as described above. Note that a variety of different types of secret keys are possible, including symmetric encryption keys, private keys for public-key encryption, and one-time pads.

In some embodiments, an authentication code may be generated using a secret algorithm. This algorithm may not be readily ascertainable or known by an attacker (e.g., a casino employee).

According to some embodiments, an authentication code may be encoded. Note that encrypting is only one method of encoding a message. For example, an authentication code may be encoded using one or more of the following:
  (i) a substitution cipher—For example, the number 5 may be substituted for the number 1, the number 8 substituted for the number 9, meaning that the plaintext "19" would be encoded as "58."
  (ii) a transposition cipher—For example, the digits of a number may be rotated 3 digits to the left, so that the number "12345" becomes "45123."
  (iii) a code—For example, the word "Hamlet" might be the authentication code for the message "13,567 coins have been played on this gaming device during the last week."

According to some embodiments, an authentication code may be enciphered.

According to some embodiments, an authentication code may be generated using steganography. For example, authentication code may be hidden in a large file of usage data for a gaming device, making it more difficult for an attacker to identify the authentication code.

The following examples of encryption are provided to give an overview a few different ways that an authentication code may be encrypted and communicated to an authentication server. Many other methods are also possible, as indicated above.

Example #1

Message Authentication Code

Assume a gaming device and an authentication server share a secret key.
  1. The gaming device hashes usage data with a MAC and the shared secret key to form an authentication code.
  2. The authentication code and the usage data are communicated to the authentication server.
  3. The authentication server reads the authentication code and hashes the usage data with the shared secret key.
  4. If the generated hash matches the received hash, the authentication server accepts the usage data as authentic.

Example #2

Encryption with Public Key Cryptography

Assume a gaming device has a public-key/private key pair and an authentication server knows the gaming device's public key.
  1. The gaming device encrypts usage data with the private key to form an authentication code.

2. The authentication code is communicated to authentication server.
3. The authentication server decrypts the authentication code with the public key of the gaming device.
4. If the message is intelligible, the authentication server accepts the authentication code as authentic.

A sample algorithm for this procedure is RSA.

Example #3

Signing with Public Key Cryptography

Assume a gaming device has a public-key/private key pair and an authentication server knows the gaming device's public key.
1. The gaming device signs the usage data with the private key to form an authentication code (e.g., a digital signature)
2. The authentication code and the usage data are communicated to the authentication server.
3. The authentication server verifies the authentication code using the usage data and the public key. The mathematics of verification indicates whether the usage data and authentication code are authentic.

Example #4

Symmetric Encryption

Assume a gaming device and an authentication server share a secret key.
1. The gaming device encrypts usage data with the shared secret key to form an authentication code.
2. The authentication code is communicated to the authentication server.
3. The authentication server reads and decrypts the authentication code with the same key.
4. If the message is intelligible, then the authentication server accepts the authentication code as authentic.

As indicated above, the present invention may provide a variety of different benefits (e.g., data legitimacy, data paternity, data integrity, gaming device integrity, transmission integrity, non-repudiation). Some of these benefits may be enabled by including specific information in an authentication code. For example, including a gaming device identifier in an authentication code may help to ensure that data paternity is verifiable. Thus, a few different types of data that are particularly useful to include in an authentication code are described below.

Note that "including data" in an authentication code may comprise hashing/compressing the data, encrypting the data, or otherwise providing an indication of the data using an authentication code. Note that it is preferred that data included in an authentication code be encrypted, thereby preventing an attacker (e.g., a casino employee) from altering the authentication code and spoiling one or more of the benefits of the invention. For example, an authentication code may include an indication of one or more of the following:
  (i) time—Including when an authentication code is generated or when an event occurs may prevent an attacker (e.g., a casino employee) from reusing old authentication codes. For example, if an authentication code did not include an encrypted time, then a casino that communicates authentication codes to an authentication server on a monthly basis might use the same authentication code(s) each month, thereby claiming the same usage data, even if this was actually not the case. Note that a time that is included in an authentication code may be generated by a clock that is protected by a secure perimeter on a gaming device.
  (ii) gaming device identifier—Including information identifying a gaming device may help to prevent an attacker (e.g., a casino employee) from using the same authentication code for multiple machines. For example, each gaming device may have a different secret key. Therefore two gaming devices would produce different authentication codes even if their usage data was identical. In a second example, a plurality of gaming devices at a casino may have the same secret key, but authentication codes generated by each gaming device may include information identifying the gaming device (e.g., a gaming device identifier). If an authentication code does not include encrypted information that differentiates between gaming devices, then a casino might use the same authentication code for two or more different gaming devices, and claim that these two or more gaming devices both had the same usage data, even if this was actually not the case.
  (iii) previous authentication code—Including information about a previous authentication code generated by a gaming device may make it more difficult for a attacker to counterfeit authentication codes. For example, an authentication code for October may be dependent on an authentication code for September. This practice may be known as "chaining", since a chain of linked authenticated codes may be formed.
  (iv) at least one indication by an authentication server—According to some embodiments, generating an authentication code may include using a challenge-response protocol. For example, an authentication server may generate a random number or sequence number (also referred to as a "nonce"), encrypt this random number using a secret key that it shares with a gaming device (or an appropriate public key/private key pair), and communicate the encrypted random number to the gaming device. The gaming device may then decrypt the encrypted random number and include the random number in an authentication code that is subsequently generated. Note that since an attacker would not be able to decrypt the encrypted random number, the attacker would be unable to include the random number when generating an authentication code.
  (v) a sequence number—For example, a sequence number included in an authentication code may be incremented by one every time a gaming device generates an authentication code. An authentication server may store the most recent sequence number in memory and only accept an authentication code if the sequence number included in the authentication code is one greater than the most stored sequence number.
  (vi) a random number—For example, a gaming device may generate a random number and include this random number in an authentication code that is in turn communicated to an authentication sever. The authentication server may maintain a database of all random numbers received from the gaming device. If the authentication server receives an authentication code that includes a random number that is already in the database, then there is a good chance that this authentication code is a duplicate. If the authentication server receives an authentication code that includes a random number that is not in the database, then the authentication code may be accepted as fresh.

(vii) modifications to hardware or software of a gaming device—Including information about the current or past state of the hardware or software of a gaming device may help to prevent an attacker from modifying a gaming device to produce different usage data or different authentication codes. For example, a gaming device may compute a hash value, MAC, or digital signature of its own program using methods similar to those described above. An authentication server may then use this information to determine whether software on a gaming device has been modified (e.g., by comparing a generated hash value to a known hash value for the gaming device's program). In a second example, a gaming device may track the natural random variations in the magnetic memory media of a data storage device or other memory (see U.S. Pat. No. 5,235,166 to Fernandez for details, the entirety of which is incorporated herein by reference). If these variations change, then it could be a sign that information on the magnetic memory media has been altered (e.g., an attacker has altered the program of the gaming device). In a third example, a hash value for a game program may be verified as the game program is read into memory (e.g., random access memory or RAM).

(viii) tampering with a gaming device—Including information about tampering with a gaming device may help to alert an authentication server or other party if a gaming device has been modified, a secure perimeter has been breached, or a secret key stored in the gaming device has been compromised. For example, a gaming device may track whether a secure perimeter is intact. If the secure perimeter is not intact, this may be a sign that the gaming device is no longer secure and that usage data or authentication codes generated by the gaming device could be modified.

Note that some of the data described above may already be included in an authentication code as usage data. Also note that a gaming device may include non-usage data along with usage data when generating an authentication code.

In addition to the detailed descriptions provided above, some embodiments relating to authentication codes are now described. Care should be taken when selecting an encryption algorithm for use in generating an authentication code. Since a casino may operate a gaming device, it is likely that a casino may be able to determine some or all usage data relating to the gaming device. For example, current gaming devices have meters that display some game related data, such as coin-in. A casino may even be able to control how much a gaming device is used, thereby controlling what usage data is included in an authentication code. Therefore, care should be taken to pick an encryption algorithm that is strong against a known-plaintext attack, chosen-plaintext attack, or an adaptive-chosen-plaintext attack.

Note that generating an authentication code may or may not include a hashing or compression step. However, it is preferred that generating an authentication code include an encryption step, otherwise it may be possible for a casino employee to alter some or all of an authentication code or usage data associated with a gaming device.

According to some embodiments, an authentication code for a gaming device may be determined by the gaming device. Alternatively, an authentication code may be determined by a casino server or other device. However, note that if a casino server or other device generates an authentication code, then communication between the casino server and the gaming device may need to be secure from attackers.

Once a gaming device or other device has determined an authentication code (e.g., as described above), this authentication code may be output.

An authentication code may be output in a variety of ways, including:

(i) over a network—For example, a gaming device may use a communication network to communicate an authentication code to an authentication server or a casino server.

(ii) using an output device (e.g., a display)—For example, a game may display an authentication code to a casino employee using a touch screen. In a second example, a gaming device may display an authentication code to a casino employee using an LCD display that is hidden from view of players who use the gaming device (e.g., an LCD screen may be located behind a front panel of a gaming device that a casino employee uses a key to open).

(iii) on a substrate (e.g., a piece of paper, a magnetic disk, an optical disk)—A gaming device may use an output device (e.g., a printer, a disk drive, a compact disc (CD) burner) to write an indication of an authentication code onto a substrate. For example, a gaming device may use a dot matrix printer to print an authentication code on a piece of cashless gaming receipt. In a second example, a gaming device may use a thermal printer to print a bar code (i.e., an indication of an authentication code) on a piece of paper. In a third example, a gaming device may use a disk drive to store an authentication code on a floppy disk. Note that additional information besides an authentication code may also be written on the substrate (e.g., usage data, an address of a game manufacturer).

(iv) to a terminal device (e.g., a PDA, a laptop computer)—For example, a gaming device may transmit an authentication code to a PDA using an infra-red communications link. According to some embodiments, the terminal device may verify the authentication code by communicating it to an authentication server, as described above.

An authentication code may be output to a variety of different parties, including:

(i) a casino employee—For example, on the first Tuesday of every month at 4 am, a casino employee may open up the front panel of a gaming device and read an authentication code from an LCD display hidden inside the gaming device. In a second example, a casino employee may press a button on a gaming device to prompt the gaming device to print an authentication code on a receipt for the gaming device. In a third example, a casino employee who operates a casino server may view an authentication code using an output device.

(ii) a regulatory group—For example, a gaming device may print a "receipt" that includes usage data and an authentication code. When filing its tax return, a casino may include this receipt. A regulatory group (e.g., a state tax agency) may then use an authentication server to verify that the usage data matches the authentication code, thereby verifying that the usage data has not been altered in any way (e.g., where a route operator defrauded a casino).

(iii) manufacturer employee—For example, an employee of a game manufacturer may visit a casino once a year to verify authentication codes on the casino's gaming devices. The employee may visit each gaming device and use a wireless handheld device (e.g., a PDA) to download an authentication code from the gaming device. This authentication code may then be used to verify usage data relating to the gaming device (e.g., usage data upon which lease payments are based).

(iv) player—For example, a gaming device may not have access to a communication network. In such an embodiment, the invention may be used to enable players of the gaming device to receive comps and other bonuses based on their usage of the gaming device. For example, when a player completes a gaming session at a gaming device, the gaming device may print a receipt for this gaming session, describing usage data (e.g., how long the player operated the gaming device, his total coin-in). The player may then bring this receipt to a cashier at the casino and be awarded comp points or another benefit based on his usage of the gaming device.

According to some embodiments, outputting an authentication code from a gaming device may include receiving an indication from at least one party. Examples include:

(i) An authentication code may be encrypted using a challenge-response protocol.

(ii) Output of an authentication code may be password-protected. For example, a party (e.g., a casino employee, a manufacturer employee) may be prompted to provide a password in order for an authentication code to be output. In a second example, a party may indicate a password using an input device (e.g., a keypad on a gaming device, a computer keyboard on an authentication server, a touch screen on a portable handheld device).

(iii) A gaming device may receive an indication of a password using a communications network. For example, an authentication server may transmit a password to a gaming device. Based on the password, the gaming device may then transmit an authentication code to the gaming device.

According to some embodiments, output of an authentication code may be secure. For example, a secure (e.g., encrypted) communications link may be used to transmit an authentication code from a gaming device to an authentication server. Alternatively, output of an authentication code may not be secure. For example, a LCD panel on the back of a gaming device may display an authentication code.

According to some embodiments, a gaming device may output usage data instead of or in addition to an authentication code.

Note that as used herein the phrase "verifying an authentication code" is synonymous with "verifying usage data using an authentication code." According to some embodiments, an authentication server may receive an indication of an authentication code. For example, a gaming device, casino server, or other device may transmit an authentication code to an authentication server using a communications network. In another example, an operator of an authentication server (e.g., an employee of an interested party) may use an input device (e.g., a computer keyboard) to enter an authentication code.

Note that an authentication code may be communicated to an operator of an authentication server in a variety of different ways. Examples include:

(i) A casino employee may telephone or email an operator of an authentication server and tell him an authentication code that was output by a gaming device. The operator may then use a keyboard to input this authentication code into an authentication server and verify that usage data for the gaming device.

(ii) A gaming device may print out a receipt that includes an authentication code. This receipt may be mailed to an operator of an authentication server (e.g., as part of a tax return or lease payment). The operator may then use an input device (e.g., a bar-code scanner) to input the authentication code into the authentication server and verify usage data for the gaming device.

(iii) A gaming device may use an output device (e.g., a video display) to output an authentication code to an operator of an authentication server. The operator may then use an input device (e.g., a wireless handheld device) to indicate the authentication code to the authentication server.

(iv) Note that an operator of an authentication server may be a player or other party. For example, a gaming device may output a cashless gaming receipt to a player that includes an authentication code. The player may then visit a gaming device manufacturer's website and enter the authentication code from the cashless gaming receipt. Note that in this example, the player is an operator of the gaming device manufacturer's website, which may function as an authentication server. According to some embodiments, a player may receive a benefit based on providing an authentication code to a gaming device manufacturer.

According to some embodiments, verifying an authentication code may include decrypting the authentication code. Various methods of decrypting an authentication codes are possible; the appropriate method for decrypting an authentication code will depend on what method was used to encrypt the authentication code. Note that authentication server may store a decryption key (e.g., a key for a symmetric encryption algorithm or a public key for a public-key encryption algorithm) to enable it to decrypt an authentication code generated by a gaming device.

According to some embodiments, an authentication server may receive at least one indication of usage data in addition to an authentication code. Examples include:

(i) Each month, a casino may report usage data and an authentication code to an interested party (e.g., a regulatory group, a game manufacturer). The usage data may be unencrypted and the authentication code may be used to verify that the usage data has not been altered in any way.

(ii) Each month, a casino may report usage data to an interested party. At the end of a year, the casino may report an authentication code to the interested party. The interested party may then use this authentication code to verify the usage data from the previous 12 months.

(iii) Once a week, a gaming device may transmit an authentication code to an authentication server, so that by the end of a month, the authentication server has received four authentication codes from the gaming device. At the end of the month, a casino may provide an indication of usage data for the gaming device. To verify the usage data, the authentication server may compare the usage data to the information provided by the 4 authentication codes.

Alternatively, authentication codes may be the only indications of usage data that an authentication server receives. For example, an authentication code may be an encrypted version of usage data. By decrypting the authentication code, an authentication server may be able to determine the usage data.

According to some embodiments, verifying information included in an authentication code may include comparing the information to one or more expected values for the information. Examples of expected values include:

(i) usage data—As described above, an authentication server may receive an indication of usage data in addition to an indication of an authentication code. In such an embodiment, information in the authentication code may be compared to the usage data. If the two indications of the usage data do not match, then an attacker may have altered the usage data. As described above, a variety of different types of usage data are possible. According to some embodiments, an authentication server may compare hash values of usage data. For example, an authentication server may compute a hash of a set of usage data and compare this hash to a hash value indicated in an authentication code. Various methods of hashing and compression are also described above.

(ii) time—For example, an authentication code may include an indication of what time the authentication code was generated (e.g., as described above). An authentication server may track when the authentication code was received by the authentication server. If these two times do not match (e.g., within a prescribed window), then this may be a clue that an attacker is attempting to reuse an authentication code or that delivery of an authentication code was delayed for some reason. In a second example, the authentication server may check to see that the time on the authentication code matches the time on the usage data. If these values do not match, then an attacker might be trying to reuse old usage data.

(iii) gaming device identifier—The authentication server may check to make sure that the usage data and the authentication code both came from the same machine. If usage data and authentication code came from different gaming devices, then an attacker might be trying to reuse usage data from a first gaming device as usage data for second gaming device.

(iv) sequence number—For example, an authentication server may include a sequence number, previous authentication code, or random number as described in above. If this sequence number, previous authentication code, or random number does not match a value that is expected by an authentication server (e.g., the next number in a sequence, a previous authentication code, or a stored random number), then this may indicate that the authentication code is a forgery or that something else is amiss.

(v) state of the gaming device—As descried in above, an authentication code may include an indication of the state of the hardware or software of a gaming device. If this indication of the state of the gaming device does not match an expected value for the state of the gaming device, then an authentication code or usage data may not be accepted. For example, an authentication code may include a hash of a gaming device's program. To verify that the gaming device's program has not been altered, an authentication server may compare this hash to a stored hash value for the gaming device's program. If these two hash value do not match, then the gaming device's program may have been altered.

According to some embodiments, multiple authentication codes may be used to verify one set of usage data. For example, a casino may report usage data for a gaming device (e.g., revenues) to a regulatory group on an annual basis or have encoded usage data audited on a probabilistic basis (e.g., on a regular schedule or via random sampling). The gaming device may generate authentication codes on a monthly basis. An authentication server operated by the regulatory group may use the twelve authentication codes for the year to verify the usage data for the year. Similarly, multiple authentication codes may be used to verify multiple sets of usage data. According to some embodiments, one authentication code may be used to verify multiple sets of usage data. For example, a casino may report usage data for a gaming device (e.g., revenues) to a game manufacturer on a monthly basis. At the end of a year, the gaming device may generate an authentication code for all usage data from the entire year. An authentication server operated by the game manufacturer may use the authentication code to verify the usage data for all twelve months of the year.

According to some embodiments, an authentication server may store a gaming device database. An embodiment of a gaming device database 1808 is shown in FIG. 19. According to some embodiments, an authentication server may store a code verification database. An embodiment of a code verification database 1810 is shown in FIG. 20.

According to some embodiments, a gaming device may store usage data in a secure location and output the usage data in a secure manner. In such an embodiment, the gaming device may not generate or output an authentication code. An attacker (e.g., a casino employee) may be prevented from altering the usage data because the usage data is stored and output securely. Thus, according to some embodiments, usage data may be stored securely. For example, usage data may be stored in one or more databases (e.g., an event database 1308, a game data database 1310) that are protected by a secure perimeter. In another example, usage data may be encrypted when stored on a data storage device. For example, a processor in a gaming device may store a secret key 1316 that is used to encrypt information that is stored in a database. Since an attacker (e.g., a casino employee) does not know this secret key 1316, the attacker may be unable to alter the usage data stored in the database.

According to some embodiments, usage data may be output securely. Examples include:

(i) A gaming device may transmit usage data securely over a communication network. For example, communications between a gaming device and an authentication server may be encrypted using a secret key that is known only to the gaming device and the authentication server. Since an attacker (e.g., a casino employee) does not know this secret key, the attacker would not be able to modify the usage data.

(ii) A gaming device may connect to a terminal device (e.g., a PDA, a laptop computer) using a secure communication link. For example, a manufacturer employee may connect a tablet computer to a USB (universal serial bus) port on a gaming device. Usage data may then be transferred from the gaming device to the laptop computer using this USB link.

(iii) A gaming device may output usage data using a secure output device (e.g., a video display, a disk drive). For example, a secure perimeter may protect a gaming device and an associated output device from tampering.

(iv) A gaming device may require an operator (e.g., a manufacturer employee) to provide a password in order to access data that is stored on a data storage device.

According to some embodiments, usage data may not be stored on a gaming device at all. Instead, usage data may be transmitted to an alternate device (e.g., a casino server, an authentication server) as is it is generated. This alternative device may then store the usage data securely and output it in a secure manner.

According to some embodiments, a single authentication code may be generated for a plurality of gaming devices. For example, a casino server or other device may track usage data relating to a plurality of gaming devices. The casino server may then generate an authentication code based on the usage data and communicate (e.g., transmit) the authentication code to an authentication server for verification.

According to some embodiments, an authentication code may be generated by a casino server as opposed to a gaming device. In such an embodiment, there is a need to prevent an attacker from modifying usage data during at least the following processes:
 (i) transmitting usage data from a gaming device to the casino server
 (ii) storing usage data on the casino server (e.g., in a data storage device)
 (iii) generating an authentication code based on usage data
According to some embodiments, at least a portion of a casino server may be secure. A casino server may include a secure perimeter similar to the one described above.

According to some embodiments, communication between a casino server and a gaming device may be secure. For example, a message sent from a gaming device to a casino server may be encrypted with the gaming device's secret key. According to some embodiments, a gaming device may generate an authentication code and transmit this authentication code to a casino server. Alternatively, communication between a gaming device and a casino server may not be encrypted or may not be secure.

A casino server may store at least one secret key. Examples of secret keys that may be stored by a casino server include:
 (i) A casino server may store a first secret key for a first gaming device and a second secret key for a second gaming device.
 (ii) A casino server may store at least one first secret key for communicating with gaming devices and a second secret key for generating an authentication code.
 (iii) A casino server may store a plurality of public keys corresponding to a plurality of private keys stored by gaming devices.
 (iv) A casino server may store a secret key used for generating an authentication code.

According to some embodiments, generating an authentication code for a plurality of gaming devices may include a step of receiving usage data from a plurality of gaming devices. According to some embodiments, a casino server may aggregate usage data from a plurality of gaming devices. Examples include:
 (i) A casino server may determine a total coin-in for a plurality of gaming devices by summing the coin-in values from each of the gaming devices.
 (ii) A casino server may determine a net profit for a plurality of gaming devices by summing the revenues from each gaming device and subtracting any costs associated with operating the plurality of gaming devices.
 (iii) A casino server may determine an average credit balance for a plurality of gaming devices and/or a subset of gaming devices associated with a particular licensing/leasing agreement.
 (iv) A casino server may determine a median session length for a plurality of gaming devices.
 (v) A casino server may determine a standard deviation or variance in theoretical win for a plurality of gaming devices.

Note that a variety of other aggregations of usage data are also possible. Information determined by aggregating usage data from a plurality of gaming devices may be known as "aggregated usage data."

According to some embodiments, a casino server may generate an authentication code and output this authentication code in a manner similar to that described above. Note that an authentication code may include usage data from a plurality of gaming devices or aggregated usage data from a plurality of gaming devices.

According to some embodiments, a casino may provide consideration to an interested party based on usage data or an authentication code. For example, a casino may pay a leasing fee to a game manufacturer based on what features are activated on a gaming device.

According to some embodiments, an interested party may provide consideration to a casino based on usage data or an authentication code. For example, an advertiser may pay a fee to a casino based on advertisements viewed on a gaming device.

According to some embodiments, a player may provide consideration to an interested party based on usage data or an authentication code. For example, a player may pay a fee to a casino based on his usage of a portable gaming device.

According to some embodiments, an interested party may provide consideration to a player based on usage data or an authentication code. For example, a player may receive a free hotel room for a night based on his usage of a new type of gaming device.

Examples of interested parties include: regulatory groups, game manufacturers, subsidizers, and licensors.

Various types of consideration are possible, including money, products, and services. Various methods of determining an amount of consideration are known to those skilled in the art, including a formula or a rules-based system.

In some embodiments, a gaming device, casino server, authentication server or other device may determine an interested party based on usage data or an authentication code. For example, a casino server may determine one or more subsidizers to provide payments based on usage data or an authentication code from a gaming device. In a second example, an authentication server may determine what local taxes are owed (e.g., Nevada, but not California) based on game play using a portable gaming device.

According to some embodiments, the present invention may be used to track usage data relating to a player. For example, a casino or other aggregator of gaming devices may desire to implement a comp system that motivates players to use gaming devices. Traditionally, such comp systems are implemented by connecting a plurality of gaming devices to a casino server that tracks player activities on the gaming devices. However, for some casinos, it may be costly or impractical to implement such a comp system. For example, a "casino" (as defined above) may operate gaming devices in a plurality of grocery stores, bars, shopping malls, and other retail establishments in the state of Nevada. For this casino, a networked comp system is inappropriate and is typically omitted. Not having a comp system on these machines is a detriment to both the players who play these gaming devices (i.e., because they do not receive comps), and to the "casino" (i.e., players may play the gaming devices less often because no comps are provided).

According to some embodiments, an authentication code may be output to a player of a gaming device. This authentication code may include various usage data, may be determined in a variety of different ways and may be output in a variety of different ways. For example, a gaming device may print out a receipt for a gaming session that includes one or more of the following:
 (i) an indication of the player (e.g., a player identifier obtained from a player tracking card)
 (ii) an indication of a gaming device
 (iii) usage data relating to the gaming session (e.g., session coin-in, session theoretical win)
 (iv) an authentication code (e.g., including information sufficient to verify the player's usage of the gaming device)

In a second example, an authentication code may be stored on player tracking card. For example, a player may carry a smart card that identifies the player and functions as a player tracking card. Information about the player's usage of at least one gaming device may be included in an authentication code and the authentication code may be stored on the smart card.

A player may use an authentication code to obtain a comp (i.e., complimentary) or other benefit in a variety of different ways. For example, a player may take his receipt, smart card, or other indication of an authentication code to a cashier (e.g., a customer service employee at supermarket or shopping mall). The cashier may then use the authentication code to verify the player's usage data. If the authentication code and usage data are verified, then the player may receive an appropriate comp or other benefit.

In another example, a player may operate a terminal device (e.g., a kiosk) to register himself for a comp. For example, a player may identify himself (e.g., by inserting his player tracking card into the kiosk) and use a bar code reader (i.e., an input device) to scan an authentication code that is printed on a receipt. Based on the authentication code, a comp may be provided to the player.

In another example, a player may visit a website (e.g., a website of a gaming device manufacturer or other interested party) and indicate an authentication code using the website. Based on the authentication code, a comp may be provided to the player (e.g., through the website).

A variety of different types of comps may be provided to players, as is known in the art. Examples of comps include money, alternate currencies (e.g., comp points), products, services, and other forms of consideration. Note that a comp may be provided to a player by a casino, by a gaming device manufacturer, or by some other interested party.

Note that by providing an authentication code obtained at a gaming machine, a player may authenticate both his own usage of the gaming device and other usage data relating to the gaming device. For example, in addition to including information about a player's usage of a gaming device, a gaming receipt that is output to a player may also include an authentication code that includes information about the year-to-date coin-in at that gaming device. As described above, this information may be useful in verifying the authenticity of gaming device usage data to one or more interested parties (e.g., a gaming device manufacturer).

According to some embodiments, a gaming device may receive an indication of an activation code (e.g., from a casino server or an authentication server). Based on this indication, the gaming device may activate or deactivate at least one feature on the gaming device.

According to some embodiments, an activation code may be an alphanumeric code, sequence of digits, digital certificate, or other information suitable for indicating that a feature or a gaming device should be enabled or disabled. According to some embodiments, activation codes may be particularly appealing to casinos because they allow casinos to enable or disable features as they see fit (e.g., to provide the best possible entertainment experience for players, or to reduce licensing costs).

Applicants have recognized that a casino may alter the operation of a gaming device (e.g., by using an activation code to enable a feature) and then deny that it altered the operation of the gaming device. For example, a casino may activate a 3D graphics feature on a gaming device that is particularly entertaining to players. According to an existing agreement, a casino may be required to pay a game manufacturer a license fee to use this 3D graphics feature on the gaming device. As described above, a gaming device may track usage of this feature so as to determine an appropriate license fee to be paid to the game manufacturer. However, at the end of a month, when it is time for the casino to play a license fee based on usage of the 3D graphics feature, the casino may deny that it activated the feature. For example, a casino executive may say, "The gaming device must have activated the 3D graphics feature itself. We didn't activate the feature. Therefore, we refuse to pay the licensing fee." Needless to say, a game manufacturer, licensor, or other interested party would like to avoid such a situation.

According to some embodiments, a casino may need to contact an interested party (e.g., a game manufacturer) or a trusted third party in order to obtain an activation code. Alternatively, a casino may generate its own activation code (e.g., using a casino server). According to some embodiments, an activation code may be digitally signed by a casino. That is, an activation code may include a digital signature that can only be produced using a private key that is known only to the casino. For example, a casino may operate a casino server or other device that is used to activate or deactivate feature(s) on at least one gaming device. This casino server may store a private key that is known only to the casino. Whenever the casino would like to activate or deactivate a feature, a casino employee may indicate this to the casino server (e.g., by using an input device attached to the casino server). The casino server may then determine an activation code appropriate for activating or deactivating the feature on the gaming device. An activation code generated by a casino server may include information such as:
  (i) feature—An indication of what feature or features should be activated or deactivated.
  (ii) action to be performed—(e.g., "activate" or "deactivate")—An indication of what action should be performed on the indicated feature or features.
  (iii) gaming device—An indication of what gaming device or machines the activation code is intended for.
  (iv) time—An indication of when the activation code is generated. Note that including an indication of time in an activation code may prevent a casino from claiming that a gaming device is reusing an old activation code.
  (v) operator—An indication of who is operating the casino server (i.e., who requested that the casino server generate the activation code). This information may be helpful in allowing a casino to determine what employee activated a feature. Note that, according to some embodiments, a casino server may activate a feature automatically based on a condition (e.g., a feature may be activated every day from 6 pm-9 pm).

Various other information that may be included in an activation code is analogous to information that may be included in an authentication code, as described above.

A casino server may sign an activation code using a private key. Methods of producing digital signatures are known to those skilled in the art and are similar to methods used for generating an authentication code (as described above). Note that signing an activation code with a private key may include encrypting a portion of the activation code with the private key (e.g., according to a public-key encryption algorithm such as the ones described above). One major benefit of signing an activation code with a casino's private key is that nobody but the casino should know this private key and be able to sign the activation code with it. Therefore, there should be no way for anybody other than the casino to activate or deactivate a feature on the gaming device. According to some embodiments, a casino server may use the same private key to sign activation codes for a plurality of gaming devices. Alternatively, a casino server may store a plurality of private keys (e.g., one for each gaming device). The activation code may then be indicated to the gaming device. For example, a casino server may transmit an indication of an activation code to at least one gaming device using a communication network. In another example, a casino server may output an activation code using an output device (e.g., a video monitor, a disk drive). A casino employee may then provide this activation code to a gaming device using an input device (e.g., a numeric keypad, a magnetic stripe reader).

According to some embodiments, a gaming device may verify an activation code. Various methods are possible depending on how an activation code was generated. For example, a casino server may sign an activation code with a private key. A gaming device may then verify this activation code with a public key corresponding to the private key. According to some embodiments, a plurality of gaming devices may store the same public key for a casino server. Alternatively, each gaming device may store a different public key (e.g., because a casino server uses a different private key for each gaming device).

A gaming device may activate or deactivate a feature based on an activation code that is received and verified. As described above, usage data tracked by a gaming device and included in an authentication code may include information about activating or deactivating features and/or information about activation codes that are indicated to a gaming device. Including information about activation codes in an authentication code is one way of communicating an activation code to an interested party and preventing a casino from denying that it activated a feature on a gaming device. Other means of authenticating usage data (e.g., as described above) may also be used to authenticate that a casino provided an activation code.

Figure 24A:
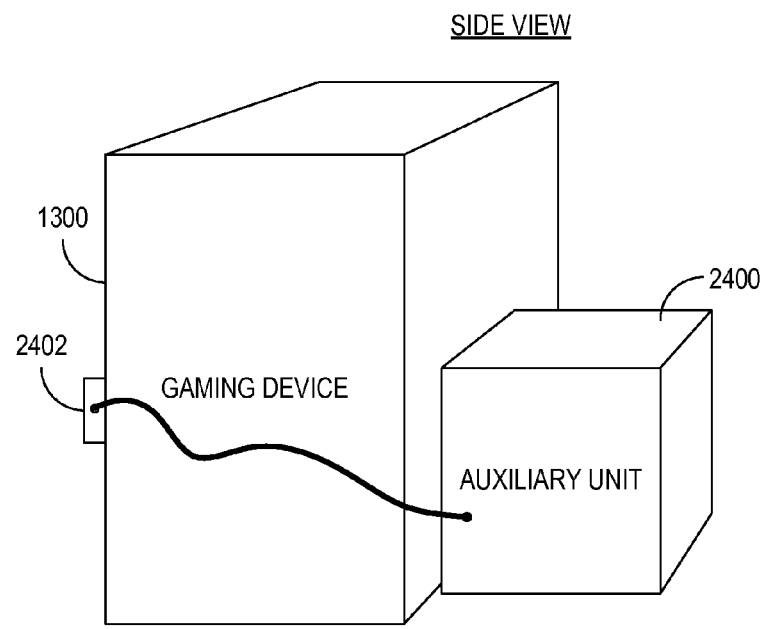
FIGS. 24A and 24B are plan views of an exemplary gaming device consistent with at least some embodiments of the present invention.
Figure 24B:
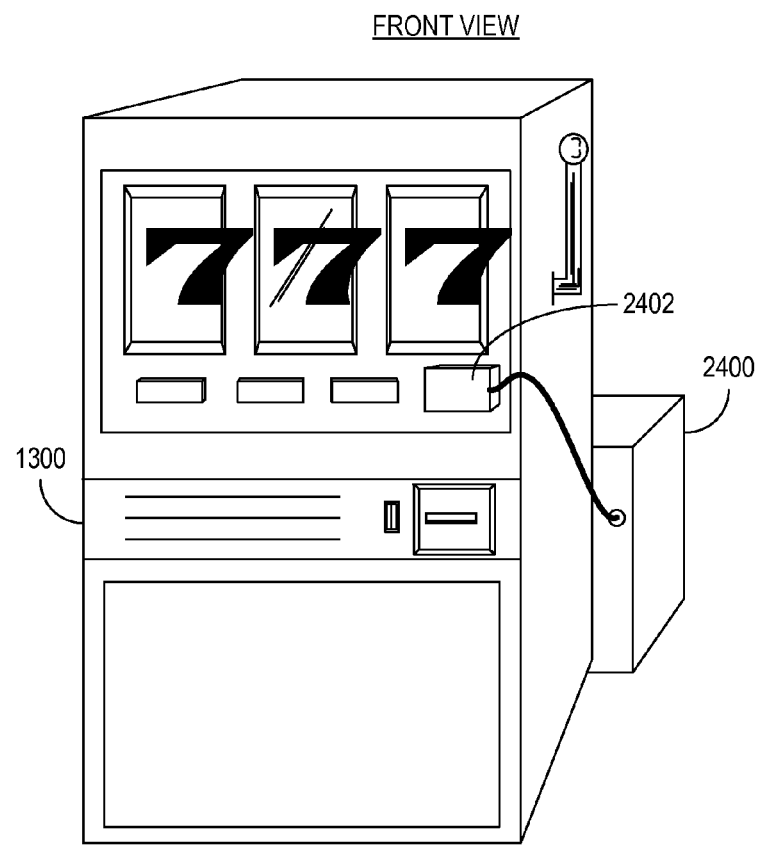

Usage data for a gaming device may be monitored and authenticated using an auxiliary device. For example, an auxiliary device may be attached to the side of a gaming device and used to perform the following steps:
   (i) determining usage data relating to a gaming device
   (ii) generating an authentication code based on the usage data
   (iii) outputting the authentication code Note that these steps may be performed in a manner similar to that described above for a gaming device. An auxiliary device may include one or more of the following:
   (i) a processor
   (ii) memory (e.g., storing a secret key)
   (iii) an input device
   (iv) an output device
   (v) a communication port
   (vi) a secure perimeter An auxiliary device may be situated in various locations, including:
   (i) attached to the outside of a gaming device—For example, an auxiliary device 2400 may be encased in a stainless steel box that may be bolted to the back of a gaming device 1300. One example of this embodiment is shown in FIGS. 24A and 24B. Note that the example auxiliary device 2400 depicted in FIGS. 24A and 24B includes a camera 2402 that may determine when the reels of a slot machine are spinning.
   (ii) proximate to a gaming device—For example, an auxiliary device may be attached to the ceiling above a gaming device and include a camera that allows the auxiliary device to monitor game play at the gaming device.
   (iii) inside a gaming device—For example, an auxiliary device may be a component of a gaming device that is connected to the electronics of the gaming device by at least one wire or channel.

According to some embodiments, an auxiliary device 2400 may communicate with a gaming device (e.g., to receive information relating to usage data). For example, an auxiliary device 2400 may be connected to the processor of a gaming device and receive indications of usage data relating to the gaming device. In a second example, an auxiliary device may read information from a memory, a data storage device, and/or communications port on a gaming device.

According to some embodiments, an auxiliary device 2400 may include at least one sensor or input device. This sensor may enable to the auxiliary device to monitor a gaming device and independently determine or confirm usage data. Details of different types of sensors and input devices are described above. Examples of sensors that may be included on an auxiliary device include:
   (i) a camera aimed at the front of a gaming device. A camera may be used to independently determine information such as a bet that is placed on the gaming device, a credit balance on the gaming device, or an outcome on the gaming device.
   (ii) a motion sensor may determine when the reels of a slot machine are spinning.
   (iii) a proximity sensor may identify when there is a person standing or sitting in front of a gaming device.
   (iv) a weight sensor may determine how many coins are in the hopper of a gaming device According to some embodiments, the invention may include a kit that enables a party to add an auxiliary device 2400 to a gaming device 1300 or otherwise modify a gaming device to generate an authentication code based on usage data.

It is clear from the foregoing discussion that the disclosed systems and methods for authenticating gaming device usage data represents an improvement in the art of gaming. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:

1. A method comprising:
   enabling, by a processor of a server device in communication with a first gaming device, a first feature for use on the first gaming device, the feature comprising an offer engine for providing one or more offers to a user of the first gaming device, wherein an offer comprises an offer for a payment to be made to the user in exchange for an action by the user, wherein the one or more offers are distinct from indications of awards the user may qualify for during play of a game playable via the gaming device;
   determining a measure of performance of the first gaming device, wherein the measure of performance corresponds to use of the first gaming device while the first feature is utilized in order to determine the one or more offers to be provided to the user;

determining whether to adjust the first feature based on the measure of performance, thereby determining whether to modify at least one type of offer to be provided to the user;

generating an authentication code based on the use of the first gaming device while the first feature is enabled for use on the first gaming device, thereby authenticating use of the gaming device; and outputting the authentication code to an interested party associated with the one or more offers.

2. The method of claim 1, wherein enabling the feature further comprises enabling the user to access content in accordance with the feature.

3. The method of claim 1, wherein enabling the feature comprises at least one of storing a flag in a database or transmitting a signal to the gaming device.

4. The method of claim 1, wherein the measure of performance comprises a measure of usage of the gaming device.

5. The method of claim 4, wherein the measure of usage of the gaming device comprises an indication of game events of a game played on the gaming device.

6. The method of claim 4, wherein the measure of usage comprises at least one of past gaming activity of the user, current gaming activity of the user and a preference of the user.

7. The method of claim 1, wherein the gaming device comprises a computer device operable to execute software that simulates play of a game.

8. The method of claim 1, further comprising:
crediting a monetary amount to a financial account associated with the user.

9. The method of claim 8, further comprising:
determining that the user has performed a value-added activity which is distinct from providing currency or a payment identifier for the monetary amount and crediting the monetary amount in response thereto.

10. A non-transitory computer-readable medium storing instructions which, when executed by a processor of a computing device, cause the processor to perform a method, the method comprising:

enabling a first feature for use on a first gaming device, the feature comprising an offer engine for providing one or more offers to a user of the first gaming device, wherein an offer comprises an offer for a payment to be made to the user in exchange for an action by the user, wherein the one or more offers are distinct from indications of awards the user may qualify for during play of a game playable via the gaming device;

determining a measure of performance of the first gaming device,
wherein the measure of performance corresponds to use of the first gaming device while the first feature is utilized in order to determine the one or more offers to be provided to the user;

determining whether to adjust the first feature based on the measure of performance, thereby determining whether to modify at least one type of offer to be provided to the user;

generating an authentication code based on the use of the first gaming device while the first feature is enabled for use on the first gaming device, thereby authenticating use of the gaming device; and outputting the authentication code to an interested party associated with the one or more offers.

* * * * *